United States Patent
Moura et al.

(10) Patent No.: US 11,799,346 B2
(45) Date of Patent: Oct. 24, 2023

(54) SEALED ROBOT DRIVE

(71) Applicant: Brooks Automation, Inc., Chelmsford, MA (US)

(72) Inventors: Jairo T. Moura, Marlborough, MA (US); Ulysses Gilchrist, Reading, MA (US); Robert T. Caveney, Windham, NH (US)

(73) Assignee: BROOKS AUTOMATION US, LLC, Chelmsford, MA (US)

( * ) Notice: Subject to any disclaimer, the term of this patent is extended or adjusted under 35 U.S.C. 154(b) by 149 days.

(21) Appl. No.: 16/674,933

(22) Filed: Nov. 5, 2019

(65) Prior Publication Data

US 2020/0067368 A1     Feb. 27, 2020

Related U.S. Application Data

(63) Continuation of application No. 15/952,595, filed on Apr. 13, 2018, now Pat. No. 10,468,936, which is a
(Continued)

(51) Int. Cl.
*H02K 5/128*     (2006.01)
*H02K 1/24*     (2006.01)
(Continued)

(52) U.S. Cl.
CPC .......... *H02K 5/128* (2013.01); *B25J 11/0095* (2013.01); *H02K 1/14* (2013.01);
(Continued)

(58) Field of Classification Search
CPC ... B25J 11/0095; H02K 11/21; H02K 19/103; H02K 1/14; H02K 1/141; H02K 1/148; H02K 1/24; H02K 1/246; H02K 5/128
(Continued)

(56) References Cited

U.S. PATENT DOCUMENTS 4,081,703 A     3/1978 Madsen et al.
4,197,488 A     4/1980 Kant
(Continued)

FOREIGN PATENT DOCUMENTS

CN     1502161     6/2004
CN     1574598     2/2005
(Continued)

OTHER PUBLICATIONS

TW_IPO_Search_Report Aplication No. 10313929 dated Sep. 12, 2018.
(Continued)

*Primary Examiner* — Alex W Mok
(74) *Attorney, Agent, or Firm* — Perman & Green, LLP

(57) ABSTRACT

A transport apparatus including a housing, a drive mounted to the housing, and at least one transport arm connected to the drive where the drive includes at least one rotor having at least one salient pole of magnetic permeable material and disposed in an isolated environment, at least one stator having at least one salient pole with corresponding coil units and disposed outside the isolated environment, where the at least one salient pole of the at least one stator and the at least one salient pole of the rotor form a closed magnetic flux circuit between the at least one rotor and the at least one stator, and at least one seal configured to isolate the isolated environment where the at least one seal is integral to the at least one stator.

20 Claims, 54 Drawing Sheets

Related U.S. Application Data continuation of application No. 14/540,072, filed on Nov. 13, 2014, now Pat. No. 9,948,155.

(60) Provisional application No. 61/903,813, filed on Nov. 13, 2013.

(51) Int. Cl.
*H02K 1/14* (2006.01)
*B25J 11/00* (2006.01)
*H02K 11/21* (2016.01)
*H02K 19/10* (2006.01)

(52) U.S. Cl.
CPC .............. *H02K 1/141* (2013.01); *H02K 1/148* (2013.01); *H02K 1/24* (2013.01); *H02K 1/246* (2013.01); *H02K 11/21* (2016.01); *H02K 19/103* (2013.01)

(58) Field of Classification Search
USPC ...................................................... 414/744.6
See application file for complete search history.

(56) References Cited

U.S. PATENT DOCUMENTS

| | | | |
|---|---|---|---|
| 4,611,157 A | 9/1986 | Miller et al. | |
| 4,626,719 A | 12/1986 | Foster | |
| 4,661,756 A | 4/1987 | Murphy et al. | |
| 4,670,696 A | 6/1987 | Byrne et al. | |
| 4,748,362 A | 5/1988 | Hedlund | |
| 4,868,477 A | 9/1989 | Anderson et al. | |
| 4,917,925 A | 4/1990 | Loretti et al. | |
| 4,922,197 A | 5/1990 | Juds et al. | |
| 4,951,601 A | 8/1990 | Maydan et al. | |
| 4,992,733 A | 2/1991 | Griebeler | |
| 5,076,205 A | 12/1991 | Vowles et al. | |
| 5,140,243 A | 8/1992 | Lyons et al. | |
| 5,296,773 A | 3/1994 | El-Antably et al. | |
| 5,376,862 A | 12/1994 | Stevens | |
| 5,428,257 A | 6/1995 | Lurkens | |
| 5,450,009 A | 9/1995 | Murakami | |
| 5,475,304 A | 12/1995 | Prinz | |
| 5,485,046 A | 1/1996 | Kaplan et al. | |
| 5,522,653 A | 6/1996 | Fulks et al. | |
| 5,539,266 A | 7/1996 | Stevens | |
| 5,545,964 A | 8/1996 | Stephenson et al. | |
| 5,584,647 A | 12/1996 | Uehara et al. | |
| 5,621,294 A | 4/1997 | Bessette et al. | |
| 5,623,177 A | 4/1997 | Dimatteo et al. | |
| 5,652,493 A | 7/1997 | Hendershot, Jr. | |
| 5,720,590 A | 2/1998 | Hofmeister | |
| 5,739,663 A | 4/1998 | Brown | |
| 5,813,823 A | 9/1998 | Hofmeister | |
| 5,828,153 A | 10/1998 | McClelland | |
| 5,852,355 A | 12/1998 | Turner | |
| 5,855,681 A | 1/1999 | Maydan et al. | |
| 5,864,477 A | 1/1999 | Webster | |
| 5,866,962 A * | 2/1999 | Kim ..................... | H02K 29/10 310/68 B |
| 5,871,588 A | 2/1999 | Moslehi et al. | |
| 5,894,760 A | 4/1999 | Caveney | |
| 5,899,658 A | 5/1999 | Hofmeister | |
| 5,914,548 A * | 6/1999 | Watanabe .......... | H02K 11/0141 310/88 |
| 5,923,141 A | 7/1999 | McHugh | |
| 6,091,170 A | 7/2000 | Mayes et al. | |
| 6,114,789 A | 9/2000 | Pengov et al. | |
| 6,150,791 A | 11/2000 | Fulton | |
| 6,181,036 B1 | 1/2001 | Kazama et al. | |
| 6,201,368 B1 | 3/2001 | Webster | |
| 6,203,294 B1 | 3/2001 | Turley et al. | |
| 6,225,767 B1 | 5/2001 | Lovett et al. | |
| 6,242,874 B1 | 6/2001 | Kalpathi et al. | |
| 6,252,325 B1 | 6/2001 | Nashiki | |
| 6,285,101 B1 | 9/2001 | Kazama et al. | |
| 6,297,613 B1 | 10/2001 | Elliott et al. | |
| 6,305,694 B1 | 10/2001 | Yamazumi et al. | |
| 6,313,597 B1 | 11/2001 | Elliott et al. | |
| 6,335,578 B1 | 1/2002 | Katsumi et al. | |
| 6,372,293 B1 | 4/2002 | Mathus et al. | |
| 6,460,567 B1 | 10/2002 | Hansen, III et al. | |
| 6,468,353 B1 | 10/2002 | Perlov et al. | |
| 6,492,756 B1 | 12/2002 | Maslov et al. | |
| 6,498,447 B2 | 12/2002 | Mann et al. | |
| 6,525,504 B1 | 2/2003 | Nygren et al. | |
| 6,548,932 B1 | 4/2003 | Weiglhofer et al. | |
| 6,617,712 B1 | 9/2003 | Dondi | |
| 6,639,378 B2 | 10/2003 | Turner et al. | |
| 6,700,272 B1 | 3/2004 | Lindner | |
| 6,700,273 B1 | 3/2004 | Ojima et al. | |
| 6,758,876 B2 | 7/2004 | Suzuki et al. | |
| 6,759,826 B2 | 7/2004 | Tankard | |
| 6,794,791 B2 | 9/2004 | Ben Ahmed et al. | |
| 6,823,725 B2 | 11/2004 | Lohberg | |
| 6,828,710 B1 | 12/2004 | Gabrys | |
| 6,857,635 B1 | 2/2005 | Li et al. | |
| 6,900,573 B2 | 5/2005 | Edwards et al. | |
| 6,936,992 B2 | 8/2005 | Elliott et al. | |
| 7,044,003 B2 | 5/2006 | Flammer et al. | |
| 7,057,362 B2 | 6/2006 | Norman | |
| 7,071,659 B1 | 7/2006 | Torrey et al. | |
| 7,090,222 B2 | 8/2006 | Watanabe et al. | |
| 7,112,957 B2 | 9/2006 | Bicking | |
| 7,141,965 B2 | 11/2006 | Breuer et al. | |
| 7,208,906 B2 | 4/2007 | Turner et al. | |
| 7,230,360 B2 | 6/2007 | Desai et al. | |
| RE39,748 E * | 7/2007 | Watanabe ............... | H02K 7/20 310/88 |
| 7,268,516 B2 | 9/2007 | Tankard | |
| 7,321,113 B2 | 1/2008 | Hare et al. | |
| 7,368,705 B2 | 5/2008 | Hare et al. | |
| 7,392,565 B2 | 7/2008 | Holbrook et al. | |
| 7,405,556 B2 | 7/2008 | Breuer et al. | |
| 7,427,845 B2 | 9/2008 | Burse | |
| 7,592,712 B2 | 9/2009 | Perlo et al. | |
| 7,608,813 B1 | 10/2009 | Milvich et al. | |
| 7,639,005 B2 | 12/2009 | Qian et al. | |
| 7,719,159 B2 | 5/2010 | Petro et al. | |
| 7,804,269 B2 | 9/2010 | Randall | |
| 7,834,618 B2 | 11/2010 | Moura et al. | |
| 7,852,070 B2 | 12/2010 | Yamada et al. | |
| 7,901,539 B2 | 3/2011 | Bluck et al. | |
| 7,904,182 B2 | 3/2011 | Hosek et al. | |
| 7,906,931 B2 | 3/2011 | Randall | |
| 7,950,890 B2 | 5/2011 | Nakamura et al. | |
| 7,988,398 B2 | 8/2011 | Hofmeister et al. | |
| 7,994,676 B2 | 8/2011 | Imazu et al. | |
| 8,094,323 B2 | 1/2012 | Kapner | |
| 8,129,984 B2 | 3/2012 | Hosek et al. | |
| 8,222,892 B2 | 7/2012 | Hosek et al. | |
| 8,293,066 B2 | 10/2012 | Bluck et al. | |
| 8,303,764 B2 | 11/2012 | Bluck et al. | |
| 8,309,906 B2 | 11/2012 | Kapner et al. | |
| 8,419,341 B2 | 4/2013 | Hoey et al. | |
| 8,450,999 B2 | 5/2013 | Wolschlager et al. | |
| 8,749,105 B2 | 6/2014 | Arita et al. | |
| 9,541,611 B2 | 1/2017 | Wang et al. | |
| 2001/0010453 A1 | 8/2001 | Marcinkiewicz | |
| 2001/0024611 A1 | 9/2001 | Woodruff et al. | |
| 2001/0036398 A1 | 11/2001 | Hofmeister | |
| 2002/0125782 A1 | 9/2002 | Peachee et al. | |
| 2002/0135358 A1 | 9/2002 | Sager et al. | |
| 2002/0175653 A1 | 11/2002 | Elliot et al. | |
| 2002/0185990 A1 | 12/2002 | Elliott et al. | |
| 2003/0016686 A1 | 1/2003 | Wynne et al. | |
| 2003/0019686 A1 | 1/2003 | Fukuda et al. | |
| 2003/0042864 A1 | 3/2003 | Lequesne et al. | |
| 2004/0052125 A1 | 3/2004 | Tankard | |
| 2004/0066165 A1 | 4/2004 | Kamio et al. | |
| 2004/0151562 A1 | 8/2004 | Hofmeister et al. | |
| 2004/0189240 A1 | 9/2004 | Islam et al. | |
| 2005/0011288 A1 | 1/2005 | Flammer et al. | |
| 2005/0105991 A1 | 5/2005 | Hofmeister et al. | |

(56) References Cited

U.S. PATENT DOCUMENTS

| | | |
|---|---|---|
| 2005/0120578 A1 | 6/2005 | Vandermeulen |
| 2005/0212371 A1 | 9/2005 | McClelland |
| 2006/0021176 A1 | 2/2006 | Moein et al. |
| 2006/0036384 A1 | 2/2006 | Moriarty et al. |
| 2006/0036385 A1 | 2/2006 | Tankard |
| 2006/0045664 A1 | 3/2006 | Niewmierzycki et al. |
| 2006/0053577 A1 | 3/2006 | Moein et al. |
| 2006/0073276 A1 | 4/2006 | Antonissen |
| 2006/0102078 A1 | 5/2006 | Fairbairn et al. |
| 2006/0175913 A1 | 8/2006 | Hempe et al. |
| 2006/0182529 A1 | 8/2006 | Hiroki |
| 2007/0020081 A1 | 1/2007 | Gilchrist et al. |
| 2007/0022304 A1 | 1/2007 | Yanagawa |
| 2007/0029890 A1 | 2/2007 | Deodhar et al. |
| 2007/0183871 A1 | 8/2007 | Hofmeister et al. |
| 2007/0280813 A1 | 12/2007 | Nakamura et al. |
| 2008/0019816 A1 | 1/2008 | Sato |
| 2008/0116886 A1 | 5/2008 | Yamada et al. |
| 2008/0131228 A1 | 6/2008 | Sheets |
| 2008/0290762 A1 | 11/2008 | Lott et al. |
| 2009/0001917 A1 | 1/2009 | Hosek et al. |
| 2009/0003976 A1 | 1/2009 | Hofmeister et al. |
| 2009/0015248 A1 | 1/2009 | Moura et al. |
| 2009/0022571 A1 | 1/2009 | Krupyshev et al. |
| 2009/0033173 A1 | 2/2009 | Moura et al. |
| 2009/0078134 A1 | 3/2009 | Rothlein et al. |
| 2009/0102460 A1 | 4/2009 | Schott et al. |
| 2009/0140748 A1 | 6/2009 | Lindsey et al. |
| 2009/0162179 A1* | 6/2009 | Hosek ............... H01L 21/67173 |
| | | 414/749.2 |
| 2009/0167119 A1 | 7/2009 | Nakayama et al. |
| 2009/0191030 A1 | 7/2009 | Bluck et al. |
| 2009/0243413 A1 | 10/2009 | Gilchrist et al. |
| 2010/0063775 A1 | 3/2010 | Colling |
| 2010/0123426 A1 | 5/2010 | Nashiki et al. |
| 2010/0207616 A1 | 8/2010 | Wolschlager et al. |
| 2010/0295389 A1 | 11/2010 | Tessier et al. |
| 2011/0058967 A1 | 3/2011 | Arita et al. |
| 2011/0077892 A1 | 3/2011 | Emami et al. |
| 2011/0133582 A1 | 6/2011 | Bingler |
| 2011/0156514 A1 | 6/2011 | Watanabe et al. |
| 2011/0171887 A1* | 7/2011 | Tanimoto ............... B24B 47/12 |
| | | 451/359 |
| 2011/0173496 A1 | 7/2011 | Hosek et al. |
| 2011/0181221 A1 | 7/2011 | Asahi et al. |
| 2011/0234130 A1 | 9/2011 | Okumura |
| 2011/0284300 A1 | 11/2011 | Cheng et al. |
| 2011/0308335 A1 | 12/2011 | Pink et al. |
| 2012/0038348 A1 | 2/2012 | Aimuta et al. |
| 2012/0056575 A1 | 3/2012 | Dial |
| 2012/0076626 A1 | 3/2012 | Hoey et al. |
| 2012/0098381 A1 | 4/2012 | Seki et al. |
| 2012/0223597 A1 | 9/2012 | Hosek et al. |
| 2013/0009579 A1 | 1/2013 | Henderson et al. |
| 2013/0014605 A1 | 1/2013 | Caveney |
| 2013/0026764 A1 | 1/2013 | Hayashi et al. |
| 2013/0026864 A1 | 1/2013 | Bae et al. |
| 2013/0028700 A1 | 1/2013 | Gilchrist et al. |
| 2013/0033219 A1 | 2/2013 | Kakimoto et al. |
| 2013/0057263 A1 | 3/2013 | Hosek |
| 2013/0069450 A1 | 3/2013 | Hosek et al. |
| 2013/0076177 A1 | 3/2013 | Seok |
| 2013/0085002 A1 | 4/2013 | Hosek |
| 2013/0088111 A1 | 4/2013 | Park |
| 2013/0099707 A1 | 4/2013 | Okubo |
| 2013/0134912 A1 | 5/2013 | Khalil et al. |
| 2013/0175904 A1* | 7/2013 | Jang ............... A47L 9/22 |
| | | 310/68 B |
| 2013/0193812 A1* | 8/2013 | Oishi ............... F16C 35/12 |
| | | 310/68 B |
| 2013/0249543 A1 | 9/2013 | Lee |
| 2014/0002001 A1 | 1/2014 | Kinashi |
| 2014/0150592 A1 | 6/2014 | Kremerman |
| 2014/0167662 A1 | 6/2014 | Ajima et al. |
| 2014/0246893 A1 | 9/2014 | Tesar |
| 2015/0171709 A1 | 6/2015 | Ito et al. |
| 2015/0331052 A1 | 11/2015 | Seeley et al. |
| 2015/0346292 A1 | 12/2015 | Wang et al. |
| 2015/0346717 A1 | 12/2015 | Hosek et al. |
| 2016/0161561 A1 | 6/2016 | Chen et al. |
| 2020/0067368 A1 | 2/2020 | Moura et al. |

FOREIGN PATENT DOCUMENTS

| | | |
|---|---|---|
| CN | 101662257 | 3/2010 |
| CN | 102027658 | 4/2011 |
| CN | 102457149 | 5/2012 |
| CN | 103036332 | 4/2013 |
| CN | 103219856 | 7/2013 |
| DE | 102007034636 | 11/2007 |
| EP | 0756373 | 1/1997 |
| JP | 4725101 | 11/1972 |
| JP | 5152808 | 4/1976 |
| JP | 58154612 | 9/1983 |
| JP | 02206389 | 8/1990 |
| JP | 02206391 | 8/1990 |
| JP | 03145958 | 6/1991 |
| JP | 03277148 | 12/1991 |
| JP | 04046781 | 2/1992 |
| JP | 5316706 | 11/1993 |
| JP | 089676 | 1/1996 |
| JP | 08119409 | 5/1996 |
| JP | 08256455 | 10/1996 |
| JP | 09238438 | 9/1997 |
| JP | 09294393 | 11/1997 |
| JP | 10170212 | 6/1998 |
| JP | 11318063 | 11/1999 |
| JP | 2001050161 | 2/2001 |
| JP | 2001112223 | 4/2001 |
| JP | 2001221359 | 8/2001 |
| JP | 2001255220 | 9/2001 |
| JP | 2002027785 | 1/2002 |
| JP | 2002059386 | 2/2002 |
| JP | 2002066976 | 3/2002 |
| JP | 2003039376 | 2/2003 |
| JP | 2003229128 | 8/2003 |
| JP | 2003339128 | 11/2003 |
| JP | 2004023890 | 1/2004 |
| JP | 2004242444 | 8/2004 |
| JP | 2005037389 | 2/2005 |
| JP | 2005124309 | 5/2005 |
| JP | 2006094577 | 4/2006 |
| JP | 2006162557 | 6/2006 |
| JP | 2006284299 | 10/2006 |
| JP | 2006529081 | 12/2006 |
| JP | 2007097257 | 4/2007 |
| JP | 2007151269 | 6/2007 |
| JP | 2008537472 | 9/2008 |
| JP | 2009142101 | 6/2009 |
| JP | 10052002 | 3/2010 |
| JP | 2010052002 | 3/2010 |
| JP | 2010183806 | 8/2010 |
| JP | 2010532154 | 9/2010 |
| JP | 2011514652 | 5/2011 |
| JP | 4725101 | 7/2011 |
| JP | 2011153864 | 8/2011 |
| JP | 2012100502 | 5/2012 |
| JP | 2012518172 | 8/2012 |
| JP | 2012213272 | 11/2012 |
| JP | 2013021913 | 1/2013 |
| JP | 2013027261 | 2/2013 |
| JP | 2013101030 | 5/2013 |
| JP | 5274702 | 8/2013 |
| JP | 2013195429 | 9/2013 |
| JP | 2013198307 | 9/2013 |
| KR | 1020050002151 | 7/2005 |
| KR | 20130013962 | 2/2013 |
| KR | 20130109766 | 10/2013 |
| TW | 2011065// | 2/2011 |
| TW | 201238232 | 9/2012 |
| WO | 0064028 | 10/2000 |
| WO | 2003021761 | 3/2003 |
| WO | 2008081684 | 7/2008 |
| WO | 2009003193 | 12/2008 |

(56) References Cited

FOREIGN PATENT DOCUMENTS

| WO | 2009003196 | 12/2008 |
| WO | 2009012396 | 1/2009 |
| WO | 2009018149 | 2/2009 |
| WO | 2011139682 | 11/2011 |
| WO | 2012167316 | 12/2012 |
| WO | 2013010053 | 1/2013 |
| WO | 2013032525 | 3/2013 |
| WO | 2013040406 | 3/2013 |

OTHER PUBLICATIONS

International Search Report, International Application No. PCT/US2014/065414, dated Feb. 27, 2015.
International Search Report, International Application No. PCT/US2014/065432, dated Feb. 24, 2015.
International Search Report, International Application No. PCT/US2014/065422, dated Feb. 26, 2015.
International Search Report, International Application No. PCT/US2014/065392, dated Mar. 13, 2015.

* cited by examiner

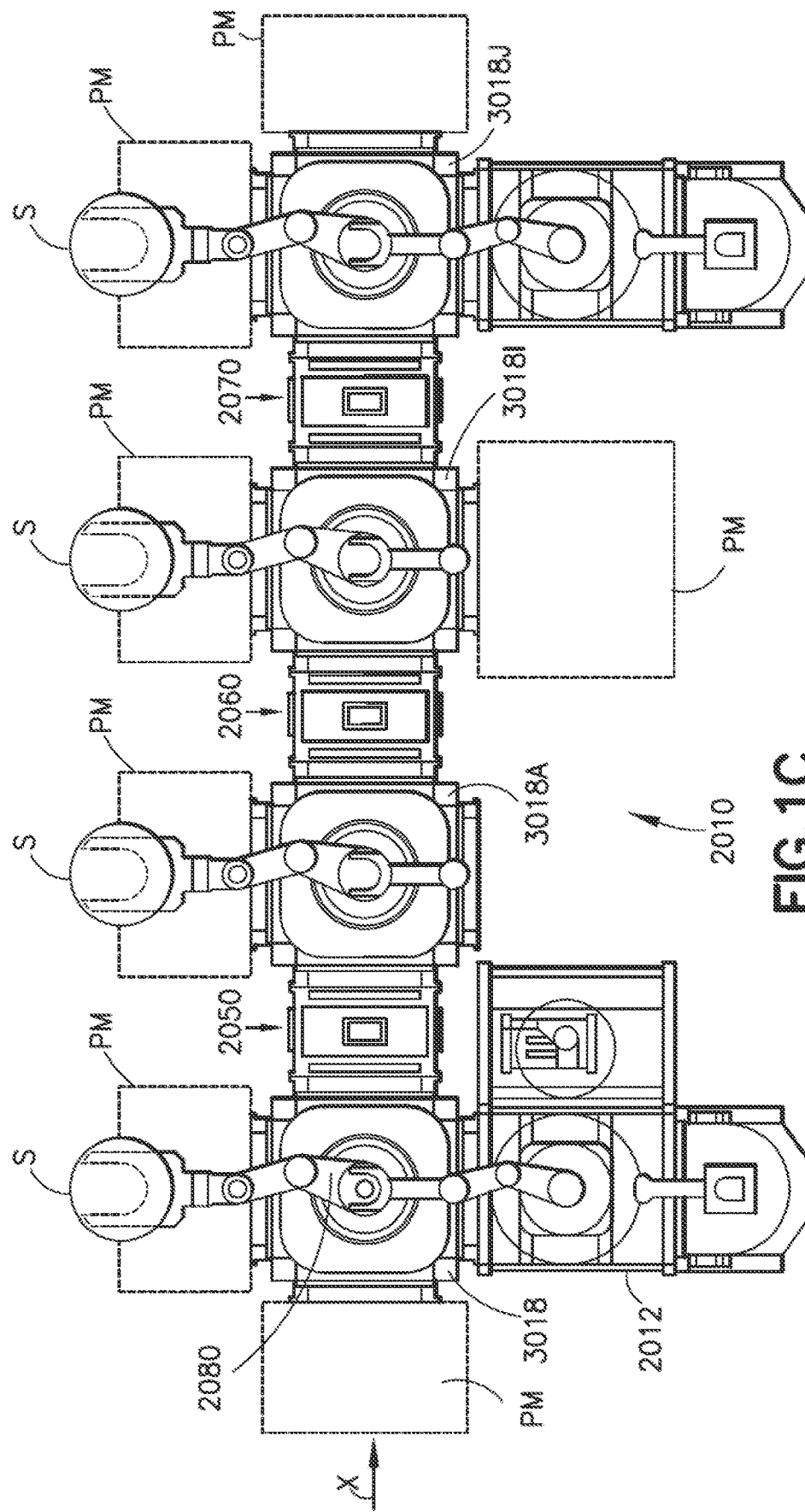

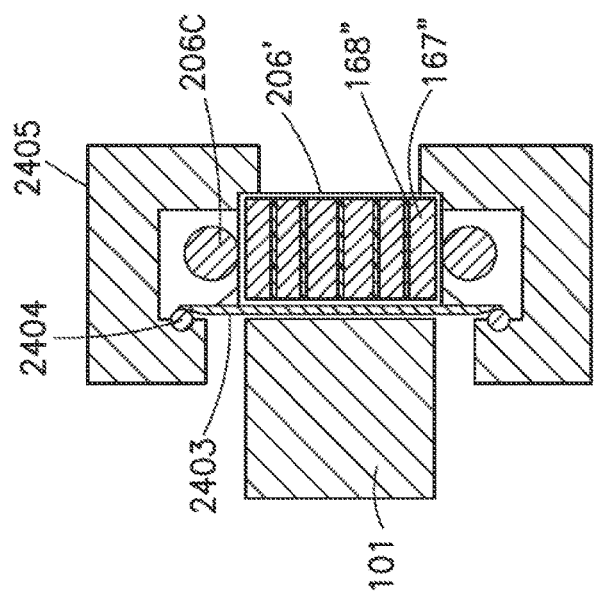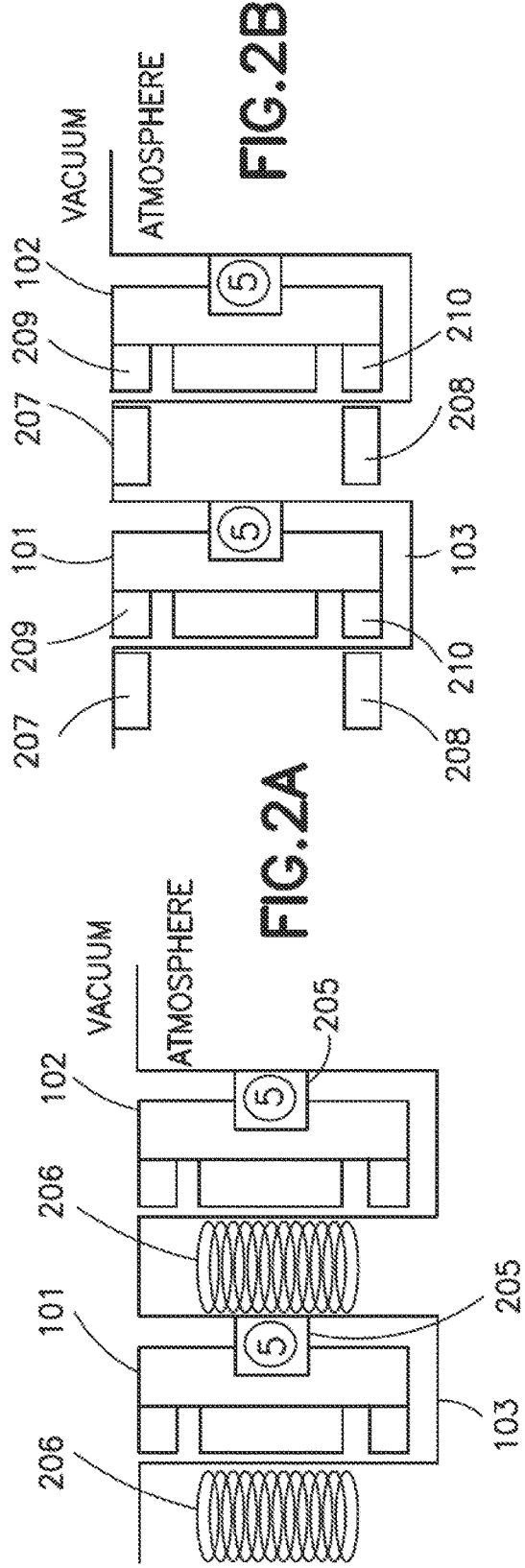

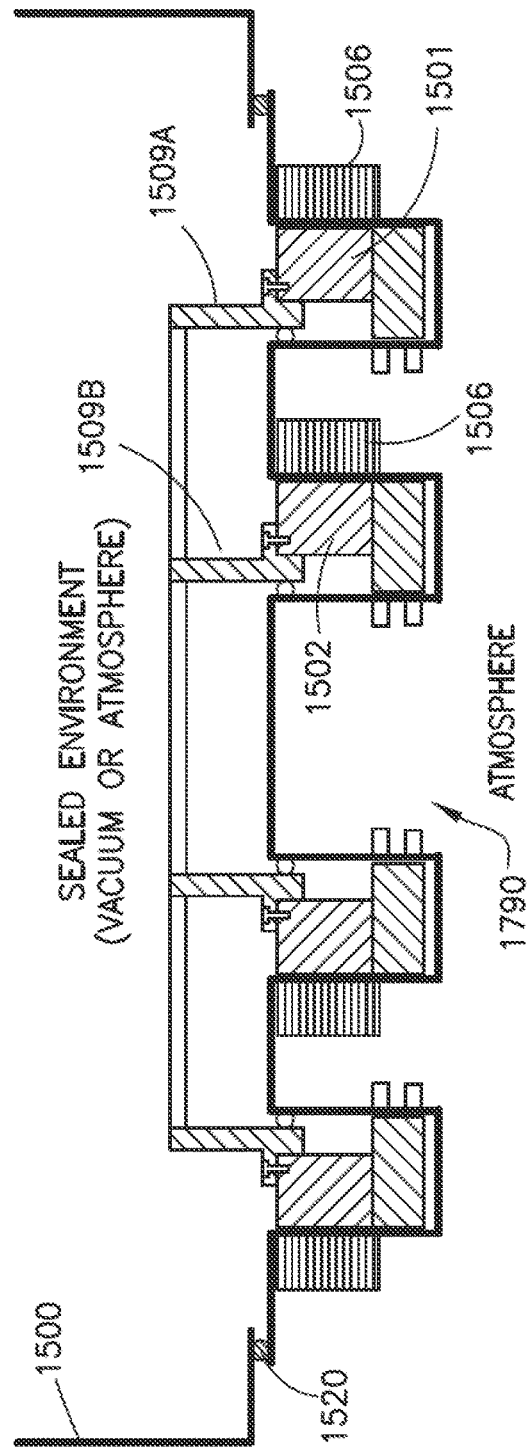
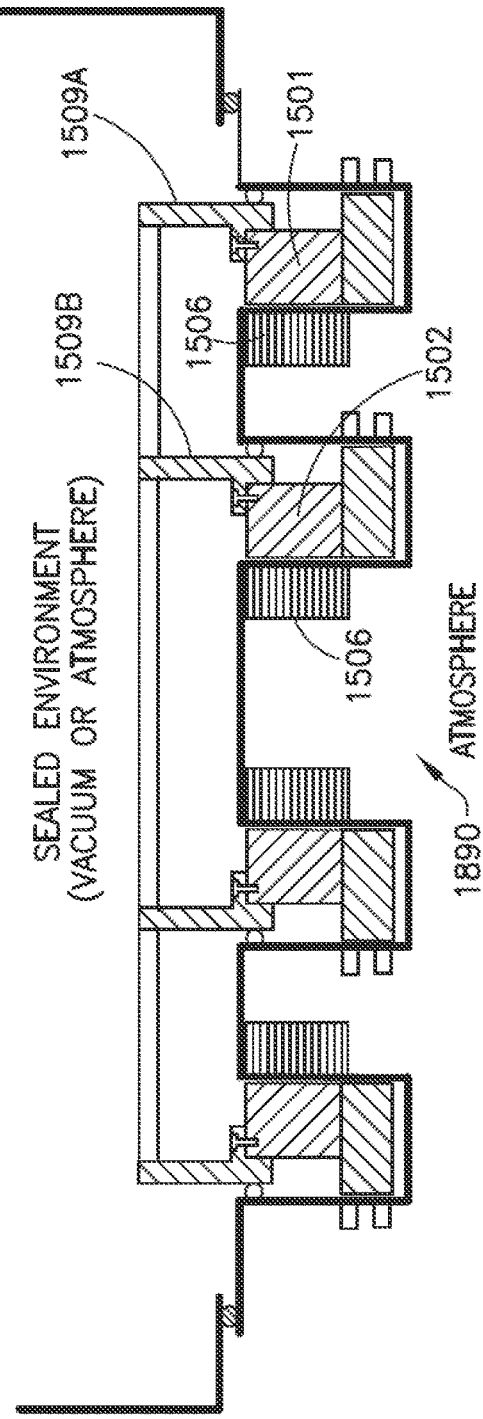
FIG.9
FIG.10

| SENSOR NUMBER AND CORRESPONDING DIGITAL OUTPUTS | | | | | ANGULAR POSITION (DEG) |
|---|---|---|---|---|---|
| S4 | S3 | S2 | S1 | S0 | |
| 0 | 0 | 1 | 0 | 1 | 12 |
| 0 | 0 | 0 | 0 | 1 | 24 |
| 0 | 0 | 0 | 1 | 1 | 36 |
| 0 | 0 | 1 | 1 | 1 | 48 |
| 0 | 0 | 0 | 1 | 1 | 60 |
| 0 | 1 | 0 | 1 | 1 | 72 |
| 0 | 1 | 0 | 1 | 0 | 84 |
| 0 | 0 | 0 | 1 | 0 | 96 |
| 0 | 0 | 1 | 1 | 0 | 108 |
| 0 | 1 | 1 | 1 | 0 | 120 |
| 1 | 1 | 0 | 1 | 0 | 132 |
| 1 | 0 | 1 | 1 | 0 | 144 |
| 1 | 0 | 1 | 0 | 0 | 156 |
| 0 | 0 | 1 | 0 | 0 | 168 |
| 0 | 0 | 1 | 0 | 0 | 180 |
| 1 | 1 | 1 | 0 | 0 | 192 |
| 1 | 1 | 1 | 0 | 1 | 204 |
| 0 | 1 | 1 | 0 | 1 | 216 |
| 0 | 1 | 0 | 0 | 1 | 228 |
| 0 | 1 | 0 | 0 | 0 | 240 |
| 1 | 1 | 0 | 0 | 0 | 252 |
| 1 | 0 | 0 | 0 | 1 | 264 |
| 1 | 1 | 0 | 1 | 1 | 276 |
| 1 | 1 | 0 | 1 | 0 | 288 |
| 1 | 0 | 0 | 0 | 0 | 300 |
| 1 | 0 | 0 | 0 | 0 | 312 |
| 1 | 0 | 0 | 0 | 1 | 324 |
| 1 | 0 | 0 | 1 | 1 | 336 |
| 1 | 0 | 1 | 1 | 1 | 348 |
| 1 | 0 | 1 | 0 | 1 | 360 |

SEALED ROBOT DRIVE

CROSS-REFERENCE TO RELATED APPLICATIONS

This application is a continuation of U.S. patent application Ser. No. 15/952,595, filed on Apr. 13, 2018 which is a continuation of U.S. patent application Ser. No. 14/540,072, filed on Nov. 13, 2014 (now U.S. Pat. No. 9,948,155, issued on Apr. 17, 2018), which is a Non-Provisional of and claims the benefit of U.S. Provisional Patent Application No. 61/903,813, filed on Nov. 13, 2013, the disclosures of which are incorporated herein by reference in their entireties.

BACKGROUND

1. Field

The exemplary embodiments generally relate to robotic drives and, more particularly, to sealed robotic drives.

2. Brief Description of Related Developments

Generally, existing direct drive technology, which for example uses permanent magnet motors or variable reluctance motors for actuation and optical encoders for position sensing, exhibits considerable limitations when, for example, the magnets, bonded components, seals and corrosive materials of the direct drive are exposed to ultra-high vacuum and/or aggressive and corrosive environments. To limit exposure of, for example, the magnets, bonded components, seals and corrosive materials of the direct drive a "can-seal" is generally used.

The can-seal generally isolates a motor rotor from a corresponding motor stator via a hermetically sealed non-magnetic wall or "can", also known as an "isolation wall". Can-seals generally use a non-magnetic vacuum isolation wall that is located between the rotor and stator of a given motor actuator. This allows for the magnetic flux to flow between the rotor and stator across the isolation wall. As a result, the stator can be completely located outside the sealed environment. This may allow for substantially clean and reliable motor actuation implementations in applications such as vacuum robot drives used for semiconductor applications. The limitation of such can-seals is that the size of an air gap between the rotor and stator poles may be limited by the isolation wall thickness. For example, the thickness of the isolation wall plus runout tolerances generally imposes constraints on the minimum air gap achievable between the rotor and stator. To increase the efficiency of the motor the gap between the rotor and stator should be minimized however, in cases where the environment sealed or otherwise isolated by the can-seal is exposed to a high or ultra-high vacuum, the isolation wall thickness has to be large enough to provide enough structural integrity to substantially prevent excessive deflection (i.e. the deflection of the isolation may interfere with the operation of the motor). As a result, the efficiency of the motor can be severely decreased due to, for example, the need of larger air gaps between the stator and rotor when compared to robot drive solutions that do not have an isolation wall across the rotor/stator air gap.

In one aspect, "dynamic seals" may be employed to generally isolate substantially the entire motor from the sealed environment. The dynamic seal may be a seal that allows for a portion of the driven shaft of the motor to operate within the isolated environment. The dynamic seal can be achieved in a number of ways including, for example, lip-seals or a ferro-fluidic seal. However, these dynamic seals may possibly be a source of particle contamination (e.g. from wear and tear of the seal), high friction between the stationary and moving components, limited life and risk of leakage between the sealed environment and, for example, an atmospheric environment outside the sealed environment.

Other solutions for sealed drives include the stator coils being located within the sealed environment. However, in applications where the sealed environment operates in a high vacuum, the stator coils may outgas undesirable compounds as well as overheat. As a result, the aforementioned sealing solutions may be expensive and/or impractical.

In other aspects direct drive motors, such as the variable reluctance or switched reluctance motors, may utilize solid rotors. However, the conventional solid rotors may have an inherent problem of core losses due to, for example, the effect of Eddy currents that result from the rate of change of the phase currents in switched reluctance motor applications. Other known solutions to the core loss problem include the utilization of materials with metallic ferromagnetic particles in conjunction with non-conductive particles that attempt to maintain good magnetic flux when compared to either a solid or laminated rotor.

It would be advantageous to have an isolation wall between the stator and rotor that minimizes the air gap between the stator and rotor. It would also be advantageous to have a vacuum compatible laminated rotor that provides increased magnetic efficiency and/or precision position control.

BRIEF DESCRIPTION OF THE DRAWINGS

The foregoing aspects and other features of the disclosed embodiment are explained in the following description, taken in connection with the accompanying drawings, wherein:

FIGS. 1A-1D are schematic illustrations of processing apparatus incorporating aspects of the disclosed embodiment;

FIGS. 1G-1K are schematic illustrations of rotors for a drive motor in accordance with aspects of the disclosed embodiment and FIG. 1L is a schematic illustration of a stator for the drive motor in accordance with aspects of the disclosed embodiment;

FIGS. 2A and 2B illustrate portions of a drive motor in accordance with aspects of the disclosed embodiment;

FIGS. 7-15 are schematic illustrations of portions of drive motors in accordance with aspects of the disclosed embodiment.

DETAILED DESCRIPTION

Referring to FIGS. 1A-1D, there are shown schematic views of substrate processing apparatus or tools incorporating the aspects of the disclosed embodiment as disclosed further herein. Although the aspects of the disclosed embodiment will be described with reference to the drawings, it should be understood that the aspects of the disclosed embodiment can be embodied in many forms. In addition, any suitable size, shape or type of elements or materials could be used.

Figure 1A:
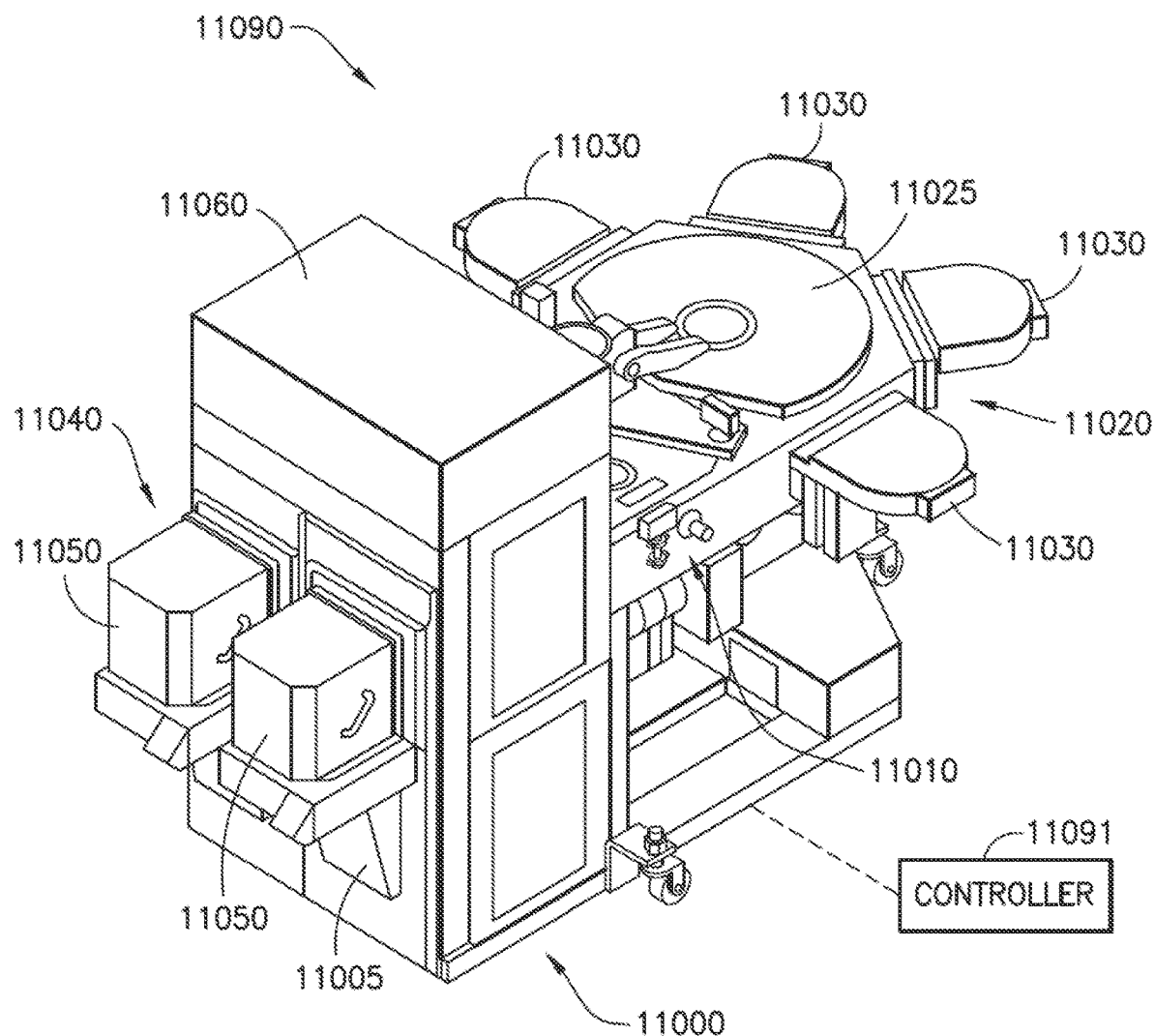
Figure 1B:
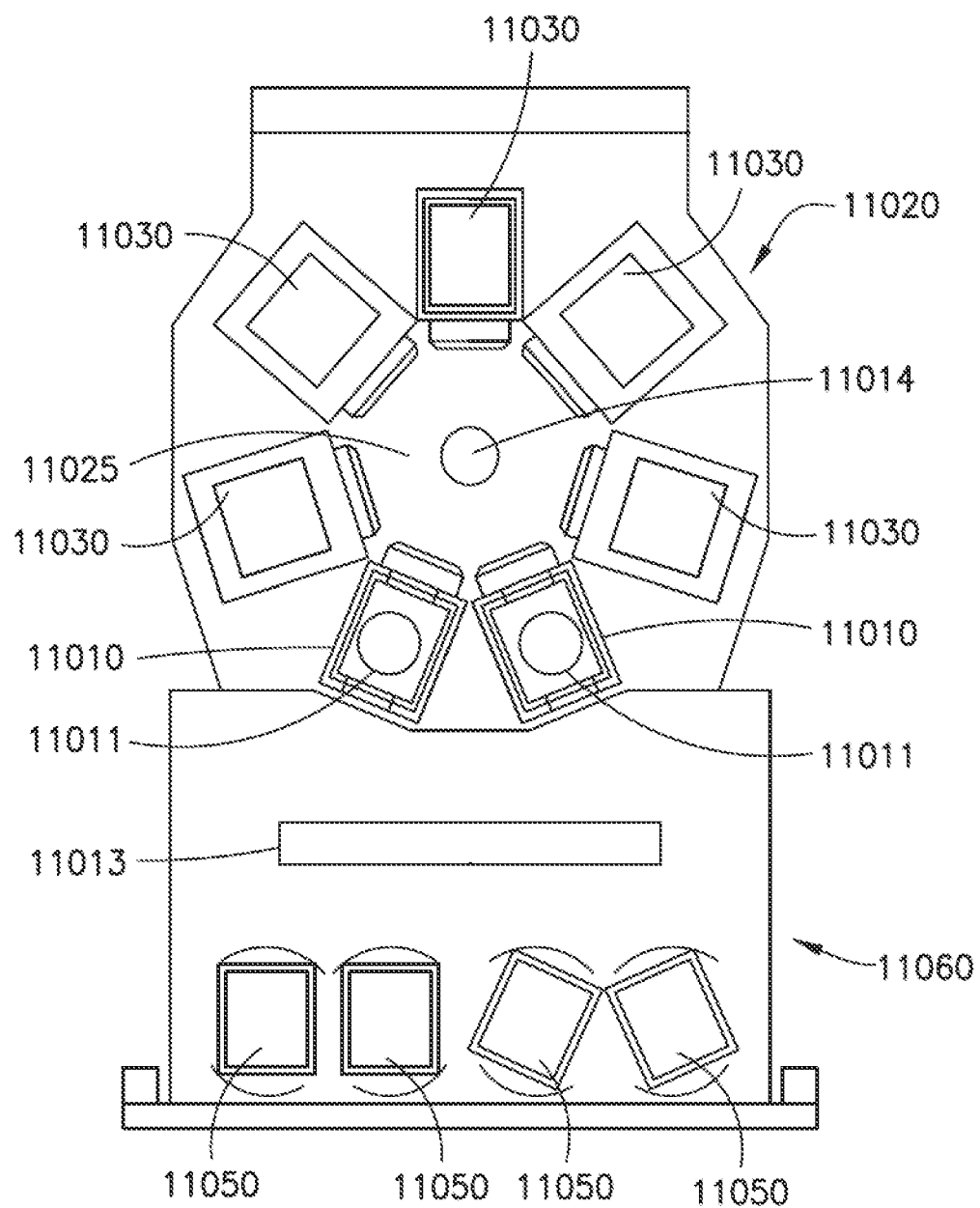

Referring to FIGS. 1A and 1B, a processing apparatus, such as for example a semiconductor tool station 11090 is shown in accordance with an aspect of the disclosed embodiment. Although a semiconductor tool is shown in the drawings, the aspects of the disclosed embodiment described herein can be applied to any tool station or application employing robotic manipulators. In this example the tool 11090 is shown as a cluster tool, however the aspects of the disclosed embodiment may be applied to any suitable tool station such as, for example, a linear tool station such as that shown in FIGS. 1C and 1D and described in U.S. Pat. No. 8,398,355, entitled "Linearly Distributed Semiconductor Workpiece Processing Tool," issued Mar. 19, 2013, the disclosure of which is incorporated by reference herein in its entirety. The tool station 11090 generally includes an atmospheric front end 11000, a vacuum load lock 11010 and a vacuum back end 11020. In other aspects, the tool station may have any suitable configuration. The components of each of the front end 11000, load lock 11010 and back end 11020 may be connected to a controller 11091 which may be part of any suitable control architecture such as, for example, a clustered architecture control. The control system may be a closed loop controller having a master controller, cluster controllers and autonomous remote controllers such as those disclosed in U.S. Pat. No. 7,904,182 entitled "Scalable Motion Control System" issued on Mar. 8, 2011 the disclosure of which is incorporated herein by reference in its entirety. In other aspects, any suitable controller and/or control system may be utilized.

In one aspect, the front end 11000 generally includes load port modules 11005 and a mini-environment 11060 such as for example an equipment front end module (EFEM). The load port modules 11005 may be box opener/loader to tool standard (BOLTS) interfaces that conform to SEMI standards E15.1, E47.1, E62, E19.5 or E1.9 for 300 mm load ports, front opening or bottom opening boxes/pods and cassettes. In other aspects, the load port modules may be configured as 200 mm wafer interfaces or any other suitable substrate interfaces such as for example larger or smaller wafers or flat panels for flat panel displays. Although two load port modules are shown in FIG. 1A, in other aspects any suitable number of load port modules may be incorporated into the front end 11000. The load port modules 11005 may be configured to receive substrate carriers or cassettes 11050 from an overhead transport system, automatic guided vehicles, person guided vehicles, rail guided vehicles or from any other suitable transport method. The load port modules 11005 may interface with the mini-environment 11060 through load ports 11040. The load ports 11040 may allow the passage of substrates between the substrate cassettes 11050 and the mini-environment 11060. The mini-environment 11060 generally includes any suitable transfer robot 11013 which may incorporate one or more aspects of the disclosed embodiment described herein. In one aspect the robot 11013 may be a track mounted robot such as that described in, for example, U.S. Pat. No. 6,002,840, the disclosure of which is incorporated by reference herein in its entirety. The mini-environment 11060 may provide a controlled, clean zone for substrate transfer between multiple load port modules.

The vacuum load lock 11010 may be located between and connected to the mini-environment 11060 and the back end 11020. It is noted that the term vacuum as used herein may denote a high vacuum such as $10^{-5}$ Torr or below in which the substrate are processed. The load lock 11010 generally includes atmospheric and vacuum slot valves. The slot valves may provide the environmental isolation employed to evacuate the load lock after loading a substrate from the atmospheric front end and to maintain the vacuum in the transport chamber when venting the lock with an inert gas such as nitrogen. The load lock 11010 may also include an aligner 11011 for aligning a fiducial of the substrate to a desired position for processing. In other aspects, the vacuum load lock may be located in any suitable location of the processing apparatus and have any suitable configuration.

The vacuum back end 11020 generally includes a transport chamber 11025, one or more processing station(s) 11030 and any suitable transfer robot 11014 which may include one or more aspects of the disclosed embodiments described herein. The transfer robot 11014 will be described below and may be located within the transport chamber 11025 to transport substrates between the load lock 11010 and the various processing stations 11030. The processing stations 11030 may operate on the substrates through various deposition, etching, or other types of processes to form electrical circuitry or other desired structure on the substrates. Typical processes include but are not limited to thin film processes that use a vacuum such as plasma etch or other etching processes, chemical vapor deposition (CVD), plasma vapor deposition (PVD), implantation such as ion implantation, metrology, rapid thermal processing (RTP), dry strip atomic layer deposition (ALD), oxidation/diffusion, forming of nitrides, vacuum lithography, epitaxy (EPI), wire bonder and evaporation or other thin film processes that use vacuum pressures. The processing stations 11030 are connected to the transport chamber 11025 to allow substrates to be passed from the transport chamber 11025 to the processing stations 11030 and vice versa.

Referring now to FIG. 1C, a schematic plan view of a linear substrate processing system 2010 is shown where the tool interface section 2012 is mounted to a transport chamber module 3018 so that the interface section 2012 is facing generally towards (e.g. inwards) but is offset from the longitudinal axis X of the transport chamber 3018. The transport chamber module 3018 may be extended in any suitable direction by attaching other transport chamber modules 3018A, 3018I, 3018J to interfaces 2050, 2060, 2070 as described in U.S. Pat. No. 8,398,355, previously incorporated herein by reference. Each transport chamber module 3018, 3019A, 3018I, 3018J includes any suitable substrate transport 2080, which may include one or more aspects of the disclosed embodiment described herein, for transporting substrates throughout the processing system 2010 and into and out of, for example, processing modules PM. As may be realized, each chamber module may be capable of holding an isolated or controlled atmosphere (e.g. N2, clean air, vacuum).

Figure 1D:
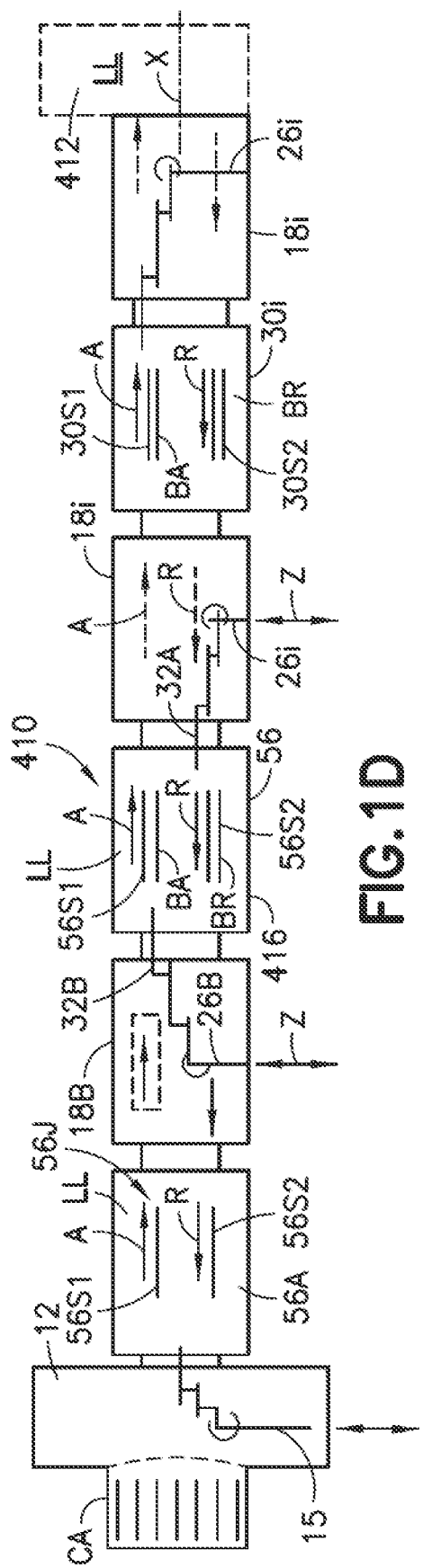

Referring to FIG. 1D, there is shown a schematic elevation view of an exemplary processing tool 410 such as may be taken along longitudinal axis X of the linear transport chamber 416. In the aspect of the disclosed embodiment shown in FIG. 1D, tool interface section 12 may be representatively connected to the transport chamber 416. In this aspect, interface section 12 may define one end of the tool transport chamber 416. As seen in FIG. 1D, the transport chamber 416 may have another workpiece entry/exit station 412 for example at an opposite end from interface station 12. In other aspects, other entry/exit stations for inserting/removing workpieces from the transport chamber may be provided. In one aspect, interface section 12 and entry/exit station 412 may allow loading and unloading of workpieces from the tool. In other aspects, workpieces may be loaded into the tool from one end and removed from the other end. In one aspect, the transport chamber 416 may have one or more transfer chamber module(s) 18B, 18*i*. Each chamber module may be capable of holding an isolated or controlled atmosphere (e.g. N2, clean air, vacuum). As noted before, the configuration/arrangement of the transport chamber modules 18B, 18*i*, load lock modules 56A, 56B and workpiece stations forming the transport chamber 416 shown in FIG. 1D is merely exemplary, and in other aspects the transport chamber may have more or fewer modules disposed in any desired modular arrangement. In the aspect shown, station 412 may be a load lock. In other aspects, a load lock module may be located between the end entry/exit station (similar to station 412) or the adjoining transport chamber module (similar to module 18*i*) may be configured to operate as a load lock. As also noted before, transport chamber modules 18B, 18*i* have one or more corresponding transport apparatus 26B, 26*i*, which may include one or more aspects of the disclosed embodiment described herein, located therein. The transport apparatus 26B, 26*i* of the respective transport chamber modules 18B, 18*i* may cooperate to provide the linearly distributed workpiece transport system 420 in the transport chamber. In this aspect, the transport apparatus 26B may have a general SCARA arm configuration (though in other aspects the transport arms may have any other desired arrangement such as a frog-leg configuration, telescopic configuration, bi-symmetric configuration, etc.). In the aspect of the disclosed embodiment shown in FIG. 1D, the arms of the transport apparatus 26B may be arranged to provide what may be referred to as fast swap arrangement allowing the transport to quickly swap wafers from a pick/place location as will also be described in further detail below. The transport arm 26B may have a suitable drive section, such as that described below, for providing each arm with any suitable number of degrees of freedom (e.g. independent rotation about shoulder and elbow joints with Z axis motion). As seen in FIG. 1D, in this aspect the modules 56A, 56, 30*i* may be located interstitially between transfer chamber modules 18B, 18*i* and may define suitable processing modules, load lock(s), buffer station(s), metrology station(s) or any other desired station(s). For example the interstitial modules, such as load locks 56A, 56 and workpiece station 30*i*, may each have stationary workpiece supports/shelves 6S, 56S1, 56S2, 30S1, 30S2 that may cooperate with the transport arms to effect transport or workpieces through the length of the transport chamber along linear axis X of the transport chamber. By way of example, workpiece(s) may be loaded into the transport chamber 416 by interface section 12. The workpiece(s) may be positioned on the support(s) of load lock module 56A with the transport arm 15 of the interface section. The workpiece(s), in load lock module 56A, may be moved between load lock module 56A and load lock module 56 by the transport arm 26B in module 18B, and in a similar and consecutive manner between load lock 56 and workpiece station 30$i$ with arm 26$i$ (in module 18$i$) and between station 30$i$ and station 412 with arm 26$i$ in module 18$i$. This process may be reversed in whole or in part to move the workpiece(s) in the opposite direction. Thus, in one aspect, workpieces may be moved in any direction along axis X and to any position along the transport chamber and may be loaded to and unloaded from any desired module (processing or otherwise) communicating with the transport chamber. In other aspects, interstitial transport chamber modules with static workpiece supports or shelves may not be provided between transport chamber modules 18B, 18$i$. In such aspects, transport arms of adjoining transport chamber modules may pass off workpieces directly from end effector or one transport arm to end effector of another transport arm to move the workpiece through the transport chamber. The processing station modules may operate on the substrates through various deposition, etching, or other types of processes to form electrical circuitry or other desired structure on the substrates. The processing station modules are connected to the transport chamber modules to allow substrates to be passed from the transport chamber to the processing stations and vice versa. A suitable example of a processing tool with similar general features to the processing apparatus depicted in FIG. 1D is described in U.S. Pat. No. 8,398,355, previously incorporated by reference in its entirety.

Figure 1E:
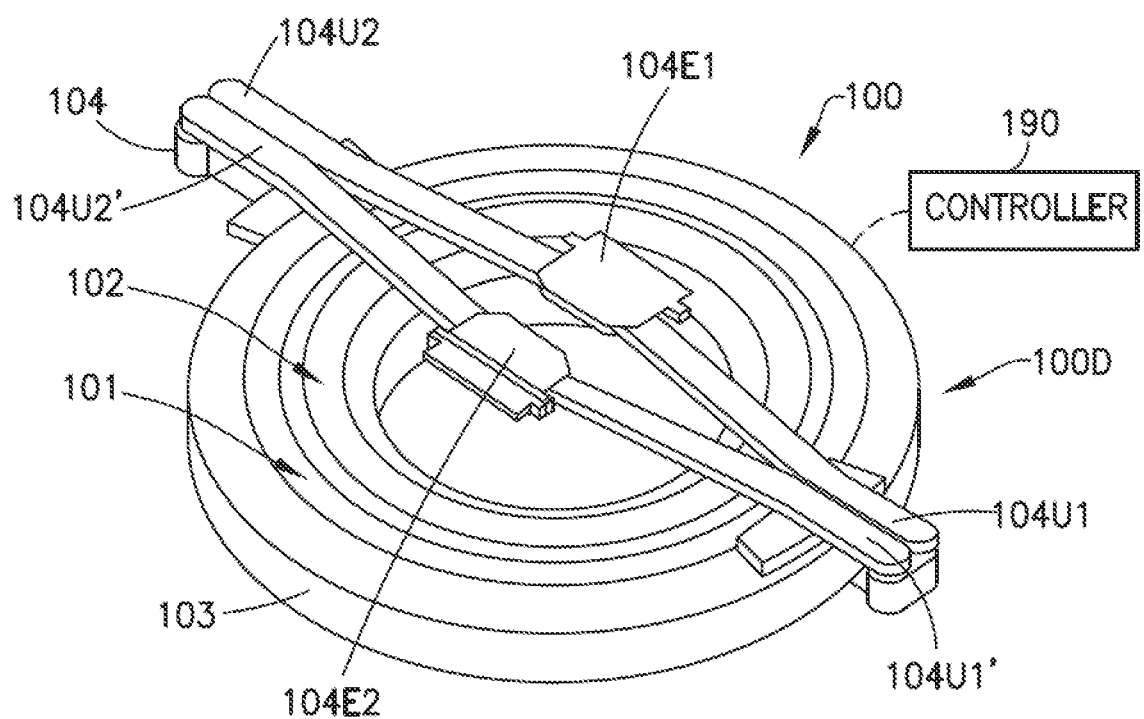
FIG. 1E is a schematic illustration of a transport apparatus in accordance with aspects of the disclosed embodiment.

FIG. 1E illustrates a substrate transport apparatus 100 in accordance with an aspect of the disclosed embodiment. It is noted that the aspects of the disclosed embodiment described herein may be employed for vacuum (such as e.g. a high vacuum which may be $10^{-5}$ Torr and below or any other suitable vacuum) and/or atmospheric robot applications where the rotor and position feedback moving parts are isolated from their stationary electrical counterparts (e.g. read heads and stators). Generally the aspects of the disclosed embodiment include one or more switched reluctance motors for operating any suitable robot arm. The moving parts of the robot drive may be located within a sealed or otherwise isolated environment which can be a controlled environment such as a vacuum environment or an atmospheric pressure environment. A non-magnetic separation or isolation wall (which will be described in greater detail below) made of any suitable material may be disposed between the moving parts of the drive (e.g. the rotor and feedback moving parts) and the stationary parts of the drive (e.g. the stator and the position sensor read-heads). However, unlike conventional isolation walls, the isolation walls described below may provide a minimized air gap between the stator and rotor that is substantially not limited by or independent of a thickness of the isolation wall.

As may be realized, electrical components and/or permanent magnets may not be located within the isolated environment. The drive elements located within the isolated environment may include one or more ferromagnetic rotors with salient (no magnets) poles, one or more ferromagnetic position feedback scales or tracks (no magnets) and one or more drive shafts with support bearings or in other aspects without support bearings where a self-bearing motor is provided. The rotor, position feedback scales or tracks and the drive shafts may be rigidly attached to one another and supported within the isolated environment in any suitable manner, such as with bearings or substantially without contact (e.g. such as in a self-bearing motor). One or more drive shafts of the drive assembly may be connected in any suitable manner to respective linkages of a robot arm to provide direct drive capability of the robot arm(s).

The stator and position sensor read heads may be located outside the isolated environment. The read heads may be any suitable type of sensors such as, for example, magnetic transducers. In one aspect the read head may provide a magnetic field source and sensing of the magnetic flux that flows between the read head and the ferromagnetic scales or tracks disposed within the isolated environment. In one aspect the position feedback read heads and tracks described herein may include a variable reluctance circuit substantially similar to that described in U.S. Pat. No. 7,834,618 entitled "Position Sensor System" and issued on Nov. 16, 2010, the disclosure of which is incorporated herein by reference in its entirety. In other aspects the position feedback apparatus may be any suitable type of position feedback apparatus such as optical, capacitive, inductive or other type of position encoding apparatus.

The one or more stators of the drive assembly may provide a magnetic field by energizing their respective phases with the appropriate sequence and phase current magnitude resulting in a desired amount of torque specified by any suitable controller, such as controller 190 which in one aspect may be substantially similar to or incorporated within controller 11091. As may be realized, reluctance motors may exhibit nonlinearities and torque ripple, such as when in a three-phase configuration. The controller 190 may be configured to account for the nonlinearities and torque ripple during operation of the robot drives described herein. Referring to FIG. 1F the control structure of the controller 190 may include a motion control module 190A, a commutation algorithm module 190B and a current control module 190C arranged in, for example, a cascaded manner. In other aspects the controller 190 may include any suitable computational/control modules arranged in any suitable manner. The motion control module 190A may be configured to determine the commanded torques $T_{cmdi}$ (where i=1, 2, ..., M and M is the total number of axes of motion of the robot drive) for the robot motors from or based on the commanded positions for the robot motors $\theta_{cmdi}$ and actual positions of the robot motors $\theta_i$ obtained from one or more of the encoders 177 (which may include the read heads and tracks described herein).

The commutation algorithm module 190B may be configured to calculate the commanded phase currents $i_{cmdj}$ (where j=1, 2, ..., N and N is the total number of phases of each motor) for each motor from or based on the commanded torque $T_{cmdi}$ for each of the robot motors. For exemplary purposes only, a single motor 177M is shown in FIG. 1F but in other aspects any suitable number of motors may be employed. The commutation algorithm module 190B may be configured to determine the commanded phase currents $i_{cmdj}$, as a function of the commanded torque $T_{cmdi}$ and actual position of the motor $\theta_i$, from or based on an inverse of the torque-phase-position relationship of equation [1]. As may be realized, in one aspect a lookup table may be used to determine the commanded phase currents $i_{cmdj}$.

$$T_i \Sigma_{j=1}^{N} f[i_j, \theta + 2\pi(j-1)/N], \ i=1,2,\ldots,M \quad [1]$$

The current controller 190C may be configured to calculate voltages for the motor phases $u_j$ to produce phase currents $i_j$ that closely follow the commanded values of $i_{cmdj}$.

A model based approach or any other suitable approach may be used to improve the performance of the current control section of the controller 190.

Referring again to FIG. 1E, the substrate transport apparatus 100 may include a direct drive motor arrangement with, for example, reluctance based actuation (e.g. variable/switched reluctance motors) and reluctance based sensing (e.g. position feedback). In other aspects any suitable actuators and sensors may be used. The switched reluctance motors may substantially eliminate or otherwise reduce the presence of magnets and bonded joints from the rotor of the robot drive. The reluctance based position feedback, which may be substantially similar to that described in U.S. Pat. No. 7,834,618 (the disclosure of which is incorporated herein by reference in its entirety), may provide for sensing a position of the rotor in a non-intrusive manner through, for example, an isolation wall of the motor, such that the sensor read head is not exposed to a vacuum and/or aggressive and corrosive environments as will be described in greater detail below. As noted above, the substrate transport apparatus 100, as well as the other transport apparatus described herein, may include a controller 190 configured to reduce torque ripple of the switched reluctance motor to achieve, for example, a smooth (e.g. without jerking) motion for direct drive substrate transport applications. It is noted that the motor and position sensing arrangements described herein may be used together as described herein and/or independently in combination with any other suitable actuation or position sensing technology.

The reluctance based actuation and position sensing arrangements described herein may be used in any suitable robot drive architectures with one or more axes of motion (e.g. degrees of freedom). One and two axis robot drive configurations (e.g. including but not limited to planar/pancake drive configurations, stacked drive configurations, bearingless drive configurations and integrated drive/pump configurations) which are suitable for driving single and dual end effector robot arms are described herein for exemplary purposes only but it should be understood that the aspects of the invention described herein are applicable to any suitable substrate transport drives having any desired number of axes of motion for driving any suitable number of robot arms.

In one aspect the substrate transport apparatus 100 is shown as having a low profile planar or "pancake" style robot drive configuration substantially similar to those described in U.S. Pat. No. 8,008,884 entitled "Substrate Processing Apparatus with Motors Integral to Chamber Walls" issued on Aug. 30, 2011 and U.S. Pat. No. 8,283,813 entitled "Robot Drive with Magnetic Spindle Bearings" issued on Oct. 9, 2012, the disclosures of which are incorporated by reference herein in their entireties. It is noted that due to, for example, the comparatively large rotor diameters and high torque capabilities the pancake style drive configurations may offer a direct drive alternative to harmonic drive robots for high/heavy payload applications. In other aspects any suitable harmonic drive may be coupled to an output of the motors described herein for driving one or more robotic arms. The pancake style drive configurations may also allow for a hollow central drive section which can accommodate a vacuum pump inlet and/or support partial or full integration of vacuum pumping arrangement within the robot drive, such as in compact vacuum chambers with limited space around the robot drive or any other suitable chamber in which the robot drive is at least partially disposed.

The substrate transport apparatus 100 may include a reluctance drive 100D having one or more stators and corresponding rotors (which in this aspect include an outer rotor 101 and an inner rotor 102). The rotors 101, 102 may be actuated by their respective stators through an enclosure or isolation wall 103 (which will be described in greater detail below) based on the reluctance motor principle described herein.

Figure 1G:
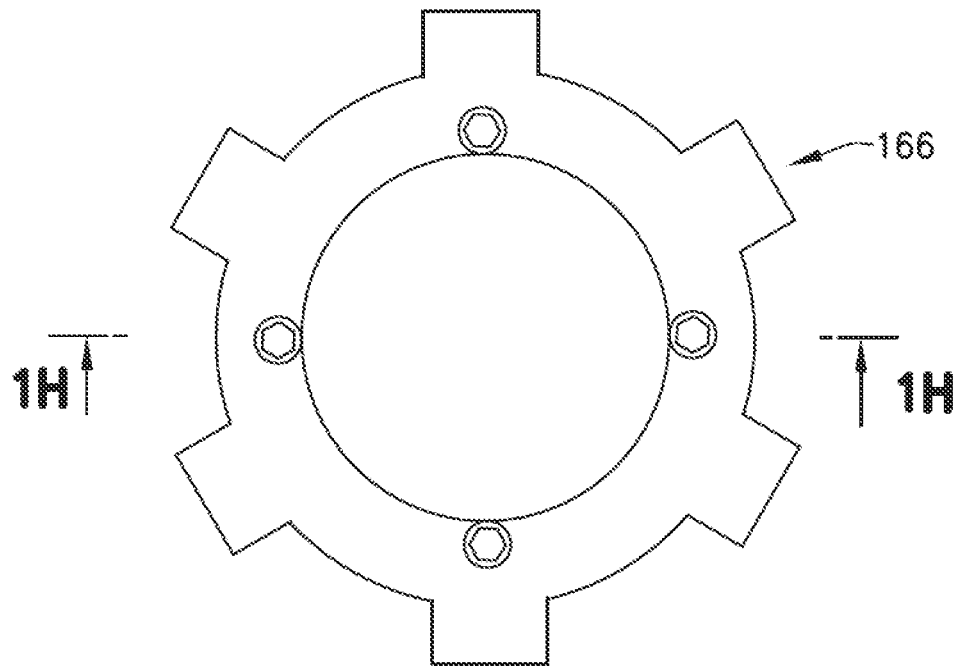
Figure 1F:
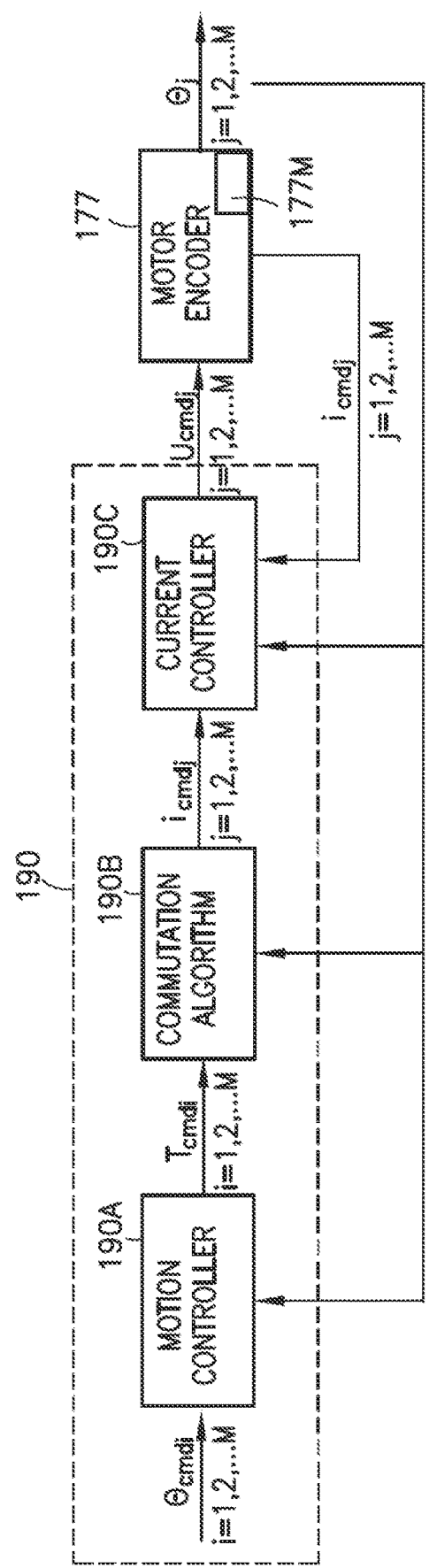
FIG. 1F is a schematic illustration of a control in accordance with aspects of the disclosed embodiment.
Figure 1H:
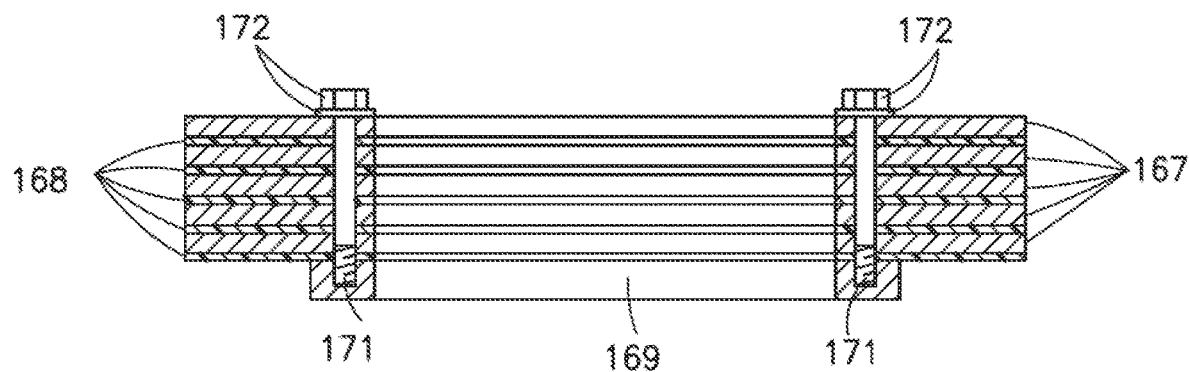
Figure 1I:
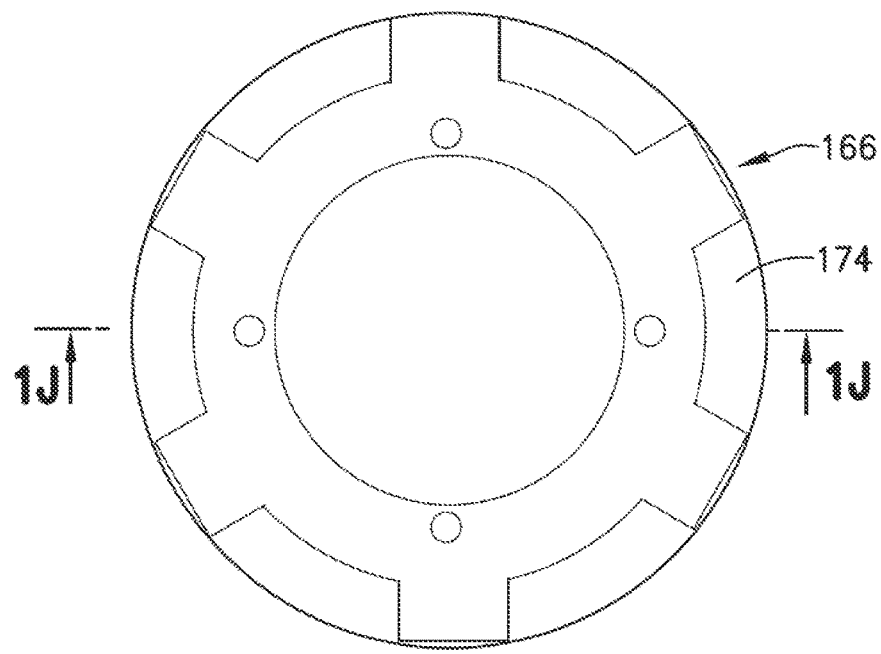
Figure 1J:
Figure 1K:
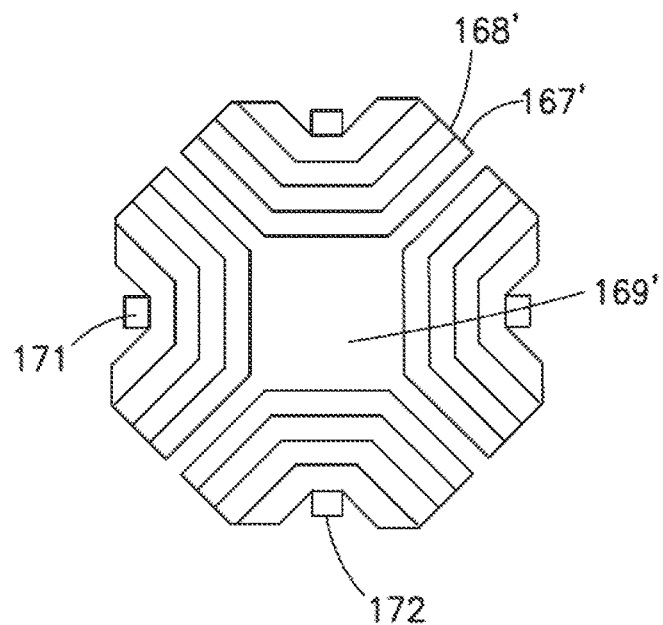

In one aspect, referring to FIGS. 1G and 1H which illustrate top and side cross section views of a rotor 166 in accordance with aspects of the disclosed embodiment, the rotor 166 may be laminated rotor. The rotor 166 may be substantially similar to the rotors described herein and include a set of alternately stacked laminations of ferromagnetic material layers 167 and non-conductive layers 168 which in this example are stacked along an axis of rotation of the rotor (e.g. so that the laminations extend radially from the axis of rotation) to form a radially laminated rotor where the flux flows along the laminations. In other aspects the laminations may be arranged in any suitable manner, such as along the axis of rotation to form an axially laminated rotor as shown in FIG. 1K which illustrates a top view of the axially laminated rotor. Here, in a manner substantially similar to that described below with respect to the radially laminated rotor, the axially laminated rotor may also have ferromagnetic alternately arranged ferromagnetic layers 167' and non-conductive layers 168'. The axially arranged laminations may be aligned and affixed to a hub or drive shaft 169' in any suitable manner such as with any suitable alignment features 171 and any suitable fasteners 172 in a manner substantially similar to that described below with respect to the radially laminated rotor 166. As such, the aspects of the disclosed embodiment described herein may be applied to axial flux machines and/or radial flux machines. Each layer of material may have any suitable thickness such as for example, from about 0.014 inch to about 0.025 inch or from about 0.35 mm to about 0.65 mm. In other aspects the thickness of each lamination may be greater or less than the approximate ranges of thicknesses described above. As may be realized the thinner that each layer of material (that the magnetic field flows through) is, the lower the Eddy current effects are on the switched reluctance motor. The ferromagnetic material may be stamped (or formed in any suitable manner) sheets of any suitable material such as, for example, 300-series or 400-series stainless steel. The non-conductive layers may be formed of any suitable material such as electric insulating vacuum compatible epoxy and/or thin sheets of vacuum compatible or other materials including but not limited to glass, ceramic, Teflon® and polyester film tape. The stacked laminations 167, 168 may be aligned for assembly in any suitable manner such as with alignment features 171 that are mounted to, for example, a hub 169. In one aspect the alignment features 171 may include a set of pins and the hub 169 may be or form part of a drive shaft such as the drive shafts described herein so that the rotor is affixed substantially directly to the drive shaft. The stacked laminations 167, 168 may be clamped or otherwise held together in any suitable manner such as with clamping features 172. In one aspect the clamping features may be nuts configured for mounting on the alignment features 171. In other aspects the alignment features may be removed and replaced with clamping features such as bolts that pass through the lamination to interface with the hub or drive shaft to which the rotor is mounted. In still other aspects the stacked laminations may be aligned with external fixtures and/or bonded together with vacuum compatible or other suitable bonding agents. Referring also to FIGS. 1I and 1J, in another aspect the stacked laminations 167, 168 may be fully embedded (e.g. wholly enclosed on all sides and sealed) by an exterior shell 174 of any suitable material, such as for example, a vacuum compatible bonding agent in such a way that the laminations are insulated or sealed from, for example, vacuum environment, corrosive environment or other environment in which the robot arm driven by the robot drive operates. Where the rotor is an insulated rotor the ferromagnetic layers 167 may be constructed of any suitable material such as, for example, silicon-steel separated by any suitable electrically insulated material (which may be the same as or different than the material embedding the stacked laminations 167, 168).

In another aspect, as may be realized, the switching frequency may be relatively low in direct drive applications which may allow for the use of a solid stator substantially without excessive levels of losses due to, for example, Eddy currents.

As shown in FIG. 1L the stator 206' of the direct drive motor may be laminated, with laminations (e.g. alternately stacked laminations of ferromagnetic material layers 167" and non-conductive layers 168") configured and formed generally similar to the above-described laminations of the rotor. The laminations may be positioned with respect to the force or torque axis as described for optimal power and minimum losses due to, for example, Eddy currents. As may be realized, portions of the laminated stator exterior of the seal boundary or casement (e.g. wall 103 shown in FIG. 1E containing the sealed environment) may not be sealed and may be exposed to the exterior atmosphere. Accordingly, in accordance with one aspect, the motor drive may comprise a laminated rotor or a solid rotor motivated by switched reluctance via a solid or laminated (in whole or in part) stator.

The drive 100D may carry any suitable robot arm 104 configured to transport, for example, semiconductor wafers, flat panels for flat panel displays, solar panels, reticles or any other suitable payload. In this aspect the robot arm 104 is illustrated as a bi-symmetric type robot arm (e.g. having opposing end effectors that are linked in extension and retraction) where one of the upper arms 104U1, 104U1' is attached to the outer rotor 101 and the other upper arm 104U2, 104U2" is attached to the inner rotor 102. In other aspects, the robot arm may be a SCARA (selective compliant articulated robot arm) arm, telescoping arm or any other suitable arm(s). The operation of the arms may be independent from each other (e.g. the extension/retraction of each arm is independent from other arms), may be operated through a lost motion switch (as will be described below) or may be operably linked in any suitable way such that the arms share at least one common drive axis. As an example, a radial extension move of the either end effector 104E1, 104E2 of the bi-symmetric arm can be performed by substantially simultaneously rotating the outer rotor 101 and inner rotor 102 in opposite directions substantially at the same rate. Rotation of the arm 104 as a unit can be performed by rotating the outer rotor 101 and inner rotor 102 in the same direction as substantially the same rate.

As may be realized, the isolation wall 103 separates, for example, an atmosphere (e.g. a vacuum or other suitable controlled atmosphere) in which the arm 104 operates from a surrounding atmosphere (e.g. an atmospheric environment usually substantially at atmospheric pressure). It is noted that while the outer and inner rotors 101, 102 and robot arm 104 are located within, for example, the vacuum environment, the actuation coils (e.g. stators) of the motors and the position sensors are located in the atmospheric environment. The reluctance motor configuration of the drive 100D and/or the reluctance based feedback position sensors may provide for an isolation wall 103 free from openings, view ports or feed through arrangements. The isolation wall 103 will be described in greater detail below and may be constructed of a non-ferromagnetic or other suitable material that allows for the magnetic field associated with the actuation and position sensing arrangements to pass through the isolation wall 103.

FIGS. 2A and 2B schematically illustrate cross-sections of the exemplary robot drive of FIG. 1E. In one aspect, the inner and outer rotors 101, 102 may be suspended from for example, the motor housing, in any suitable manner such as by bearings 205. In other aspects, the drive 100D may be a self-bearing drive where the rotors 101, 102 are suspended substantially without contact in any suitable manner. Propulsion coils or stators 206 and position sensing read heads 207, 208 may be located in different angular sectors on an opposite side of the isolation wall 103 (e.g. in the atmospheric environment) than the respective rotors 101, 102. The read heads 207 may interact with any suitable absolute scale or track 209 to provide, for example, coarse measurements of absolute position of the respective rotor 101, 102. Read heads 208 may interact with any suitable incremental scale or track 210 to determine a high-resolution position of the respective rotor 101, 102. The tracks 209, 210 may be made of a ferromagnetic or other suitable material so that the tracks 209, 210, for example, close or otherwise affect magnetic circuits with the respective read heads 207, 208. The combination of the measurements obtained from tracks 209, 210 (absolute and incremental) provide total high-resolution absolute position information for the rotors 101, 102.

Figure 3:
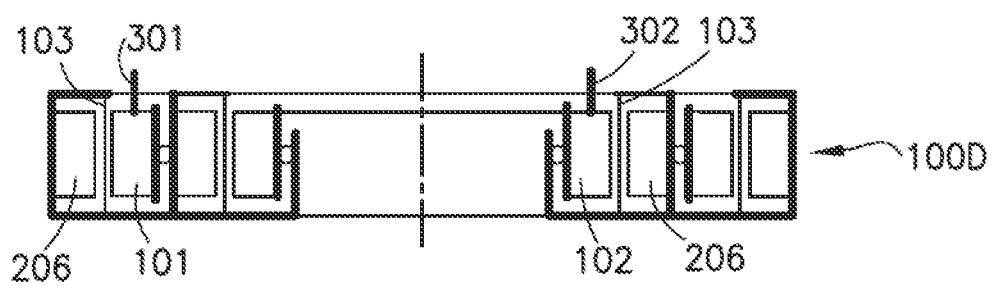
FIGS. 3 and 3A are schematic illustrations of a portion of a drive motor in accordance with aspects of the disclosed embodiment.
Figure 3A:
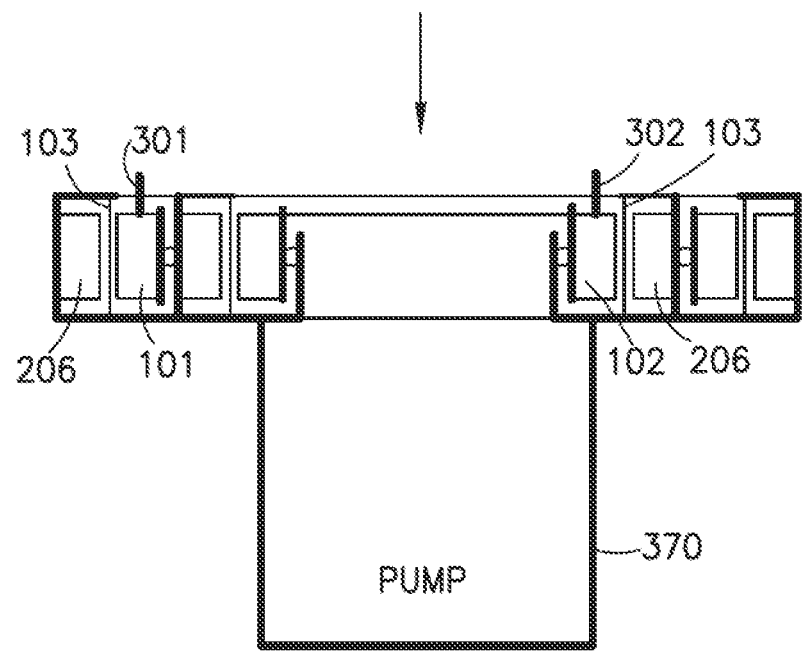

FIG. 3 is a schematic illustration of a cross section of the robot drive 100D of FIG. 1E to exemplify the drive architecture. As may be realized. The stators 206, rotors 101, 102, position sensor read heads 207, 208 and tracks 209, 210 may be arranged as described above with respect to FIGS. 2A and 2B. In other aspects the stators, rotors and position sensors may have any suitable arrangement. As can be seen in FIG. 3, rotor 101 includes a first shaft, post or extension 301 to which one of the upper arms 104U1 (FIG. 1E) is attached and supported. Rotor 102 includes a second shaft, post or extension 302 to which the other upper arm 104U2 (FIG. 1E) is attached and supported. As can be seen in FIG. 3A the two shafts 301, 302 and drive motor arrangement may provide the drive 100D with a hollow center for allowing an inlet of, e.g., a vacuum source 370 (or other suitable peripheral processing device for operation of the transfer chamber in which the arm 104 operates) to be placed at the center of the drive and/or for supporting partial or full integration of vacuum pumping arrangements within the robot drive. The two shafts 301, 302 may also support the arm 104 for rotation of the arm as a unit and/or for the extension/retraction of the end effectors 104E1, 104E2 as described above.

Figure 4:
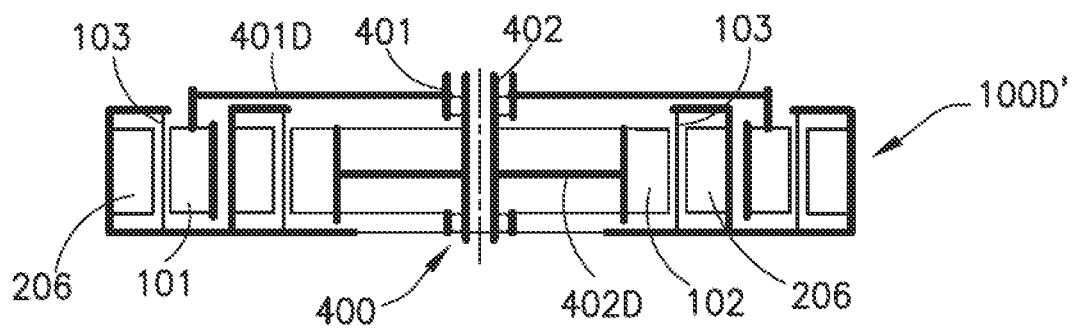
FIG. 4 is a schematic illustration of a portion of a drive motor in accordance with aspects of the disclosed embodiment.

FIG. 4 is a schematic illustration of a cross section of a robot drive 100D' which is substantially similar to drive 100D described above. However, in this aspect the drive includes a substantially centralized (e.g. located substantially concentrically within the stator/rotor arrangement) coaxial drive shaft assembly 400 which may include any suitable number of drive shafts which may correspond to the number of motors included in the robot drive. In this aspect the coaxial drive shaft assembly 400 includes an inner drive shaft 402 and an outer drive shaft 401 that are supported in any suitable manner, such as by bearings. In other aspects, as noted above, the drive may be a self bearing drive such that the drive shaft assembly 400 may be supported (e.g. via connection with the rotors) substantially without contact. In this aspect, the outer drive shaft 401 may be connected to the outer rotor 101 in any suitable manner, such as by drive member 401D while inner drive shaft 402 may be connected to the inner rotor 102 in any suitable manner such as by drive member 402D. As may be realized, this drive arrangement may facilitate connection of a bi-symmetric robot arm assembly, a SCARA type robot arm assembly, a telescoping robot arm assembly, a robot arm assembly having a lost motion switch or any other suitable robot arm assembly that includes one or more robot arms and utilizes a coaxial drive shaft arrangement for operation of the one or more robot arms.

Figure 5:
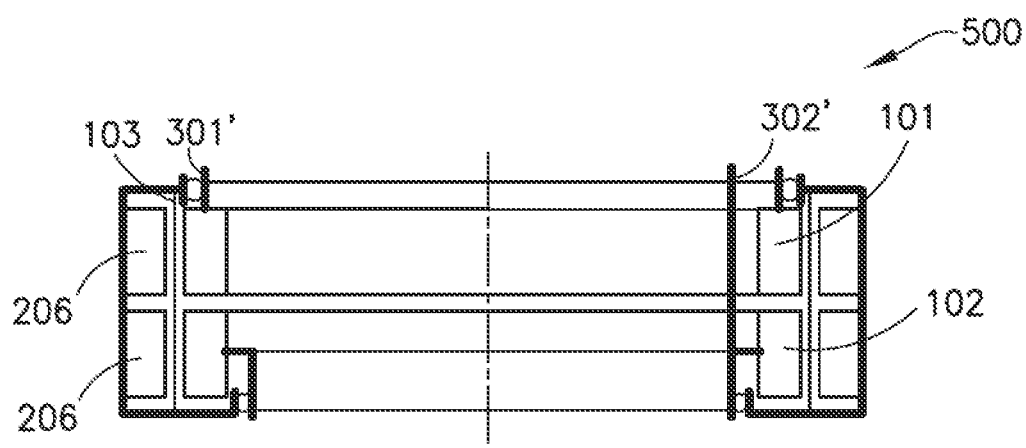
FIGS. 5 and 5A are schematic illustrations of a portion of a drive motor in accordance with aspects of the disclosed embodiment.
Figure 5A:
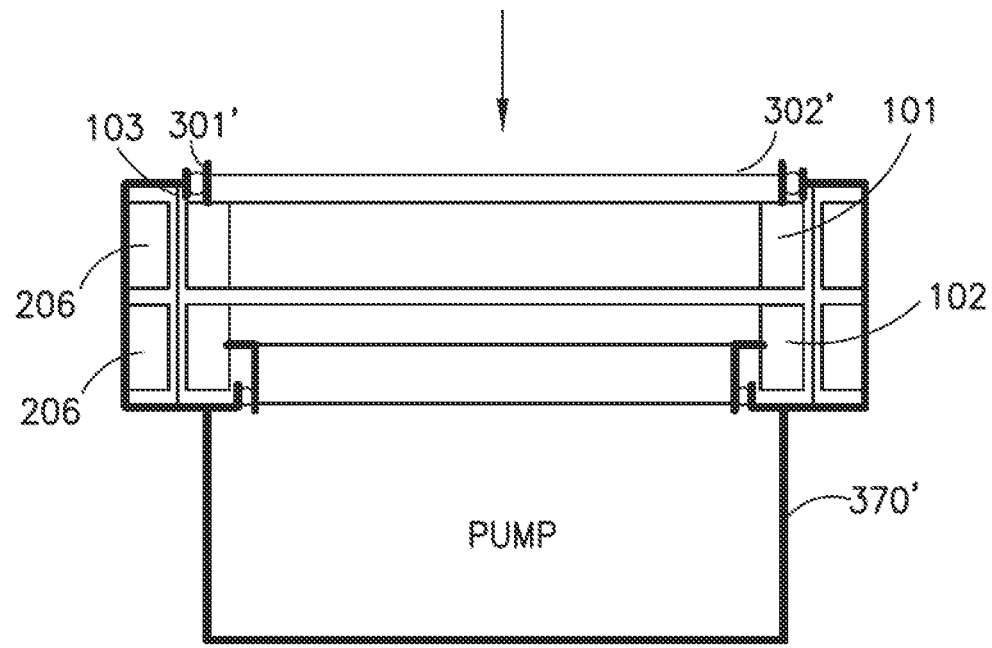

FIG. 5 is a schematic illustration of a cross section of a robot drive 500 which may be substantially similar to drive 100D however, in this aspect the stator 206/rotor 101, 102 pairs may be stacked one above the other. In this aspect, as can be seen in FIG. 5, rotor 101 includes a first shaft 301' to which one of the upper arms 104U1 (FIG. 1E) is attached and supported. Rotor 102 includes a second shaft 302' to which the other upper arm 104U2 (FIG. 1E) is attached and supported. Also, as can be seen in FIG. 5A the two shafts 301', 302' and drive motor arrangement may provide a hollow center of the drive for providing an inlet of a vacuum source 370' (or other suitable peripheral processing device for operation of the transfer chamber in which the arm 104 operates) and/or support partial or full integration of vacuum pumping arrangements within the robot drive in a manner substantially similar to that described above.

Figure 6:
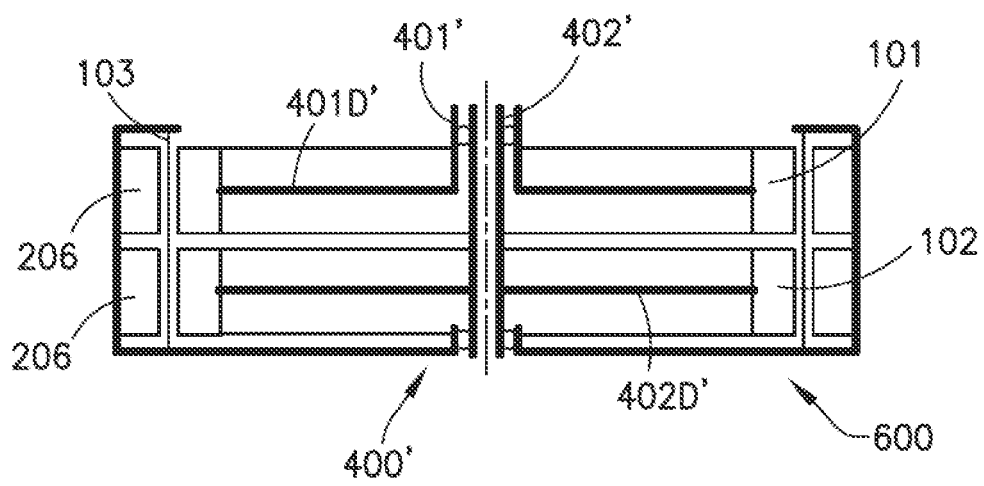
FIG. 6 is a schematic illustration of a portion of a drive motor in accordance with aspects of the disclosed embodiment.

FIG. 6 is a schematic illustration of a cross section of a robot drive 600 which may be substantially similar to drive 100D' however, in this aspect the stator 206/rotor 101, 102 pairs may be stacked one above the other. In this aspect the coaxial drive shaft assembly 400' includes an inner drive shaft 402' and an outer drive shaft 401' that are supported in any suitable manner, as described above. The outer drive shaft 401' may be connected to the outer rotor 101 in any suitable manner, such as by drive member 401D' while inner drive shaft 402' may be connected to the inner rotor 102 in any suitable manner such as by drive member 402D'.

Figure 7:
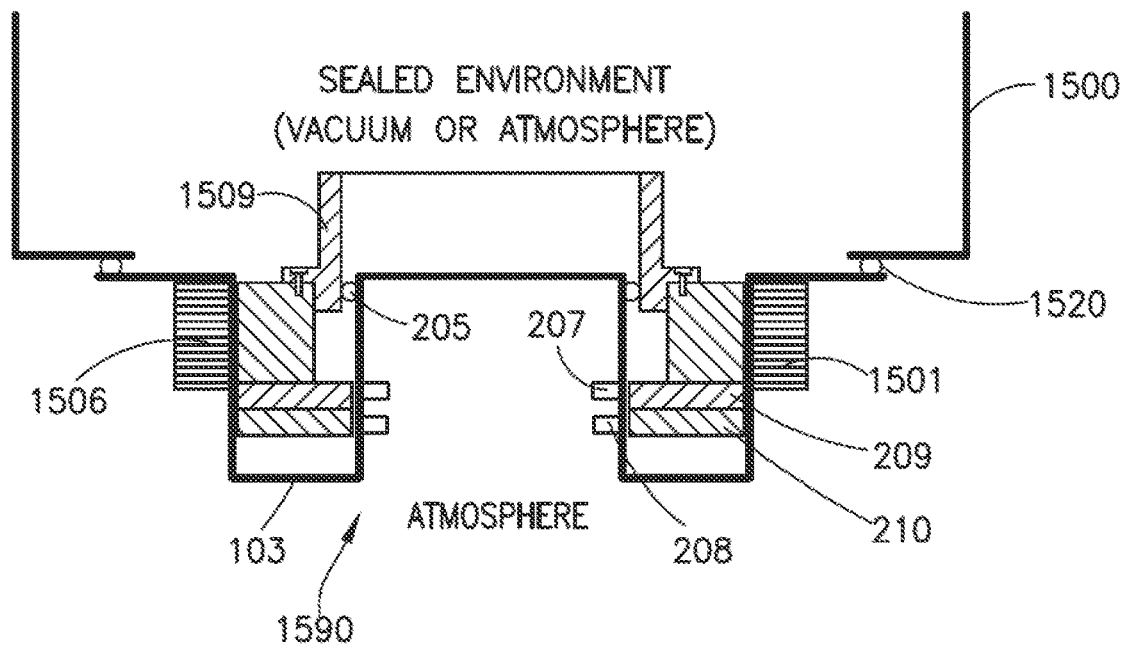
Figure 8:
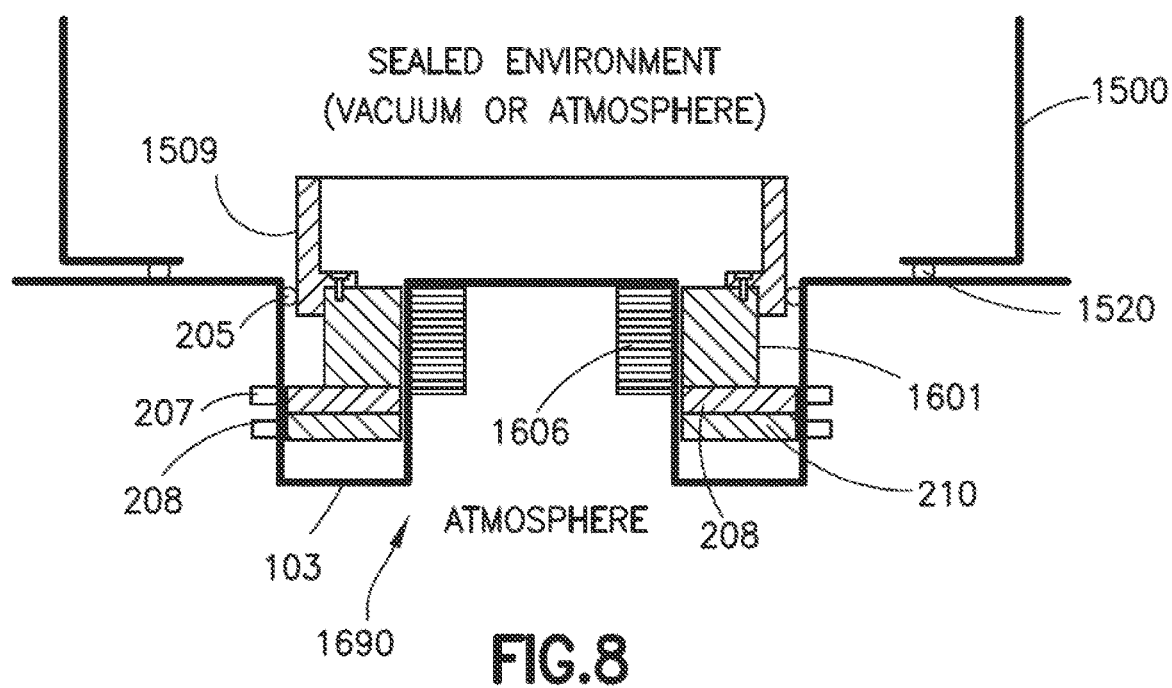

FIGS. 7-15 illustrate additional motor configurations in accordance with aspects of the disclosed embodiments. Referring to FIG. 7, a single axis drive 1590 is illustrated. In this aspect a portion of the transfer chamber 1500 is illustrated such that the isolation wall 103 or other portion of the drive housing interfaces with the transfer chamber 1500 housing where the interface is an isolation interface 1520. The isolation interface may be any suitable sealed interface for isolating environments such as, for example, an o-ring. Here a single drive shaft 1509 is coupled to rotor 1501. The stator 1506 is positioned outside the rotor 1501 so that the stator 1506 substantially surrounds the rotor 1501. FIG. 8 also illustrates a single axis drive 1690 that is substantially similar to drive 1590 shown in FIG. 7. However, the drive 1690 is arranged so that the stator 1606 is disposed inside the rotor 1601 such that the rotor 1601 substantially surrounds the stator 1606.

It is noted that additional drive axes (e.g. degrees of freedom) can be added by stacking the drives either in a vertical and/or radial direction and utilizing coaxial drive shaft arrangements to transmit torque to one or more robotic arms. Here, the rotors, stators and position feedback read heads and tracks may be substantially the same for each axis of motion. For example, referring to FIG. 9, a pancake type drive 1790, substantially similar to drive 100D' described above, is shown having coaxial drive shafts 1509A, 1509B. As can be seen in FIG. 9, the drive 1790 is arranged so that each stator 1506 is disposed outside its respective rotor 1501, 1502 so that the stators 1506 substantially surround their respective rotors 1501, 1502 and one motor substantially surrounds another one of the motors (e.g. one motor is nested within another of the motors). FIG. 10 illustrates a drive 1890 substantially similar to drive 1790 however, in this aspect the stators 1506 are disposed inside the respective rotors 1501, 1502 so that the rotors 1501, 1502 substantially surround their respective stators 1506.

Figure 11:
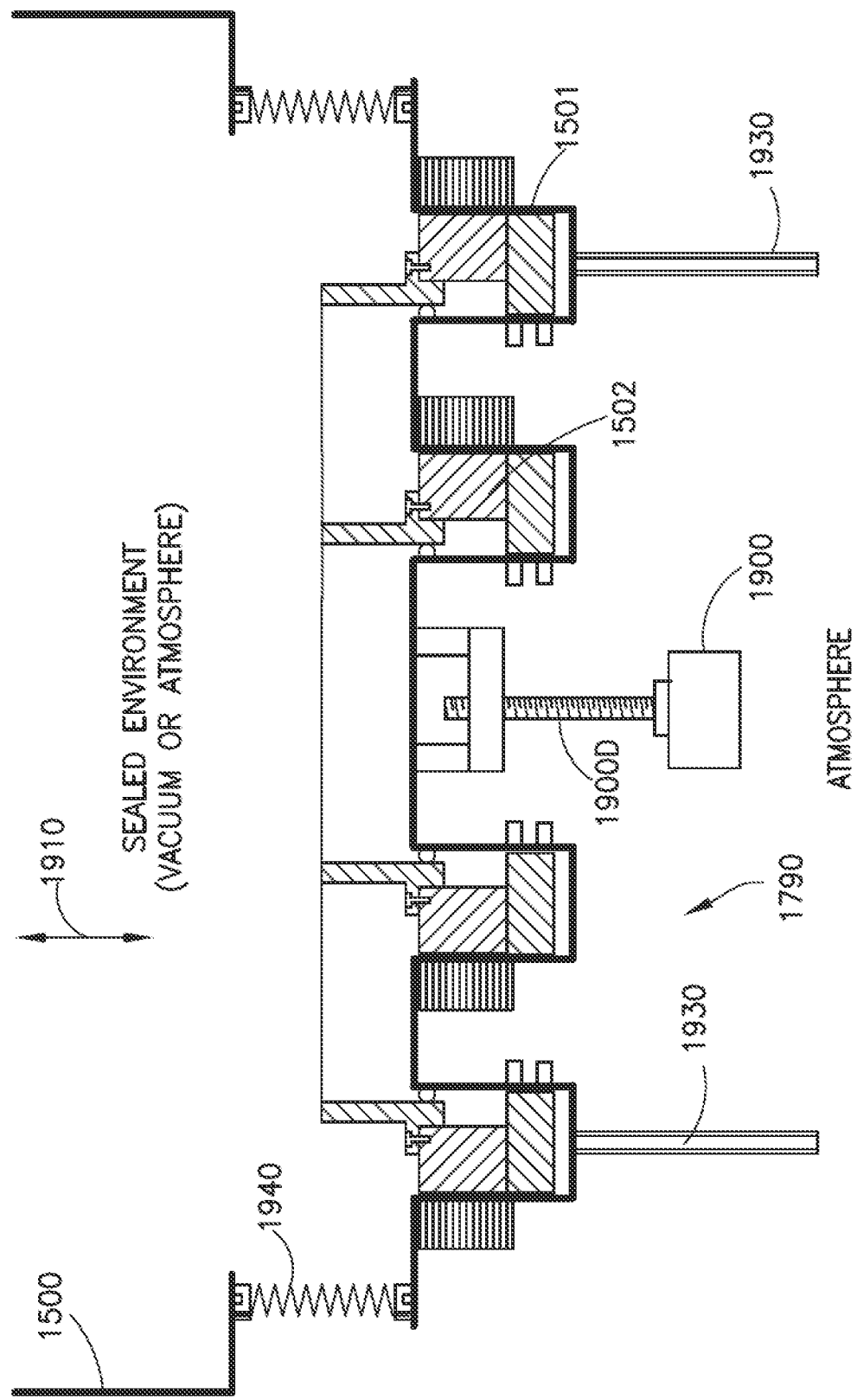
Figure 12:
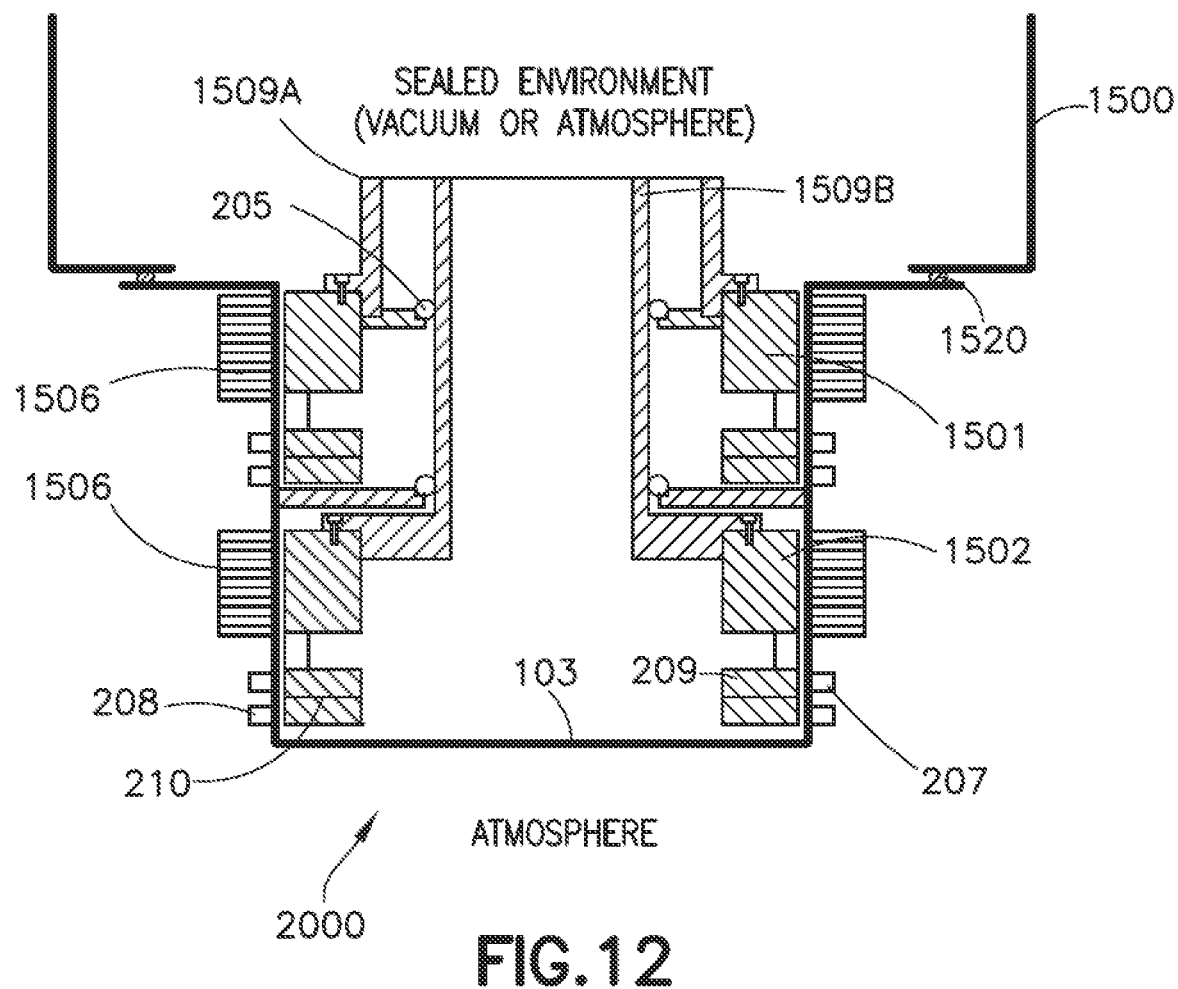
Figure 13:
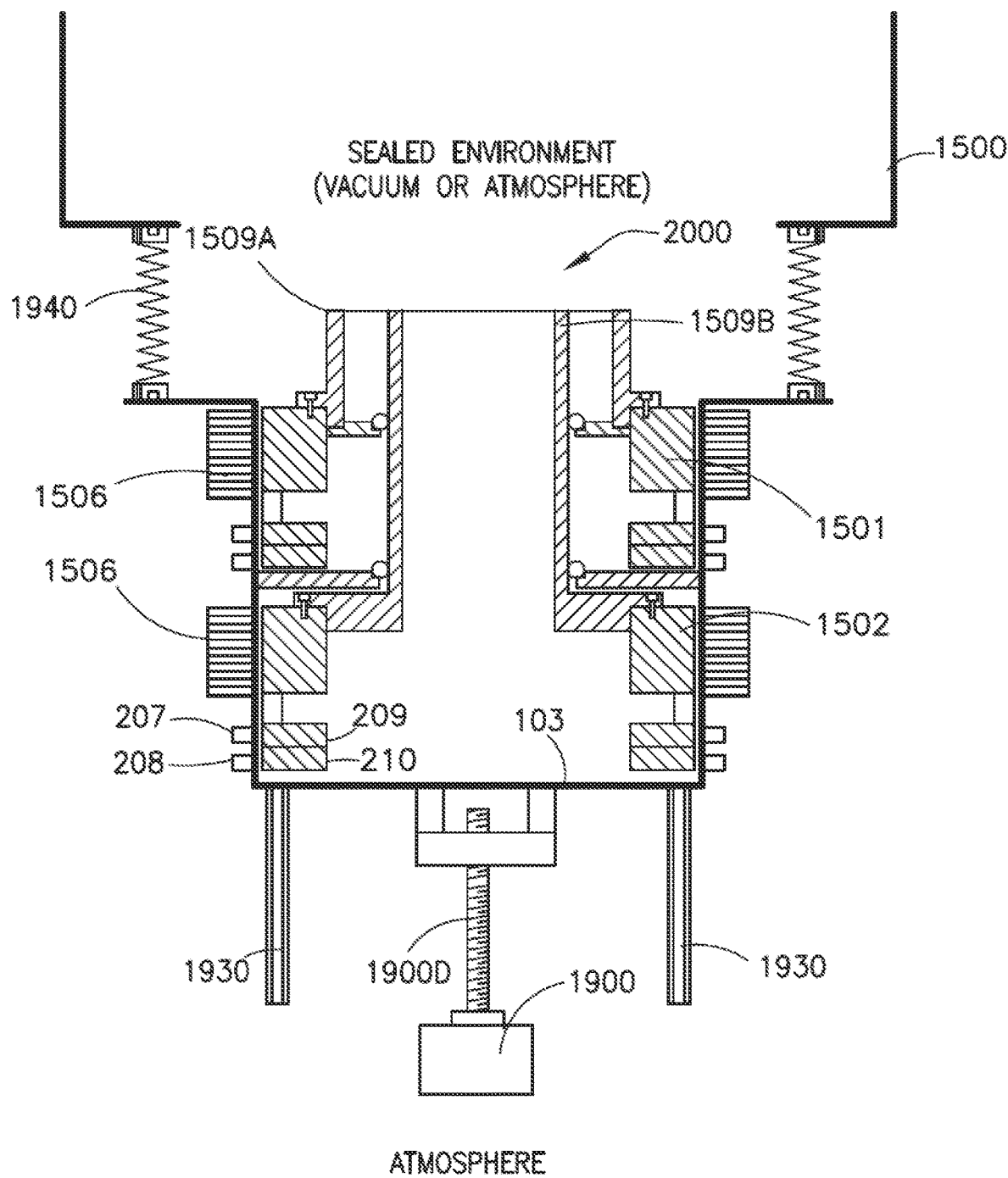
Figure 14:
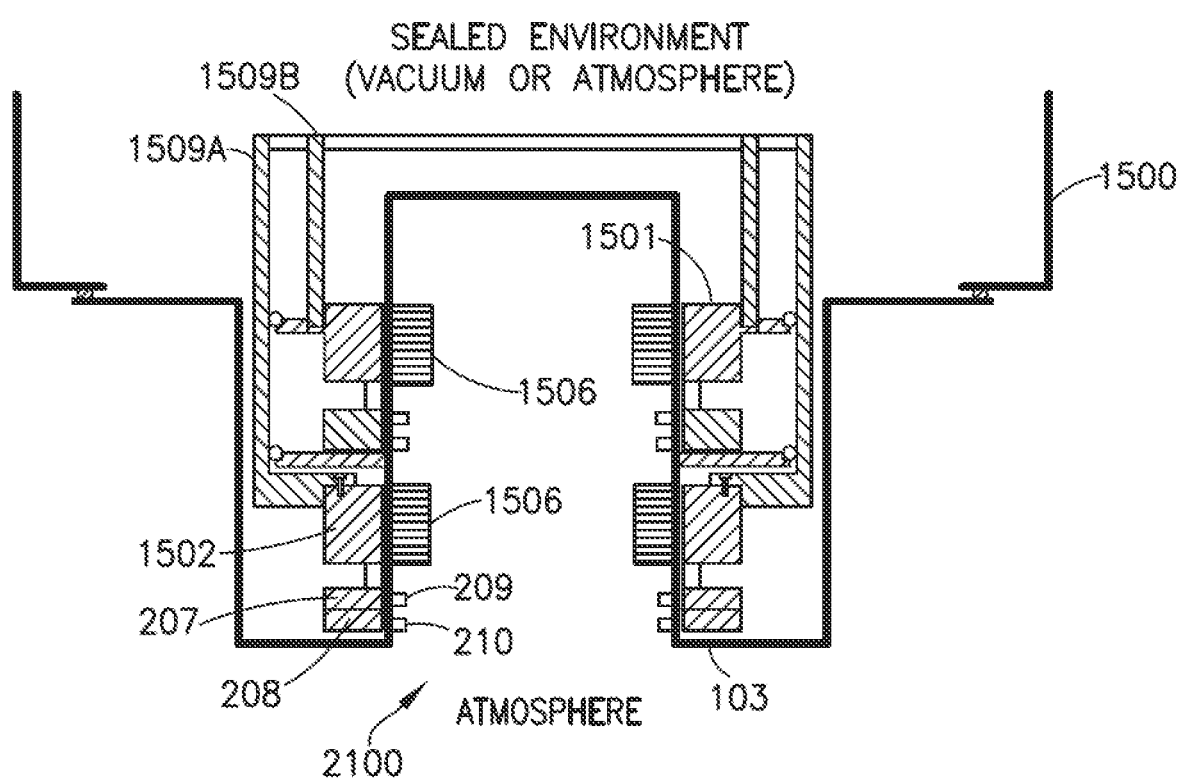
Figure 15:
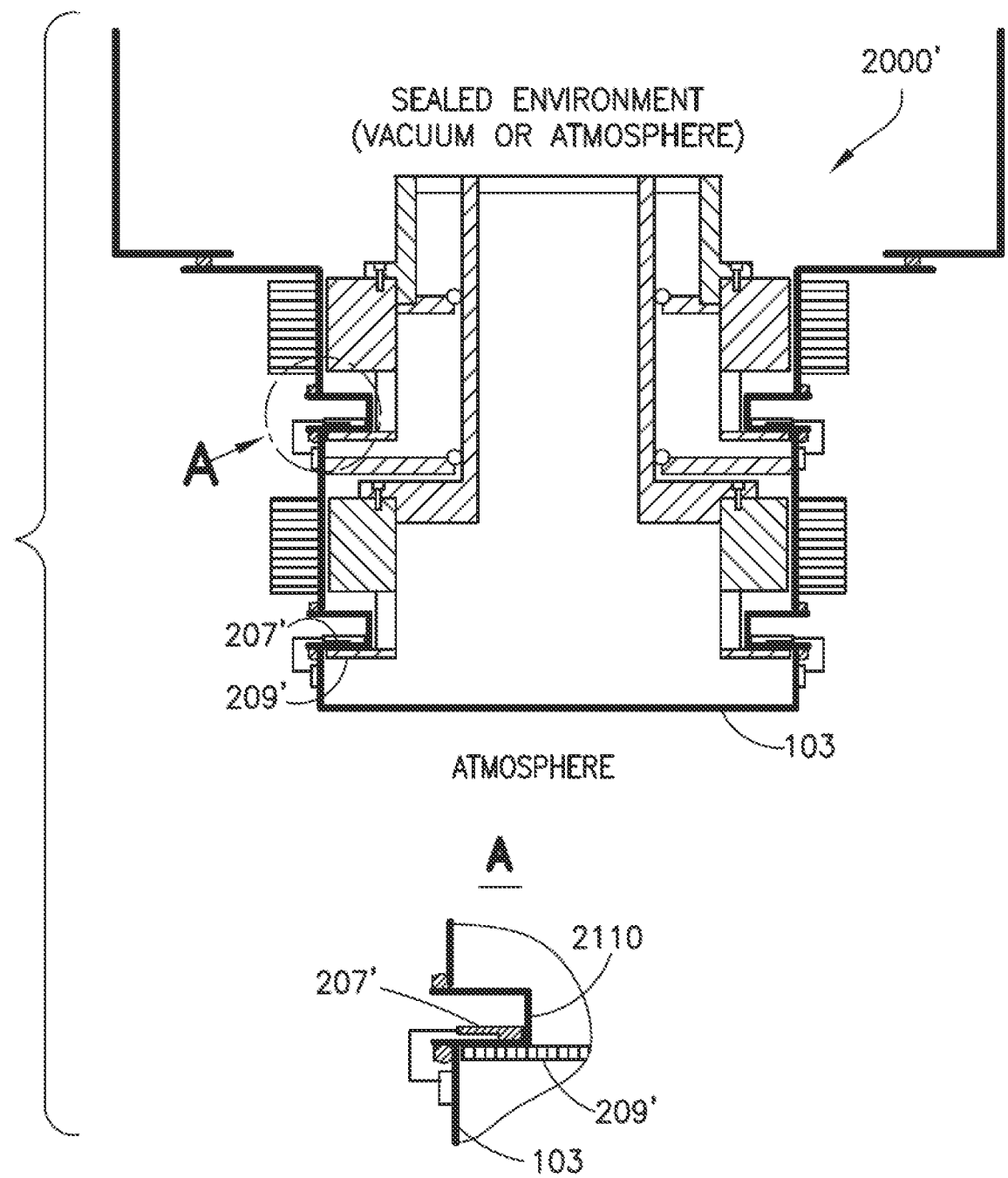

As may be realized a Z-axis drive may be added to any of the robot drives described herein. For example, FIG. 11 illustrates any suitable Z-axis drive 1900 connected to drive 1790 for moving the drive 1790 in the direction of arrow 1910 (e.g. in a direction substantially parallel with an axis of rotation of the drive rotors. Any suitable guides, such as rails 1930 may be provided for guiding the Z-axis movement of the drive 1790. The Z-axis drive may include any suitable linear drive mechanism 1900D such as, for example, a ball screw drive mechanism, a linear magnetic drive, a scissor type lift or any other suitable mechanism capable of translating the drive 1790 along a linear path. Any suitable flexible seal 1940, such as a bellows, may be provided at the interface between the stator housing (or isolation wall 103) and drive housing for sealing the interface between the drive and the transfer chamber 1500 housing. FIG. 12 illustrates a two-axis drive 2000 substantially similar to those described above where the drive motors are vertically stacked one above the other. FIG. 13 illustrates the two-axis drive 2000 having Z-axis drive 1900. Again, it is noted that while one and two axis drives are described herein, in other aspects the drive may have any suitable number of drive axes. As can be seen in FIGS. 11 and 12 the vertically stacked motors are arranged so that the stators 1506 are positioned outside their respective rotors 1501, 1502. FIG. 14 illustrates a drive 2100 having a vertically stacked motor arrangement where the stators 1506 are disposed inside their respective rotors 1501, 1502 so that the rotors 1501, 1502 substantially surround their respective stators 1506.

In another aspect, the position feedback read heads and tracks may be configured such that the read heads are modules that can be inserted and removed from the drive housing or isolation wall 103. For example, referring to FIG. 15, drive 2000' is shown. Drive 2000' may be substantially similar to drive 2000 described above. However, the track 209' may be arranged so that the read head 207' may interface with the track from above or below rather than radially (as shown in, e.g., FIG. 12). The read head 207' may be disposed in a removable read head insert or module 2110 that may be in sealed attachment to and removable from the isolation wall 103 or housing of the drive 2000'. Any suitable seal may be provided at the interface between the module 2110 and the isolation wall 103 or drive housing. In other aspects, the module 2110 or sensor/track separation wall can be machined into the drive housing. This drive housing can be stacked with another drive housing where a static seal, such as an o-ring, is located in between the drive housings. In one aspect, the track 209' may be a combined track in that it includes both incremental and absolute tacks. The read head 207' may be configured to so that both the absolute and incremental tracks are read by the read head 207'. In other aspects multiple tracks may be provided along with one or more modules 2110 having one or more read-heads for reading each of the incremental and absolute tracks. In still other aspects, the removable read head module and position feedback track may be configured so that the read head of the module may be positioned radially with respect to the track (as shown in FIG. 12).

As noted above, in one aspect the switched reluctance motor robot drive arrangement described herein may be part of or otherwise comprise a self-bearing drive where active and passive magnetic forces suspend the rotating parts of the robot drive (and the robot arms) in place of mechanical bearings as described in U.S. patent application Ser. No. 11/769,651 entitled "Reduced-Complexity Self-Bearing Brushless DC Motor" filed on Jun. 27, 2007, the disclosure of which is incorporated herein by reference in its entirety. In one aspect the self-bearing drives may comprise the switched reluctance motors and sensing arrangements described herein in combination with dedicated centering/ suspension windings. In other aspects the windings of the switched reluctance motors may be divided into separately/ independently controlled coil sections to form an integrated self-bearing motor as illustrated in FIGS. 16A and 16B.

Figure 16B:
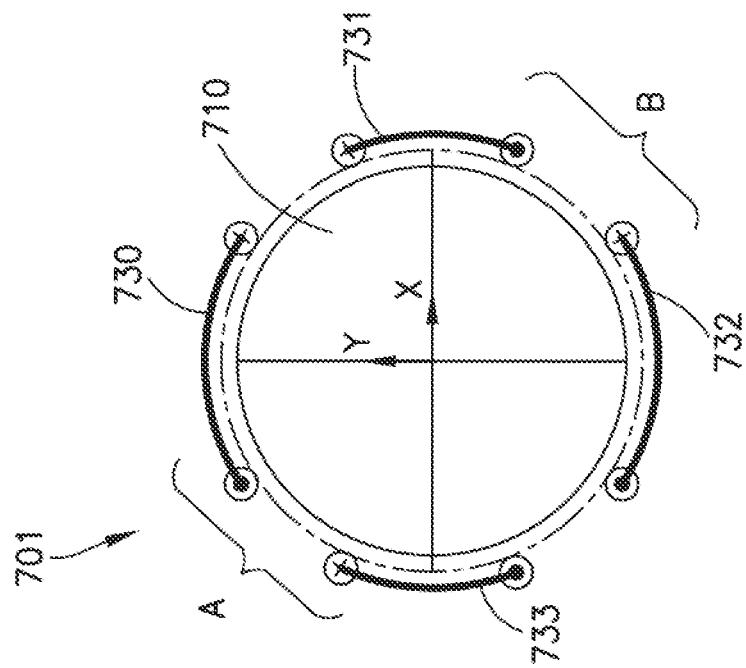
FIGS. 16A and 16B are schematic illustrations of stator configurations for drive motors in accordance with aspects of the disclosed embodiment.
Figure 16A:
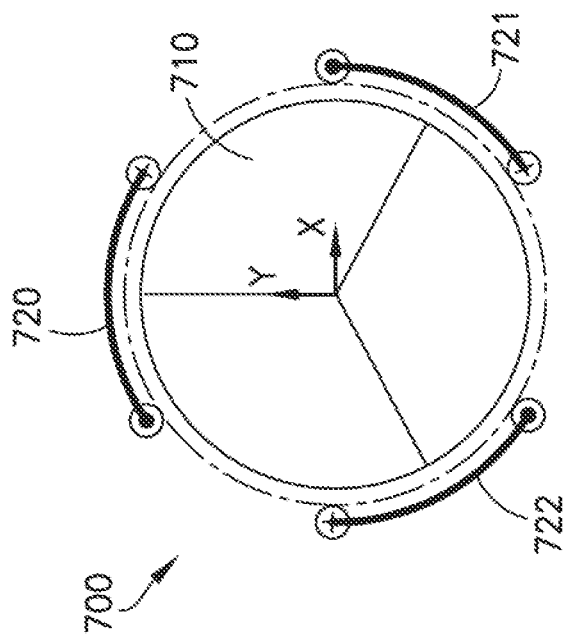

In one aspect, as shown in FIG. 16A each motor of the robot drive 700 may include three winding sets 720-722 where the winding sets extend over 3 sectors of the rotor 710. In other aspects any suitable number of winding sets may be provided for driving the rotor 710. Each of the winding sets 720-722 may be driven by any suitable controller 190 in any suitable manner such as described in U.S. patent application Ser. No. 11/769,651, previously incorporated by reference herein. While winding sets 720-722 of the stator are shown substantially equally distributed (e.g. offset from each other by about 120 degrees) it should be understood that other offsets may also be utilized. In other aspects, the winding sets 720-722 may be arranged in a configuration that is generally symmetric about a desired axis but unequally distributed around the stator perimeter.

In another aspect, as shown in FIG. 16B, the motor 701 of the robot drive 701 may include a stator having two winding sets A and B, where each winding set has two winding subsets, 730, 733 and 731, 732, respectively (e.g. a four segment stator winding arrangement). The two winding subsets in each winding set are coupled electrically and shifted with respect to each other by about 90 electrical degrees. As a result, when one of the two winding subsets in the pair produces pure tangential force the other winding subset in the pair generates pure radial force, and vice versa. In the exemplary embodiment shown, the segments of each of the respective winding sets may be geometrically arranged at an angle of about 90°. In other aspects the geometric angular offset and the electrical angle offset between winding segments of a respective winding set may be different from each other. Each of the winding sets A and B may be driven in any suitable manner by any suitable controller 190 such as described in U.S. patent application Ser. No. 11/769,651, previously incorporated by reference herein.

As may be realized, in one aspect lift forces may be provided for suspending the rotating parts (e.g. rotors 710, robot arms, position feedback tracks, etc.) of the drives 700, 701 in the vertical direction and/or stabilize additional degrees of freedom, such as the pitch and roll angles of, e.g., the drive shafts of the drive (and hence the robot arm(s) attached to the drive shafts) may be provided by, in one aspect, dedicated windings or in other aspects passively through magnetic circuits with permanent magnets located in, e.g., the atmospheric portion of the drive system.

As described above, any suitable number and type of robot arms 104 (FIG. 1E) may be attached to the drive motor arrangements described herein. In addition to the bi-symmetric arm 104 (FIG. 1E) other examples of arm configurations that may be employed with the pancake type motor arrangements or the stacked motor arrangements include, but are not limited to, the arm configurations described in U.S. patent application Ser. No. 12/117,415 entitled "Substrate Transport Apparatus with Multiple Movable Arms Utilizing a Mechanical Switch Mechanism" filed on May 8, 2008, the disclosure of which is incorporated by reference herein in its entirety. For example, the arms may be derived from a conventional scara-type design, which includes an upper arm, a band-driven forearm and a band-constrained end-effector, by eliminating the upper arm. In the aspects illustrated in, for example, FIGS. 17A-14B the structural role of the upper arm may be assumed directly by one or more rotors.

Figure 17A:
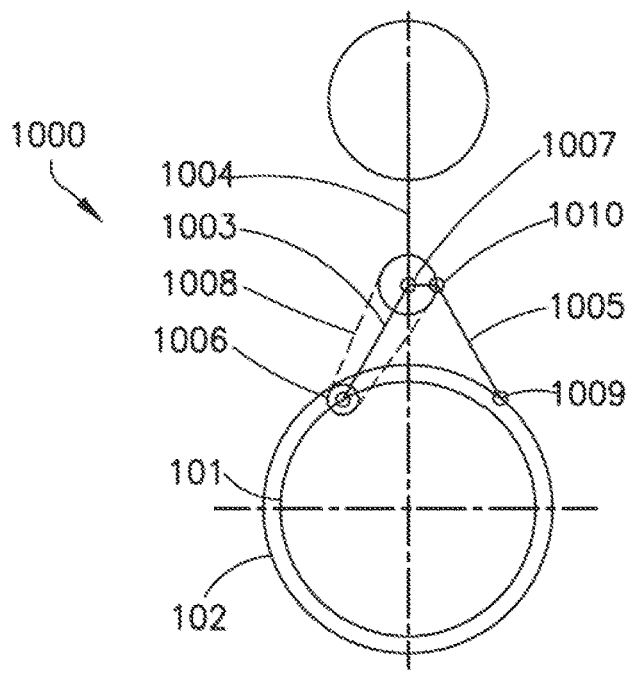
FIGS. 17A and 17B are respectively schematic illustrations of a robotic arm and an extension sequence of the robotic arm in accordance with aspects of the disclosed embodiment.
Figure 17B:
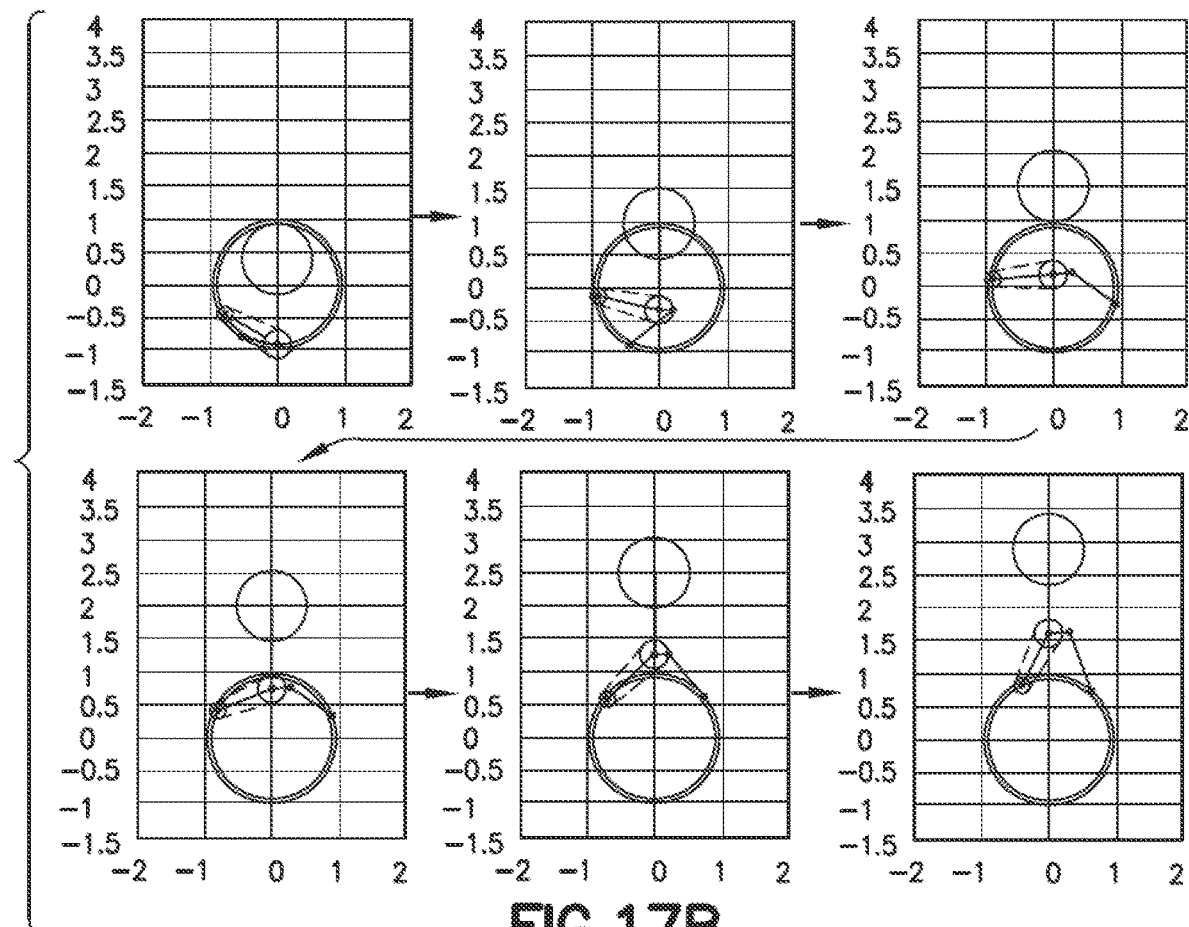

Referring to FIGS. 17A and 17B a single end effector arm driven by a linkage is shown. Referring to the kinematic diagram of FIG. 17A, in this aspect the arm 1000 may be installed on a pair of independently actuated coaxial rotors such as rotors 101, 102 (see also FIG. 1E). The arm 1000 may include a primary linkage 1003, end effector 1004 and secondary linkage 1005. The primary linkage 1003 may be coupled to rotor 101 through revolute joint 1006. End effector 1004 may be coupled to primary linkage 1003 through revolute joint 1007, and constrained to point radially by band arrangement 1008. The secondary linkage 1005 may be coupled to rotor 102 and end effector 1004 through revolute joints 1009 and 1010, respectively. The arm 1000 can be rotated by moving rotors 101 and 102 equally in the same direction. Radial extension of the arm can be controlled by moving rotors 101 and 102 simultaneously in the opposite directions. An example radial extension move of the arm 1000 may be performed in a manner substantially similar to that described in, for example, U.S. patent application Ser. No. 12/117,415 (previously incorporated by reference) and is shown in a phased form in FIG. 17B.

Figure 18A:
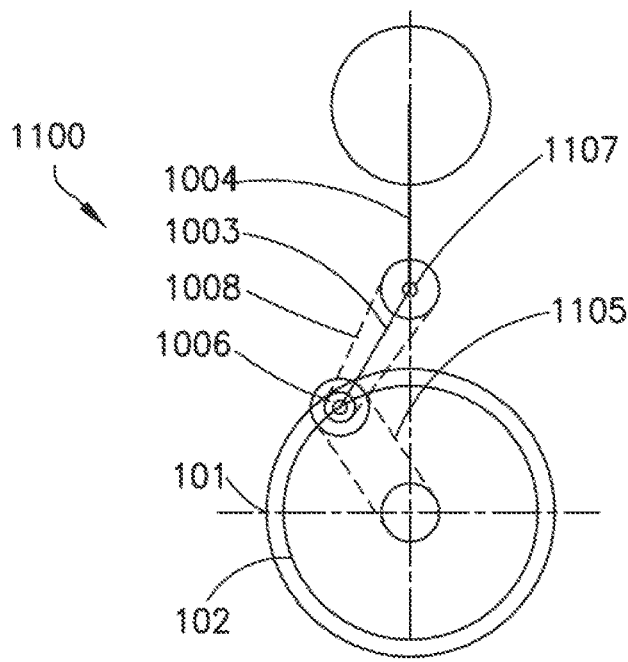
FIGS. 18A and 18B are respectively schematic illustrations of a robotic arm and an extension sequence of the robotic arm in accordance with aspects of the disclosed embodiment.
Figure 18B:
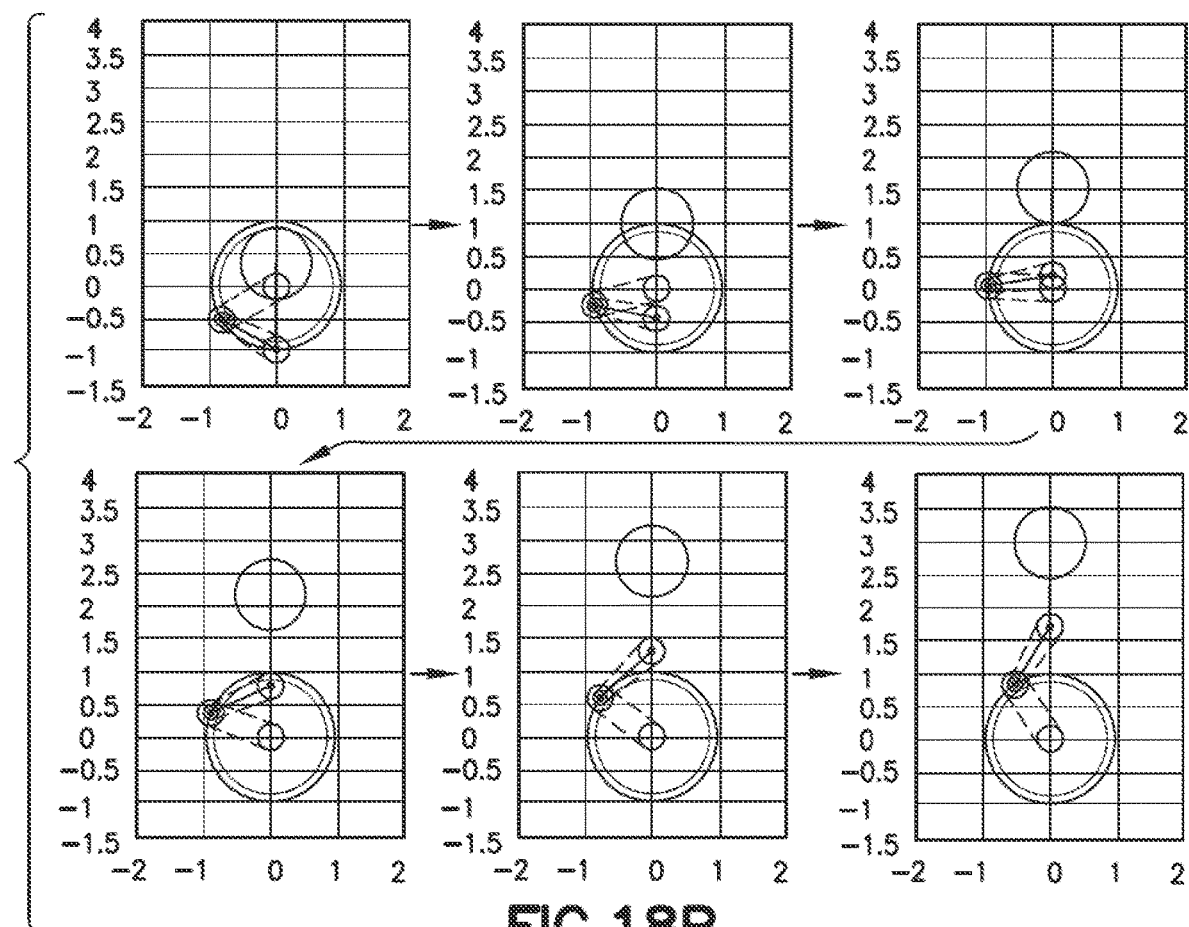

Referring now to FIGS. 18A and 18B a single end effector arm 1100 driven by straight bands is shown in accordance with another aspect of the disclosed embodiment. As with arm 1000, the arm 1100 is installed on a pair of independently actuated coaxial rotors 101 and 102 (see also FIG. 1E). In this aspect, the arm 1100 includes linkage 1103, end effector 1104 and straight band drive 1105. The linkage 1103 may be connected to rotor 101 through revolute joint 1106, and coupled to rotor 102 through band drive 1105. The end effector 1104 may be attached to linkage 1103 through revolute joint 1107, and constrained to point radially by band arrangement 1108. In this aspect, the arm 1100 can be rotated by moving rotors 101 and 102 by equal angles in the same direction. Radial extension of the arm can be controlled by moving rotors 101 and 102 simultaneously in the opposite directions (e.g. by equal amounts if band drive 1105 includes a 1:1 pulley ratio; however, any suitable ratio may be used). An example radial extension move of the arm 1100 may be performed in a manner substantially similar to that described in, for example, U.S. patent application Ser. No. 12/117,415 (previously incorporated by reference) and is shown in a phased form in FIG. 18B.

Figure 19A:
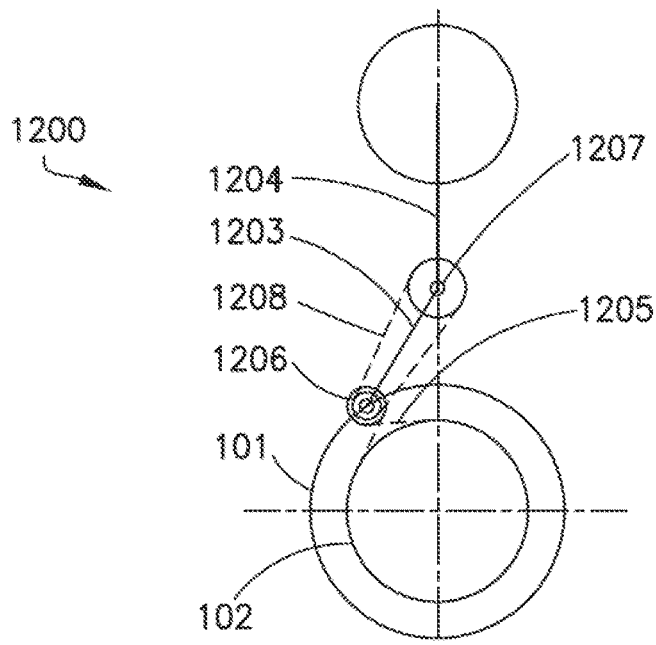
FIGS. 19A and 19B are respectively schematic illustrations of a robotic arm and an extension sequence of the robotic arm in accordance with aspects of the disclosed embodiment.
Figure 19B:
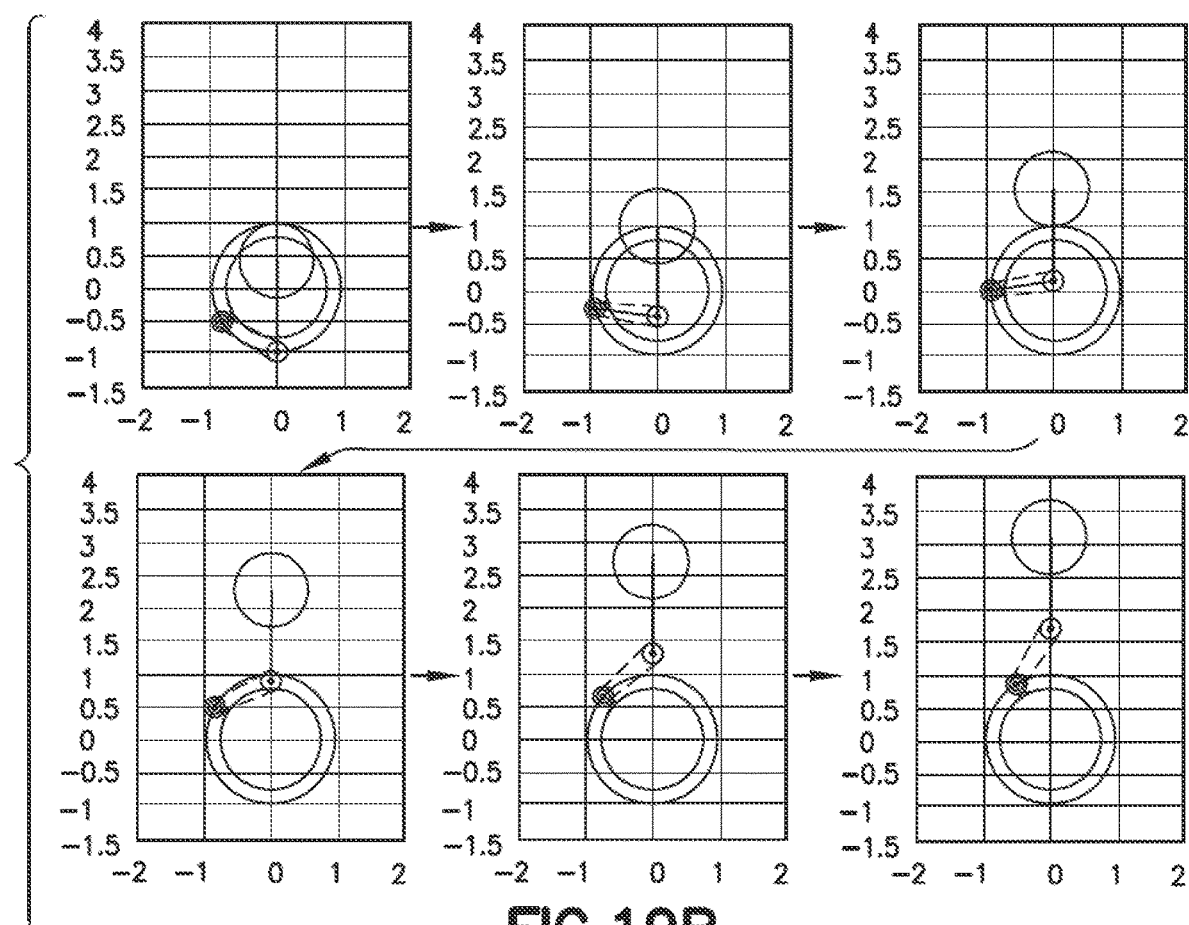

Referring to FIGS. 19A and 19B, a single end effector arm 1200 driven by crossed bands is illustrated in accordance with an aspect of the disclosed embodiment. As shown in FIG. 19A, the arm 1200 may be installed on a pair of independently actuated coaxial rotors 101 and 102 (see also FIG. 1E). In this aspect the arm 1200 includes linkage 1203, end-effector 1204 and crossed band drive 1205. Linkage 1203 may be attached to rotor 101 through revolute joint 1206, and coupled to rotor 102 through crossed band drive 1205. The end effector 1204 may be coupled to linkage 1203 through revolute joint 1207, and constrained to point radially by band arrangement 1208. In this aspect the arm 1200 can be rotated by moving rotors 101 and 102 by equal angles in the same direction. Radial extension of the arm can be controlled by moving rotors 101 and 102 simultaneously in the same direction by unequal amounts. An example radial extension move of the arm 1200 may be performed in a manner substantially similar to that described in, for example, U.S. patent application Ser. No. 12/117,415 (previously incorporated by reference) and is shown in a phased form in FIG. 19B.

Figure 19C:
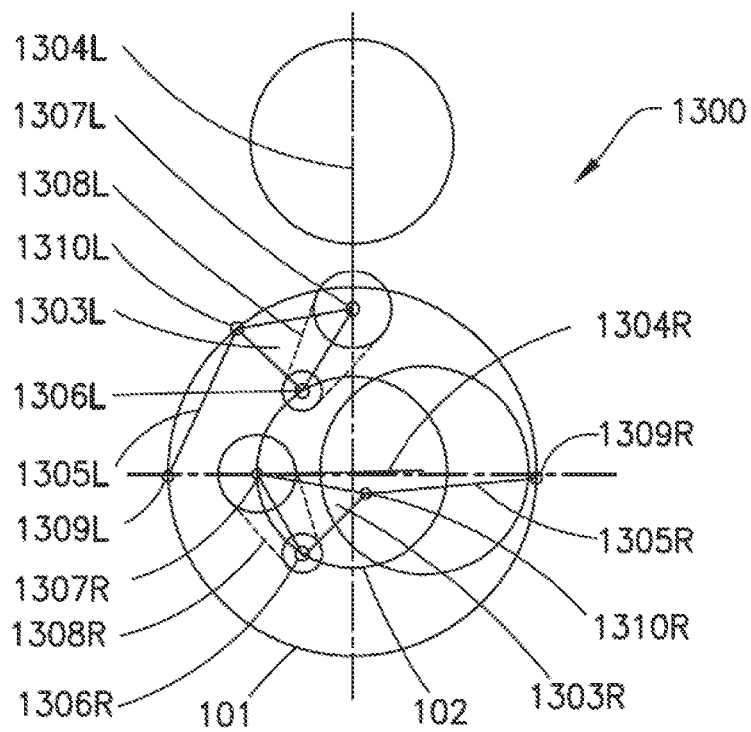
FIGS. 19C and 19D are respectively schematic illustrations of a robotic arm and an extension sequence of the robotic arm in accordance with aspects of the disclosed embodiment.
Figure 19D:
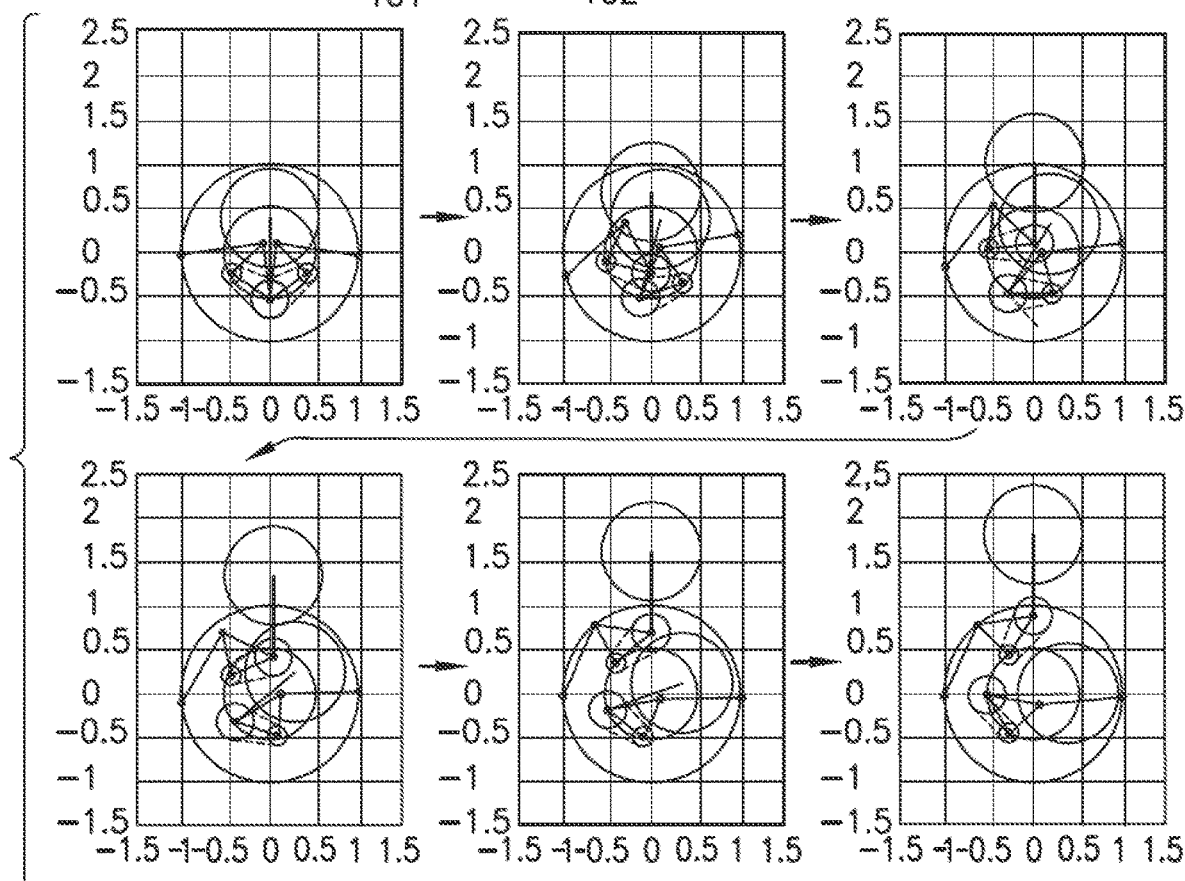

In another aspect of the disclosed embodiment, referring to FIGS. 19C and 19D, a dual end effector arm assembly 1300 is illustrated. The arm assembly 1300 may be installed on a pair of independently actuated coaxial rotors 101 and 102 (see also FIG. 1E). The left-hand-side arm may include a primary linkage 1303L, end effector 1304L and secondary linkage 1305L. The primary linkage 1303L may be coupled to rotor 102 through revolute joint 1306L. The end effector 1304L may be coupled to primary linkage 1303L through revolute joint 1307L, and constrained to point radially by band arrangement 1308L. Secondary linkage 1305L is coupled to rotor 101 and primary linkage 1303L through revolute joints 1309L and 1310L, respectively. Similarly, the right hand side arm may include primary linkage 1303R, end effector 1304R and secondary linkage 1305R. The primary linkage 1303R may be coupled to rotor 102 through revolute joint 1306R. End effector 1304R may be coupled to primary linkage 1303R through revolute joint 1307R, and constrained to point radially by band arrangement 1308R. Secondary linkage 1305R may be coupled to rotor 101 and primary linkage 1303R through revolute joints 1309R and 1310R, respectively. When one of the arms extends radially, the other arm rotates within a specified swing radius close to its folded configuration such that the linkages form a lost motion mechanism. An example radial extension move of the arm assembly 1300 may be performed in a manner substantially similar to that described in, for example, U.S. patent application Ser. No. 12/117,415 (previously incorporated by reference) and is shown in a phased form in FIG. 19D.

Figure 19E:
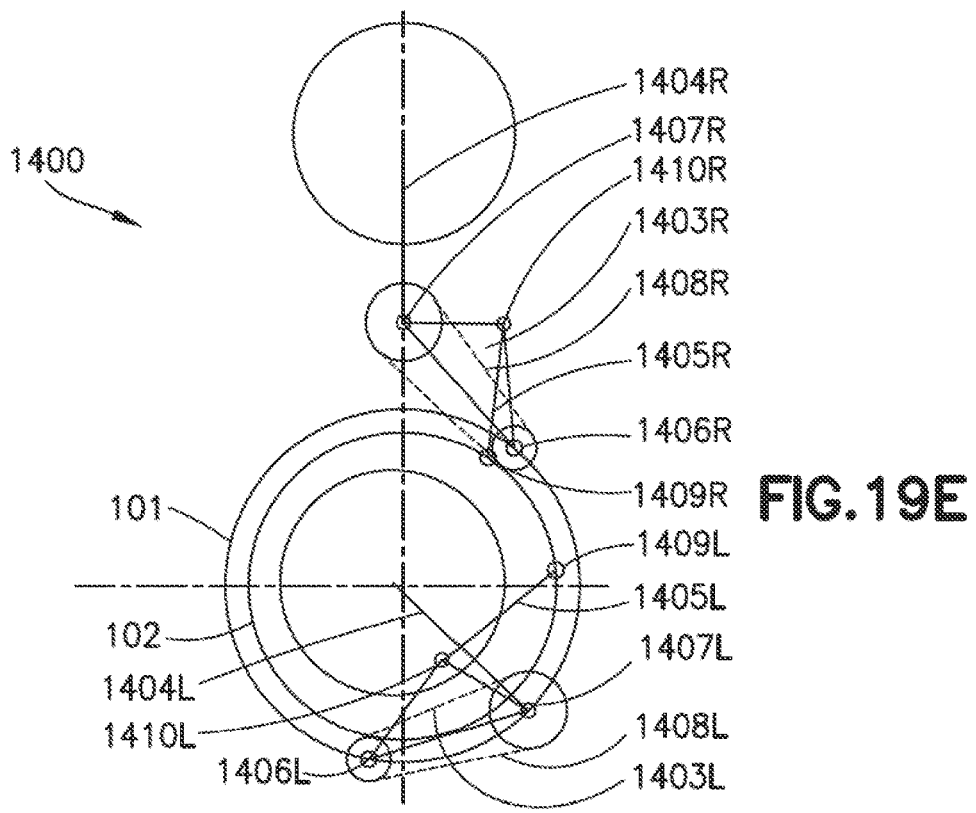
FIGS. 19E and 19F are respectively schematic illustrations of a robotic arm and an extension sequence of the robotic arm in accordance with aspects of the disclosed embodiment.
Figure 19F:
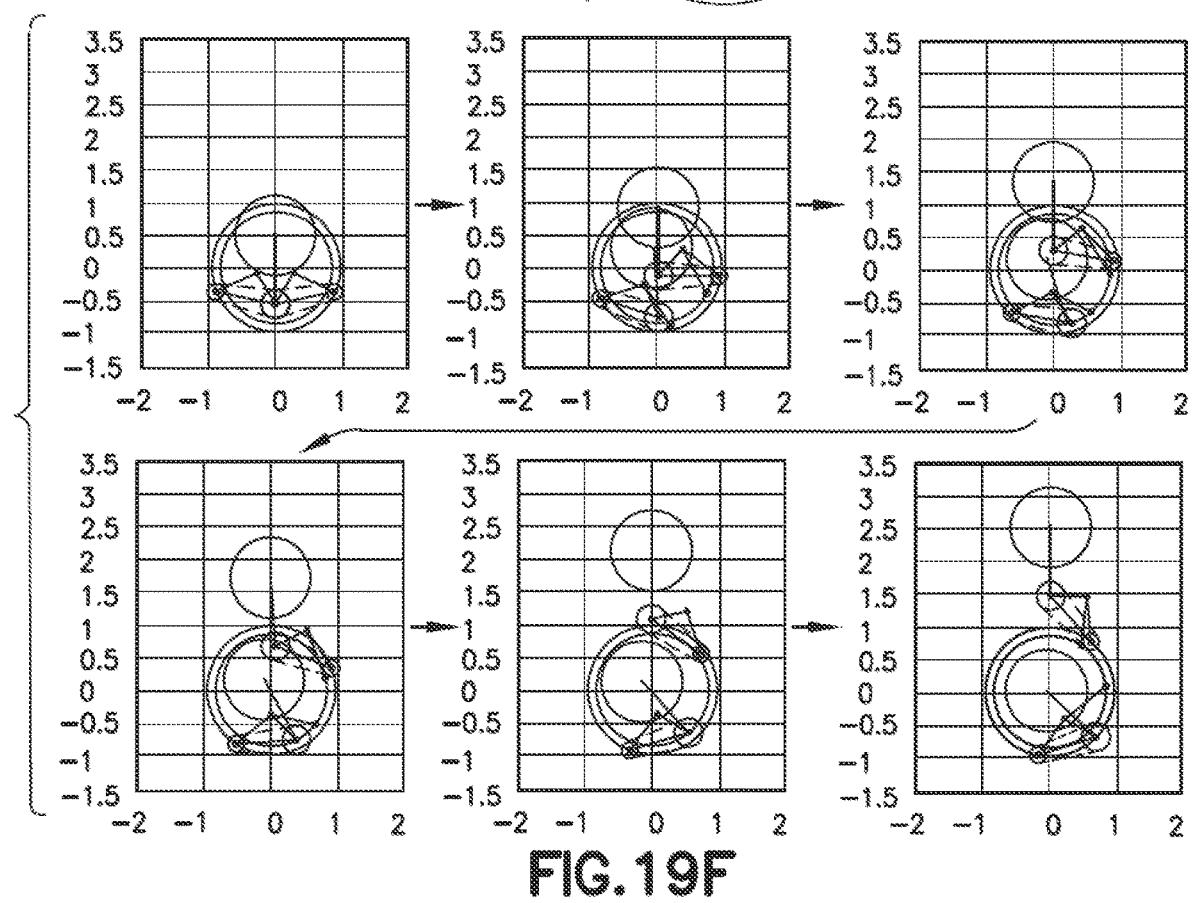

In another aspect of the disclosed embodiment, the arm assembly 1400 illustrated in FIGS. 19E and 19F includes substantially the same type and number of components as arm 1300. However, the arm components are arranged in a different geometric configuration, resulting in substantially different kinematic characteristics of the lost motion mechanism. As shown in FIG. 19E, the left hand side arm includes a primary linkage 1403L, end effector 1404L and secondary linkage 1405L. The primary linkage 3L may be coupled to rotor 101 through revolute joint 1406L. The end effector 1404L may be coupled to primary linkage 1403L through revolute joint 1407L, and constrained to point radially by band arrangement 1408L. The secondary linkage 1405L may be coupled to rotor 102 and primary linkage 1403L through revolute joints 1409L and 1410L, respectively. Similarly, the right hand side arm includes primary linkage 1403R, end effector 1404R and secondary linkage 1405R. The primary linkage 1403R may be coupled to rotor 101 through revolute joint 1406R. The end-effector 1404R may be coupled to primary linkage 1403R through revolute joint 1407R, and constrained to point radially by band arrangement 1408R. Secondary linkage 1405R may be coupled to rotor 102 and primary linkage 1403R through revolute joints 1409R and 1410R, respectively. When one of the arms extends radially, the other arm rotates within a specified swing radius close to its folded configuration. An example radial extension move of the arm 1400 may be performed in a manner substantially similar to that described in, for example, U.S. patent application Ser. No. 12/117,415 (previously incorporated by reference) and is shown in a phased form in FIG. 19F.

Figure 20A:
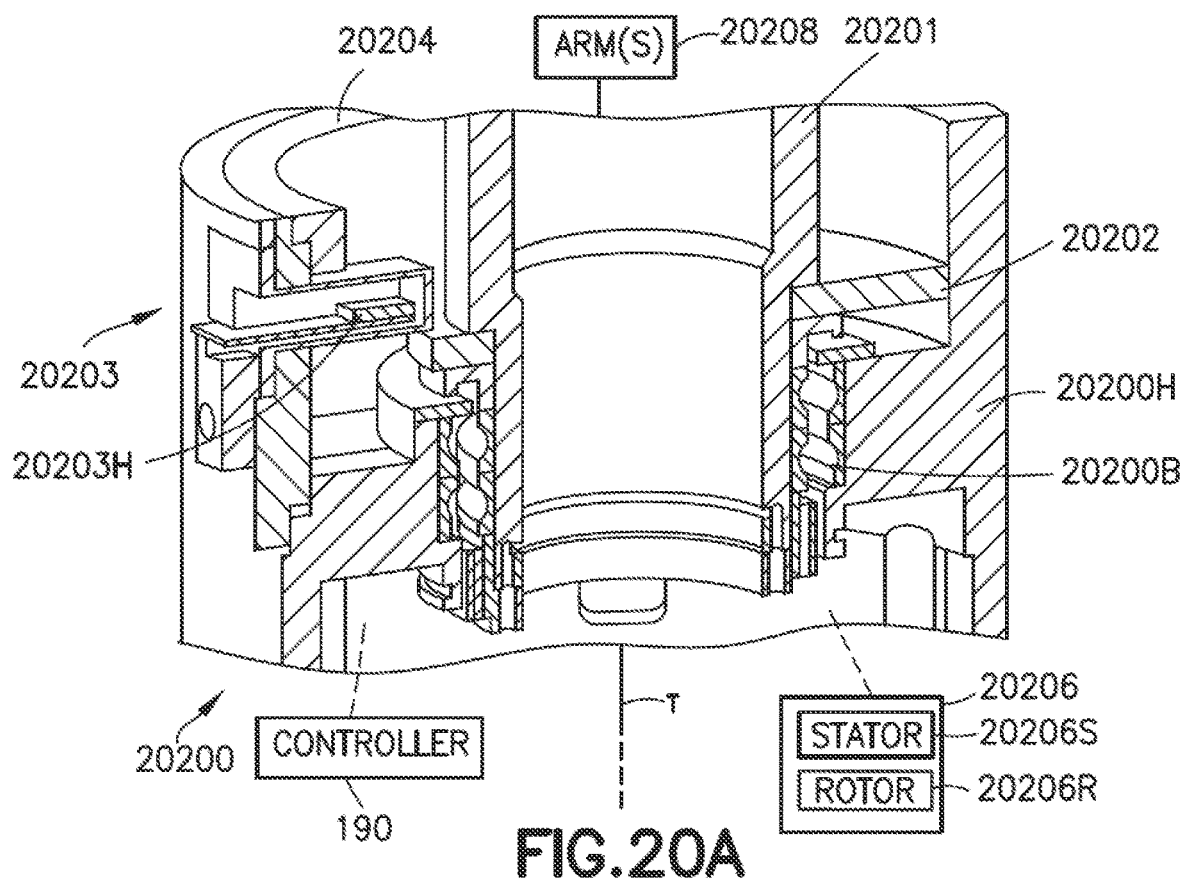
FIGS. 20A-20C are respectively a partial cross-sectional view of a representative drive section with a sealed position feedback system, another partial perspective cross-sectional view of the drive section and feedback system with components omitted for clarity, and a top perspective view of elements of the position feedback system.

Referring now to FIG. 20A, a schematic illustration of a portion of a transport apparatus drive 20200 is illustrated. The transport drive may be employed in any suitable atmospheric or vacuum robotic transport such as those described above. The drive may include a drive housing 20200H having at least one drive shaft 20201 at least partially disposed therein. Although one drive shaft is illustrated in FIG. 20A in other aspects the drive may include any suitable number of drive shafts. The drive shaft 20201 may be mechanically suspended or magnetically suspended within the housing 20200H in any suitable manner. In this aspect the drive shaft is suspended within the housing with any suitable bearings 20200B but in other aspects the drive shaft may be magnetically suspended (e.g. a self-bearing drive) in a manner substantially similar to that described in U.S. Pat. No. 8,283,813 entitled "Robot Drive with Magnetic Spindle Bearings" issued on Oct. 9, 2012, the disclosure of which is incorporated by reference herein in its entirety. Each drive shaft of the drive 20200 may be driven by a respective motor 20206 where each motor includes stator 20206S and a rotor 20206R. The exemplary embodiment depicted in the figures has what may be referred to as a rotary drive configuration that is illustrated for purposes of facilitating description and features of the various aspects, as shown and described herein. As may be realized the features of the various aspects illustrated with respect to the rotary drive configuration are equally applicable to a linear drive configuration. It is noted that the drive motors described herein may be permanent magnet motors, variable reluctance motors (having at least one salient pole with corresponding coil units and at least one respective rotor having at least one salient pole of magnetic permeable material), or any other suitable drive motors. The stator(s) 20206S may be fixed at least partly within the housing and the rotor(s) 20206R may be fixed in any suitable manner to a respective drive shaft 20201. In one aspect, the stator(s) 20206S may be located in an "external" or "non-sealed" environment that is sealed from an atmosphere in which the robot arm(s) 20208 operate (the atmosphere in which the robot arm(s) operate is referred to herein as a "sealed" environment which may be a vacuum or any other suitable environment) through the employment of an isolation wall or barrier while the rotor(s) 20206R is located within the sealed environment in a manner substantially similar to that described in United States provisional patent having 390P014939-US(-#1) entitled "SEALED ROBOT DRIVE" and filed on Nov. 13, 2013 the disclosure of which is incorporated by reference herein in its entirety and as will be described in greater detail below. It is noted that the terms non-ferromagnetic separation wall, seal partition or isolation wall (which will be described in greater detail below) as used herein refer to a wall made of any suitable non-ferromagnetic material that may be disposed between the moving parts of the robot drive and/or sensor and the corresponding stationary parts of the robot drive and/or sensor.

In one aspect the housing 20200H of the drive 20200 has a substantially drum shaped configuration (e.g. a drum structure) having an exterior 20200HE and an interior 20200HI. The housing 20200H, in one aspect, is an unitary one piece monolithic structure while, in other aspects, the housing 20200H is an integral assembly having two or more hoops 20200HH fastened together in any suitable manner so as to form the drum structure of the housing 20200H. The interior 20200HI of the housing includes a stator interface surface 20200HS in which the stator 20206S of the variable reluctance motor 20206 is located. The stator interface surface 20200HS (and hence the housing 20200H) is configured to provide rigidity and support for the stator 20206S. As may be realized, the stator interface surface 20200HS (and hence the housing 20200H) is a datum surface that positions the stator 20206S (and isolation wall 2403 supported by the stator so that the stator is located in an atmospheric environment separate from the vacuum environment in which the rotor is located) to control a gap between the stator 20206S and rotor 20206R. The housing 20200H also includes a rotor interface surface 20200HR that interfaces with and positions the rotor 20206R (e.g. the bearings 20200B are positioned on the drive shaft 20201/rotor 20206R in a predetermined position and the bearings 20200B 20200B interface with the rotor interface surface 20200HR) so that the rotor 20206R is positioned in a predetermined position relative to the stator 20206S. As may be realized, the stator interface surface 20200HS is a datum surface for the rotor interface surface 20200HR (and hence the rotor 20206R/drive shaft 20201) so that the rotor 20206R (and drive shaft 20201 connected thereto) and the stator 20206S are positioned relative to and depend from a common datum formed by the housing 20200H. In one aspect the housing 20200H includes a control board aperture or slot PCBS formed in the housing 20200H and into which one or more printed circuit boards PCB (similar to PCB 20310 described below which include sensor 20203 that interfaces with the sensor or encoder track 20202 described below) located in the atmospheric environment and separated from the sensor track 20202 (which is located in the vacuum environment) by a vacuum barrier in a manner similar to that described below. The control board aperture PCBS includes a sensor interface surface 20200HT that positions the sensor 20203 relative to the stator interface surface 20200HS (e.g. the common datum of the housing 20200H) in a predetermined position. As may be realized, the sensor track 20202 is connected to the rotor 20206R so that the sensor track 20202 is located in a predetermined location relative to the rotor interface surface 20200HR. As such, the relative positioning of the sensor interface surface 20200HT and the rotor interface surface 20200HR with the stator interface surface 20200HS positions and controls the gap between the sensor 20203 and the sensor track 20202 where the stator 20206S, the rotor 20206R, the sensor 20203 and the sensor track 20202 are positioned relative to and dependent from the common datum. In one aspect, the housing 20200H includes any suitable slot or aperture MLS through which any suitable drive connectors CON pass for providing power and control signals to (and feedback signals from) the drive 20200.

Figure 20B:
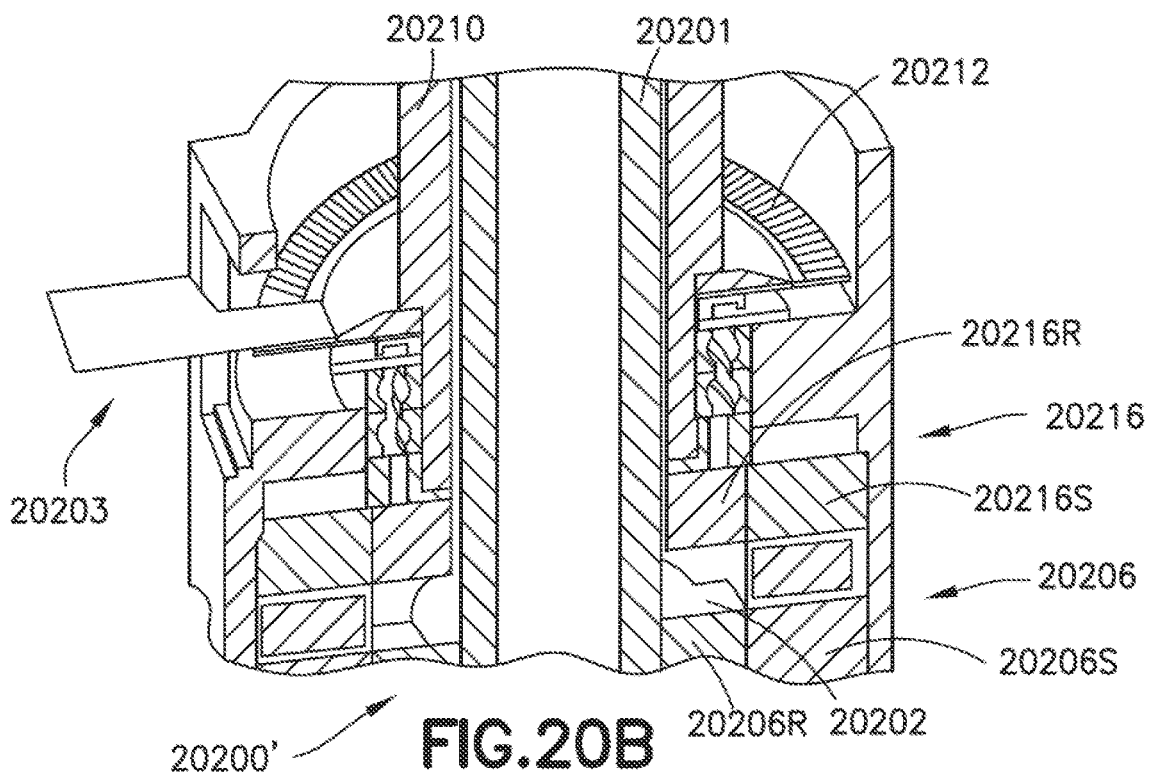
Figure 20C:
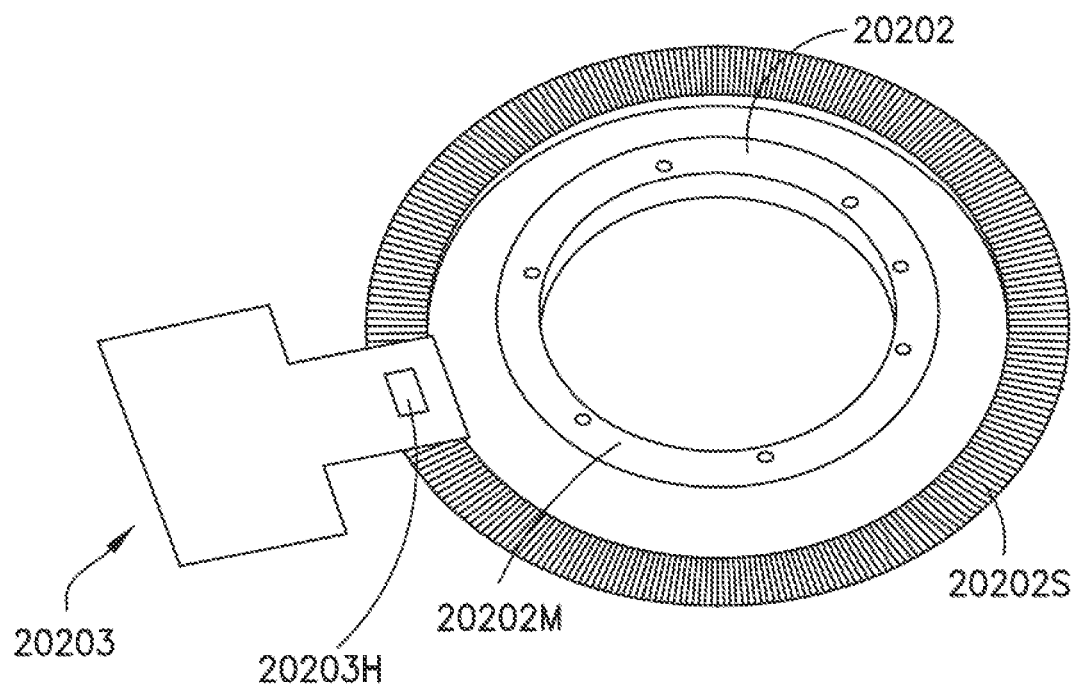
Figure 20D:
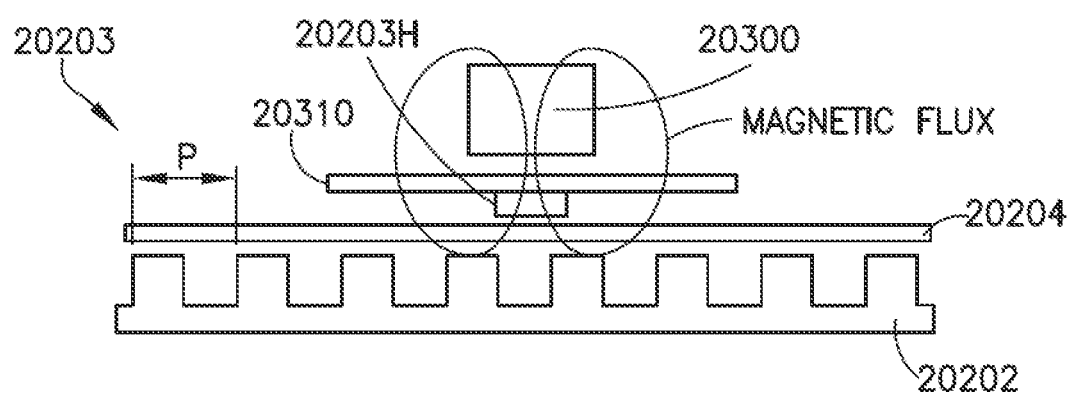
FIG. 20D is a schematic elevation view of the position feedback system all of which are in accordance with aspects of the disclosed embodiment.
Figure 20F:
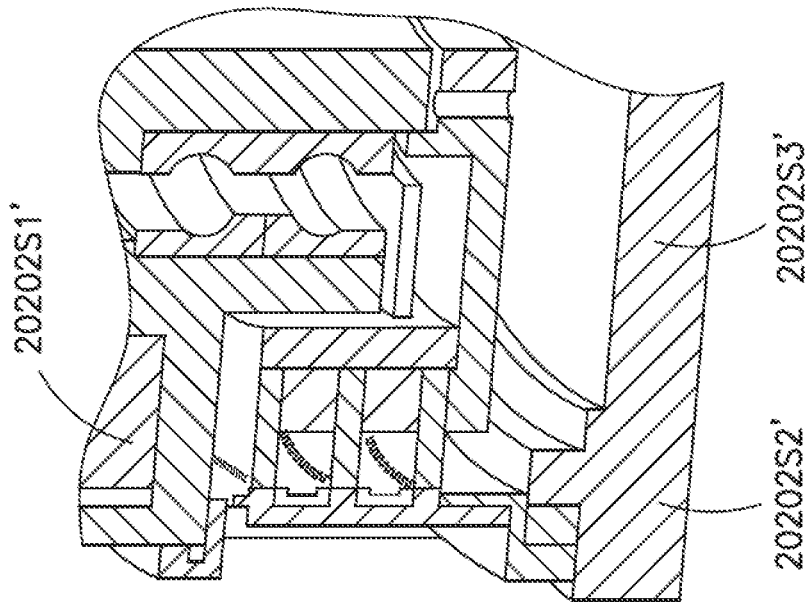
FIGS. 20E-20F are respectively perspective cross-section, and expanded partial cross-section views illustrating further features.
Figure 20E:
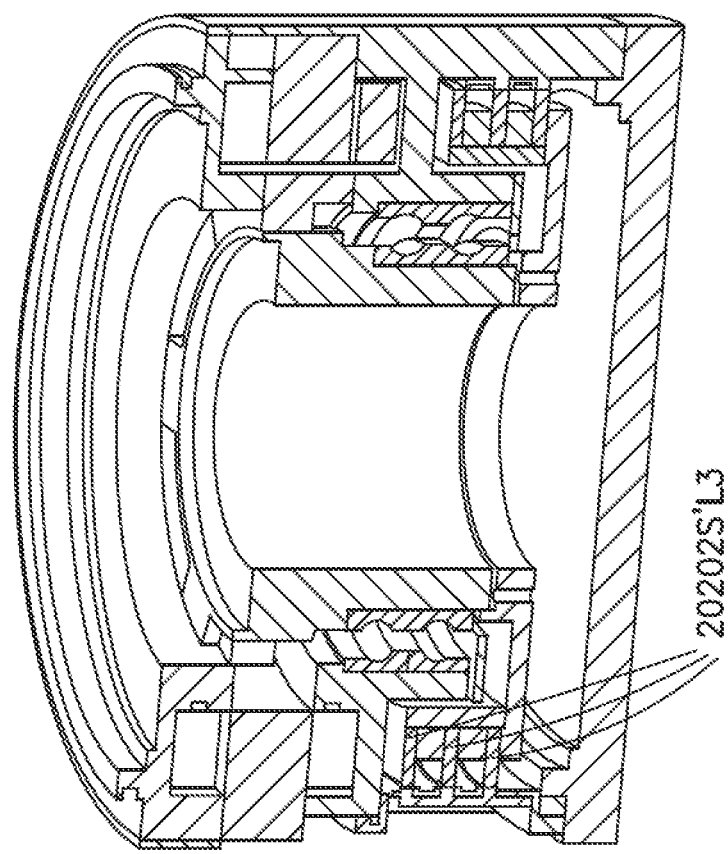
Figure 20G:
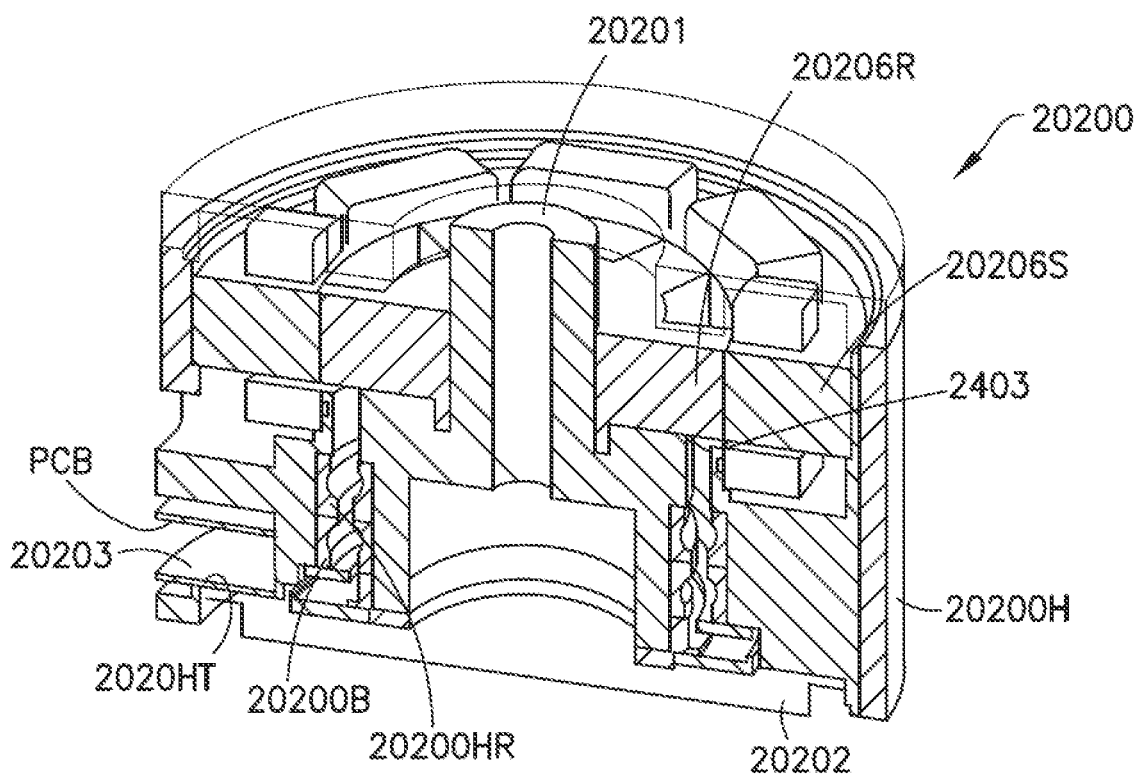
FIGS. 20G-20K are schematic illustrations of a drive section in accordance with aspects of the disclosed embodiment.
Figure 20H:
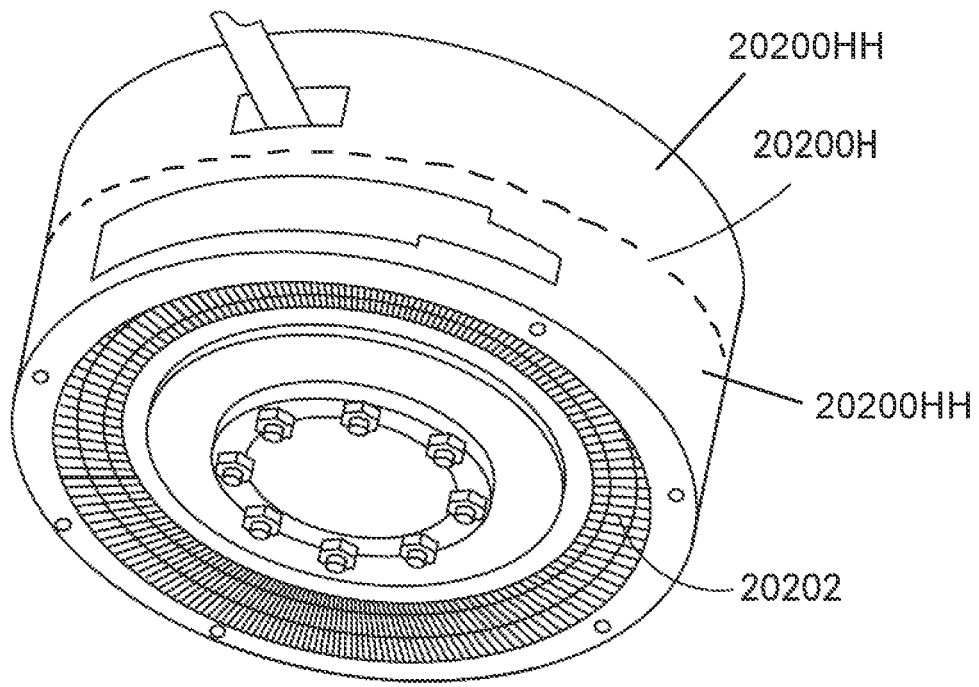
Figure 20I:
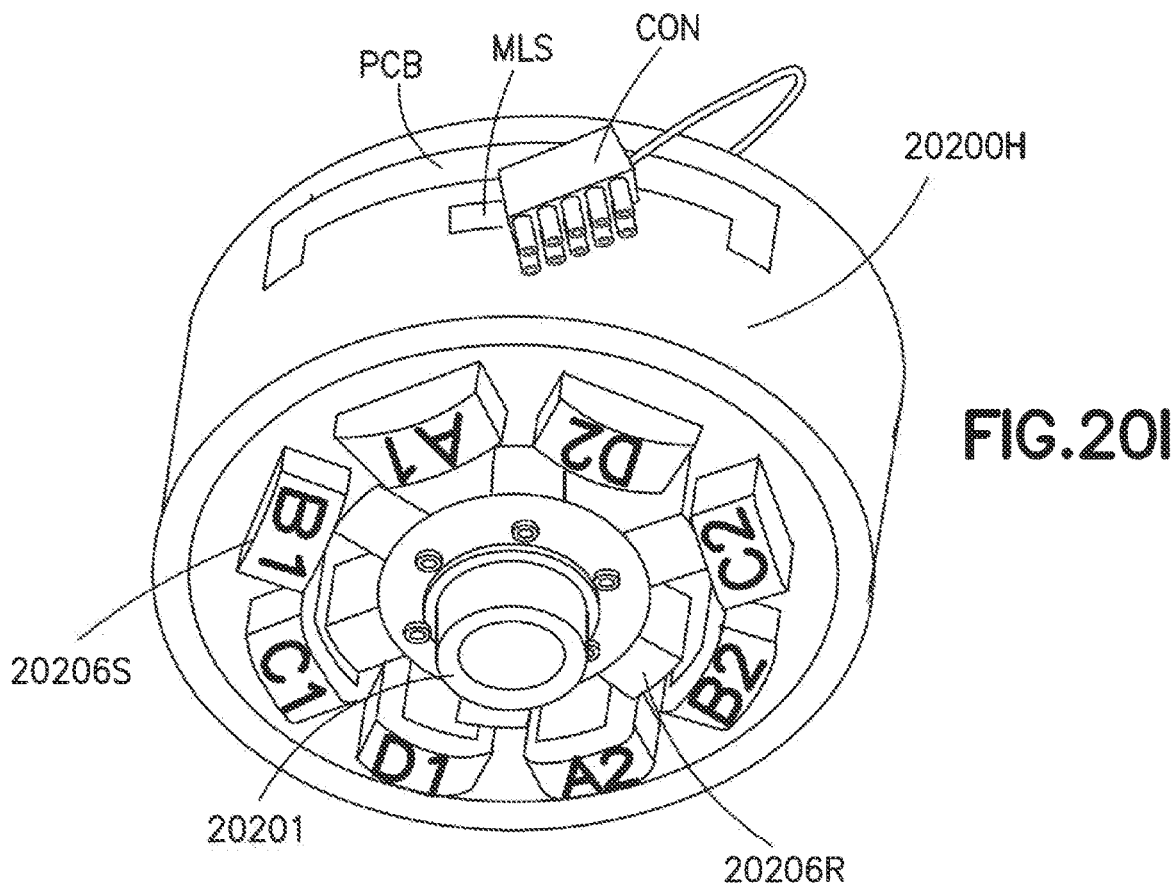
Figure 20J:
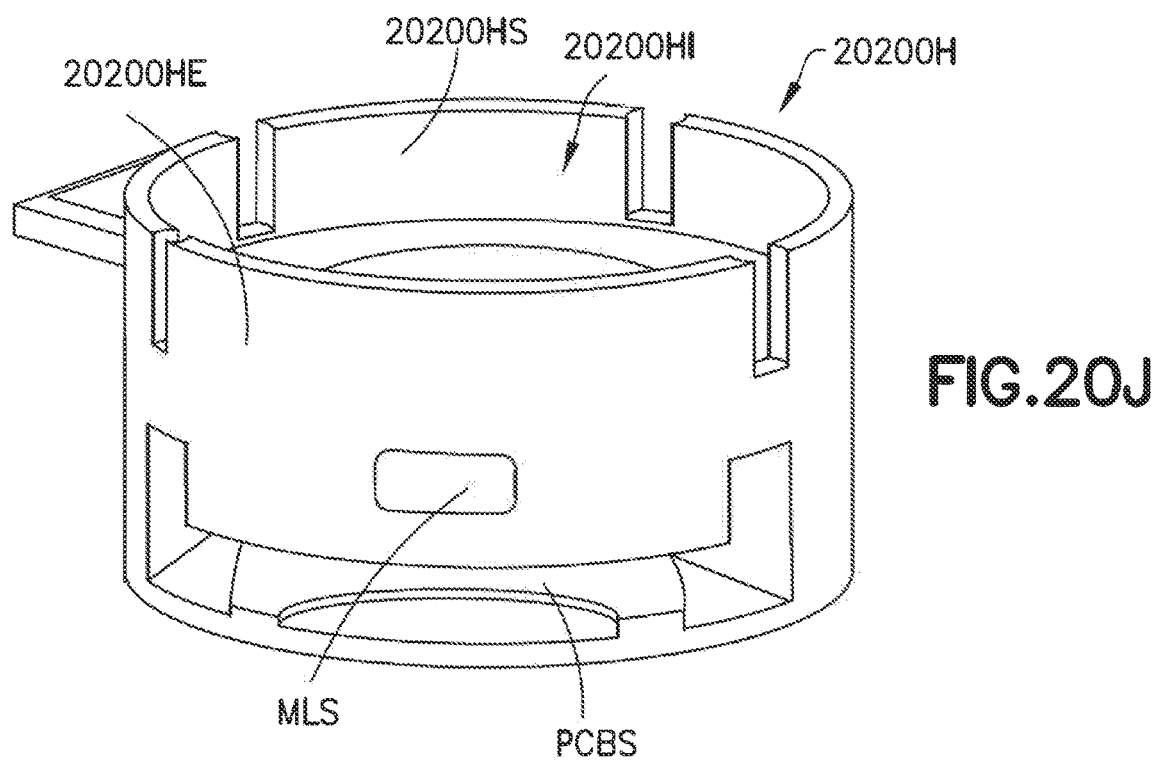
Figure 20K:
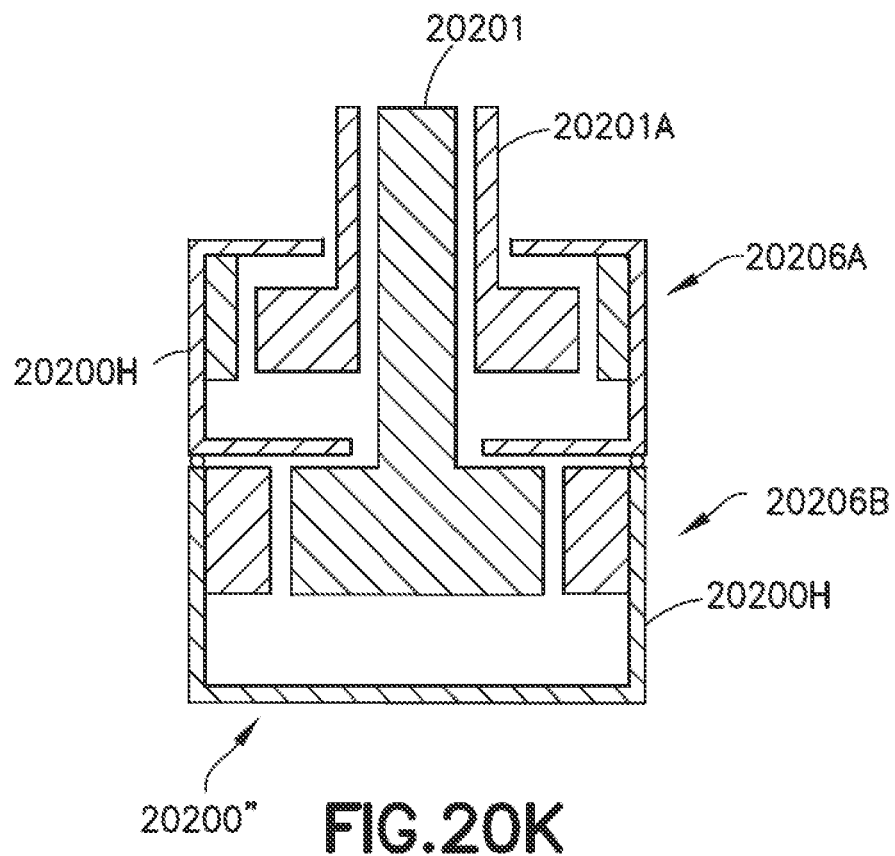

Referring to FIG. 20K, it should be understood that while FIGS. 20G-20J illustrate a drive having a single drive shaft 20201 for exemplary purposes only, in other aspects the drive includes any suitable number of motors having any suitable corresponding number of drive shafts. For example, FIG. 20K illustrates a drive 20200" having two motors 20206A, 20206B arranged in a stacked or in-line configuration. Here each motor 20206A, 20206B includes a respective housing 20200H (substantially similar to that described above) where the housings are connected to each other in any suitable manner to form the multiple motor (e.g. multiple degree of freedom) drive 20200" so that a drive shaft 20201 of motor 20206B extends through an aperture in a drive shaft 20201A of motor 20206A to form a coaxial drive spindle.

Referring also to FIG. 20B, a transport apparatus drive 20200' substantially similar to drive 20200 is illustrated having a coaxial drive shaft arrangement with two drive shafts 20201, 20210. In this aspect the drive shaft 20201 is driven by motor 20206 (having stator 20206S and rotor 20206R) while shaft 20210 is driven by motor 20216 (having stator 20216S and rotor 20216R). Here the motors are shown in a stacked arrangement (e.g. in line and arranged one above or one in front of the other). However, it should be understood that the motors 20206, 20216 may have any suitable arrangement such as a side by side or concentric arrangement. Suitable examples of motor arrangement are described in U.S. Pat. No. 8,008,884 entitled "Substrate Processing Apparatus with Motors Integral to Chamber Walls" issued on Aug. 30, 2011 and U.S. Pat. No. 8,283,813 entitled "Robot Drive with Magnetic Spindle Bearings" issued on Oct. 9, 2012, the disclosures of which are incorporated by reference herein in their entireties.

Referring again to FIGS. 20A and 20B and also to FIG. 20C, each drive shaft 20201 may also have mounted thereto a sensor or encoder track 20202 with a position determining indicia or features that interface with a sensor 20203. It is noted that the sensors described herein may be configured such that the read head portion of the sensor 20203 (e.g. the portion of the sensor to which a sensing member is mounted) are modules that can be inserted and removed from the drive housing or isolation wall 20204 (it is noted that the isolation wall 20204 may be a common isolation wall that also seals the drive stators from the sealed environment). The sensor 20203 may be fixed at least partly within the housing 20200H in any suitable manner that allows sensing elements or members 20203H of the sensor 20203 to read or otherwise be influenced by one or more scales 20202S (which will be described below) for providing position signals to any suitable controller such as controller 190 (which may be substantially similar to controller 11091 described above). In one aspect at least a portion of the sensor 20203 may be located in the external environment and sealed or otherwise isolated from the sealed environment with the isolation wall 20204 as will be described in greater detail below so that the sensor electronics and/or magnets are disposed in the external environment while the sensor track is disposed in the sealed environment. The sealed environment may be difficult to monitor directly due to, for example, harsh environmental conditions, such as vacuum environments or environments with extreme temperatures. The aspects of the disclosed embodiments described herein provide non-intrusive position measurement of a moving object (e.g. such as a motor rotor, a robot arm connected to the motor or any other suitable object) within the sealed environment.

In one aspect, referring to FIG. 20D, the sensor 20203 may utilize magnetic circuit principles to detect the position of the encoder track 20202 where the encoder track has at least one encoder scale (e.g. where each of the at least one encoder scale has a predetermined pitch that may be different than a pitch of other ones of the at least one encoder scale) located within the sealed environment. The magnetic sensing system illustrated in FIG. 20D is shown in a representative manner and may be configured as a Giant Magneto Resistive sensor (GMR) or as a differential type GMR (i.e. that senses the gradient field differential between several locations, otherwise referred to as a gradiometer) as will be described below. The sensor may include at least one magnetic or ferromagnetic source 20300, the ferromagnetic encoder track 20202, and at least one magnetic sensing element or member 20203H (corresponding to each magnetic source) disposed substantially between the magnetic source and the ferromagnetic track. The encoder track may be configured so that the track width (e.g. track face with encoding features thereon) may extend in a plane extending radially outwards with the position encoding features varying orthogonally from the track plane (e.g. up and down). In other aspects, the track width may be disposed in an axial direction parallel to the drive axis (e.g. in a rotary drive configuration the track face forms an annulus or cylinder surrounding the drive axis T, see for example tracks 20202S1'-S3' in FIGS. 20E, 20F) with the encoding features projecting radially (for a rotary drive) or laterally from the track plane. Alternatively, the track width may be disposed in a radial direction perpendicular for the drive axis as shown in FIG. 20A. In this aspect the at least one magnetic sensing member 20203H may have a substantially flat (or otherwise without depending features) track interface that interfaces substantially directly with the track 20202 but in other aspects, as described below, the at least one magnetic sensor may be connected to ferromagnetic members that include ferromagnetic features that interface with corresponding features on the track. In one aspect the magnetic source and the at least one sensing member 20203H may be mounted to or otherwise integrally formed on a printed circuit board (PCB) 20310 where the printed circuit board is a common circuit board (e.g. common to each magnetic source and each of the at least one sensing member). In other aspects each magnetic source and sensing member may be mounted to one or more respective printed circuit boards. In one aspect the magnetic source 20300 may be a permanent magnet located within the external environment. In other aspects the magnetic source 20300 may be any suitable source such as coils configured to be energized to produce a magnetic field. In one aspect the magnetic field generated by the magnetic source (the field lines illustrated in FIG. 20D for example purposes) depart from a north pole N (e.g. pole facing away from the track, in other aspects the magnetic poles may have any suitable orientations) of the source 20300 (or in the case of energized coils in a direction determined by the flow of current through the coils), may propagate as shown, crossing the PCB 20310, and flowing across the gap (e.g. between the sensing member 20203H and the track 20202) through the non-ferrous isolation wall 20204, to the ferromagnetic track 20202 and back to the opposing pole S of the magnetic source 20300. As the ferromagnetic track moves relative to the magnetic source 20300 one or more magnetic field profiles are generated. The magnetic field profiles may have a general shape of one or more of a sine wave or a cosine wave. The sensing member 20203H is configured to detect changes to the magnetic flux that correlate with the ferromagnetic track motion (e.g. the magnetic field profiles).

Figure 21A:
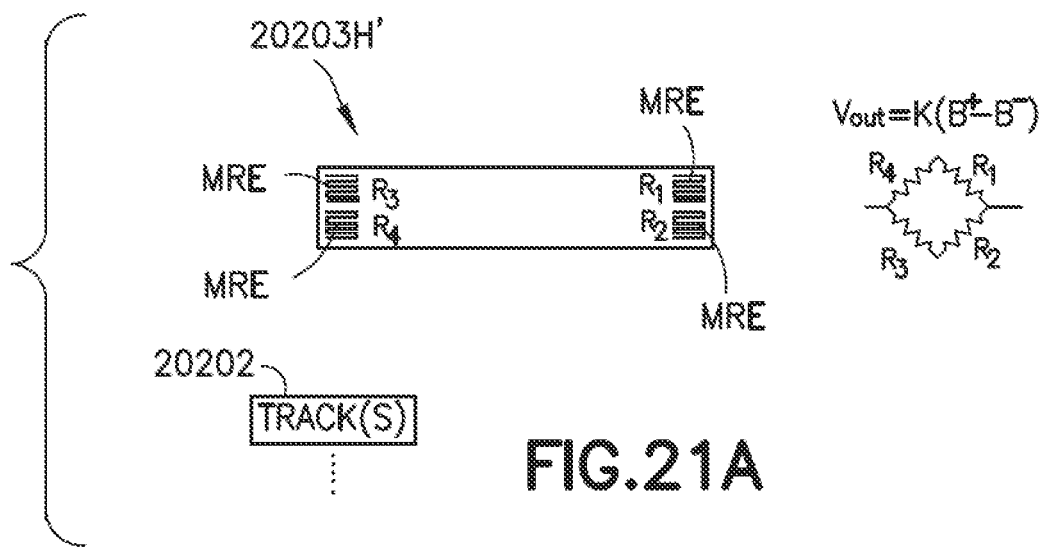
FIGS. 21A and 21B are schematic diagrams of sensing elements of the position feedback system.
Figure 21B:
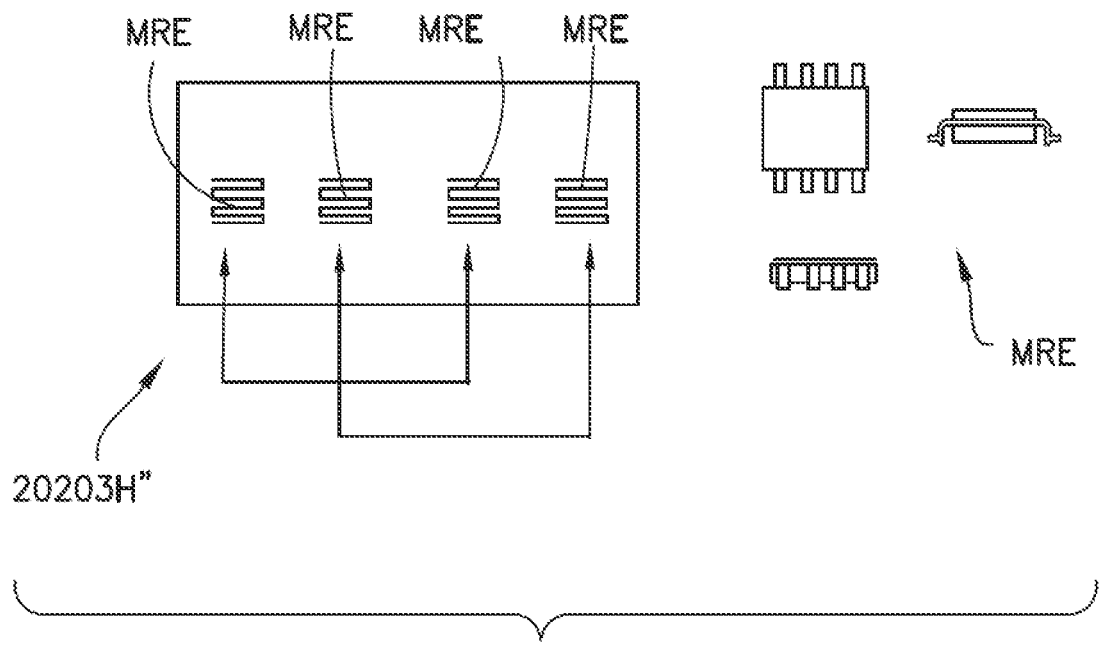
Figure 21C:
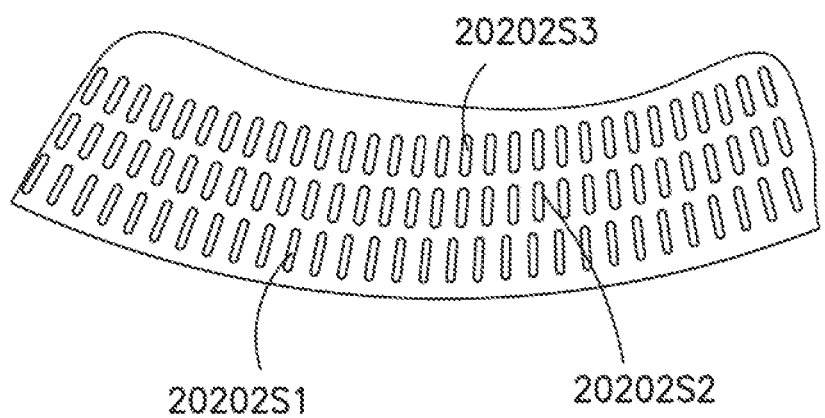
FIGS. 21C and 21E are respectively a partial plan view and an enlarged plan view of a portion of an encoder track of the position feedback system, the track having multiple bands read by the sensing elements and capable of providing incremental and on demand absolute position feedback, which is graphically illustrated in FIG. 21D, all of which are in accordance with aspects of the disclosed embodiment.
Figure 21D:
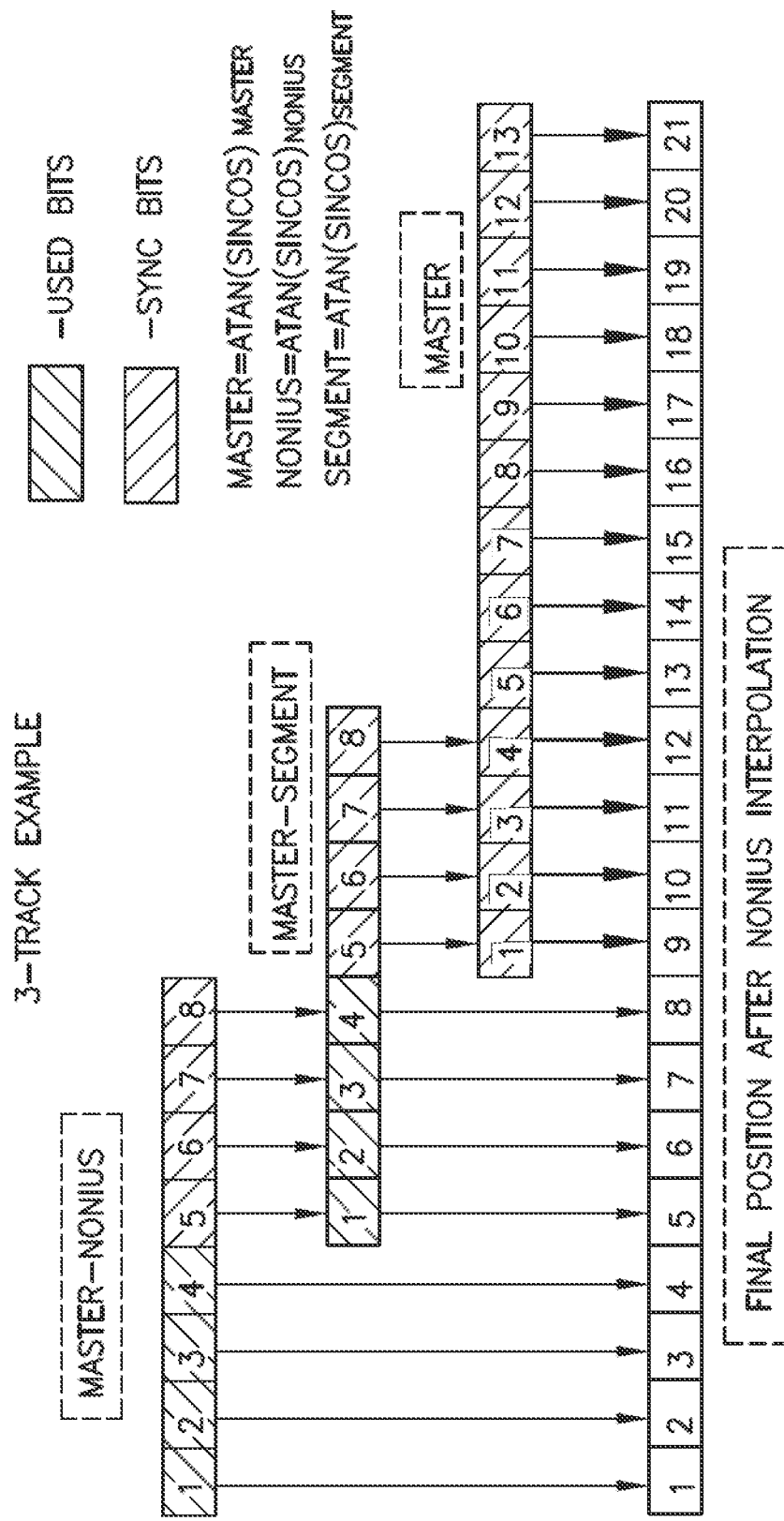
Figure 21E:
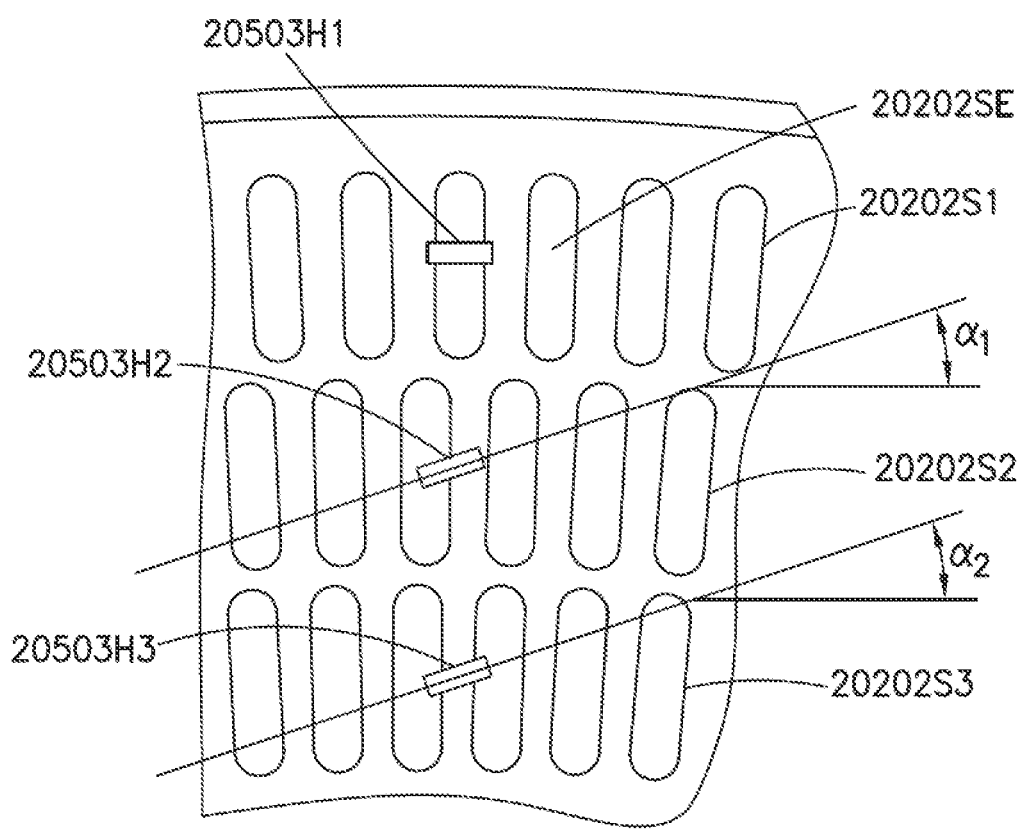

In one aspect the sensing member(s) 20203H may be any suitable giant magneto resistive (GMR) sensing element/member capable of sensing a magnetic field in one or more locations. In other aspects the sensing member(s) may be any suitable sensing elements capable of sensing a magnetic field. In one aspect the sensing member 20203H may be configured to produce a sinusoidal signal that can be used to provide a phase angle associated with, for example, an incremental (and/or absolute) position of the ferromagnetic track 20202. In another aspect, referring to FIGS. 21A and 21B the sensing member(s) may be a differential GMR sensing member (e.g. gradiometer) that is configured to sense a gradient field between two locations in space. The magnetic sensing system may be a gradiometer as previously noted. In the gradiometer configuration, an analog output signal of each sensing member may be proportional to the magnetic field gradient between two points in space. FIG. 21A illustrates a representative gradiometer sensing member 20203H' including magneto resistive elements MRE that may be arranged to form, for example, a Wheatstone bridge that may effect a differential encoder channel. As may be realized, the arrangement of the MRE's (e.g. R1-R4) on the gradiometer sensing member may be characteristic of the encoding features on the encoder track and magnetic source. FIG. 21B illustrates an exemplary gradiometer sensing member 20203H" in accordance with another aspect of the disclosed embodiment including magneto resistive elements MRE arranged to provide two differential signals (e.g. sine/cosine) and a higher resolution encoder signal. The track pitch P (FIG. 20D) and a position of the magneto resistive elements MRE on the sensing member 20203H, 20203H', 20203H" may be matched such that differential sine and cosine outputs are obtained from each of the sensing members 20203H, 20203H', 20203H".

In this aspect the printed circuit board 20310 may include three sensing members 20503H1, 20503H2, 20503H3 (each capable of providing two differential signals) for obtaining position signals from a ferromagnetic track 20202 (see for example, FIGS. 20C and 21C) having three scales 20202S. In one aspect the sensing members 20503H1, 20503H2, 20503H3 (as well as the other sensors described herein) may be immovably fixed to the circuit board. In other aspects the sensing members (as well as the other sensors described herein) may be movably mounted to the circuit board so that the sensing members may be adjusted relative to their respective track 20202 scales 20202S. Referring to FIGS. 20C and 21C-21E, in one aspect the scales 20202S may represent a 3-scale Nonius pattern that includes a master scale 20202S1, a Nonius scale 202S2 and a segment scale 20202S3 but in other aspects the ferromagnetic track may include any suitable number of scales having any suitable positional relationship relative to one another. Here each scale 202102S may include A respective equally spaced pattern (e.g. each scale pattern may have a respective pitch P1, P2, P3) of ferromagnetic features 20202SE (e.g. slots, protrusions, etc.). For each scale 20202S there may be a dedicated sensing member 20503H1-20503H3 that is configured to provide analog signal outputs that substantially mimic, for example, sine and cosine waves. In one aspect one or more of the sensing members 20503H1-20503H3 may be arranged at any suitable angle $\alpha 1$, $\alpha 2$ relative to another of the sensing members 20503H1-20503H3 and/or a respective track 20202S1-20202S3. In other aspects the sensing members 20503H1-20503H3 may have any suitable position relationship relative to each other and/or the respective tracks 20202S1-20202S3. As may be realized, each scale period and number of ferromagnetic features 20202SE allows for a track design that can be used to decode the absolute position of the track by using any suitable Nonius interpolation approach.

Figure 22A:
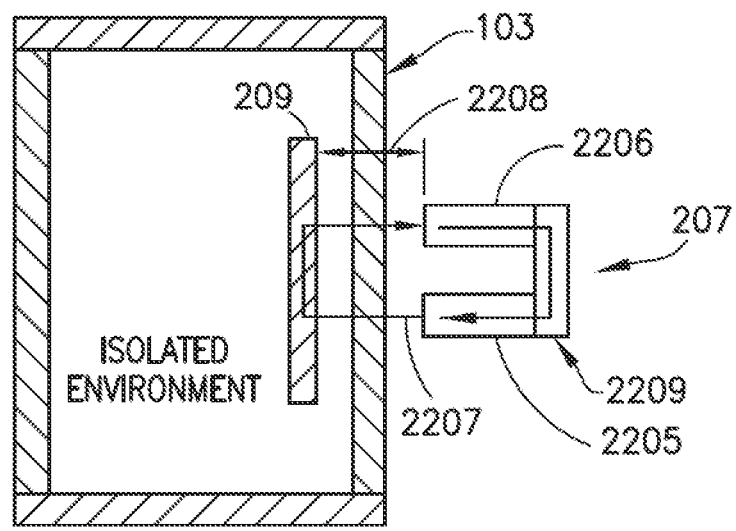
FIGS. 22A, 22B, 23A and 23B are schematic illustrations of a position feedback system and a chart of sensor output in accordance with aspects of the disclosed embodiment.

As described above, referring to FIGS. 22A and 22B, the position feedback system described herein may be a reluctance based sensing system substantially similar to that described in U.S. Pat. No. 8,283,813, previously incorporated herein by reference. For example, FIG. 22A illustrates an exemplary principle of operation of the reluctance based sensing system. As can be seen in FIG. 22A a read head, such as read head 207 (the other read heads, described herein may be substantially similar), located in, for example, the atmospheric environment may include a magnetic source 2205 and a sensing element 2206 connected through a backing 2209. The magnetic source 2205 may produce a magnetic flux 2207 that propagates through the isolation wall 103 and continues to the sensing element 2206 through, for example, track 209. The magnetic circuit may be closed by the backing 2209. The magnitude of the magnetic flux 2207 may be affected by distance 2208 between the source 2205 and the ferromagnetic element or track 209, and is measured by the sensing element 2206. The sensing element 2206 may include one or more magnetic flux sensors, which may operate based on, for example, the Hall effect principle, magnetoresistive principle or any other suitable principle suitable for sensing the magnitude of the magnetic flux 2207.

Figure 22B:
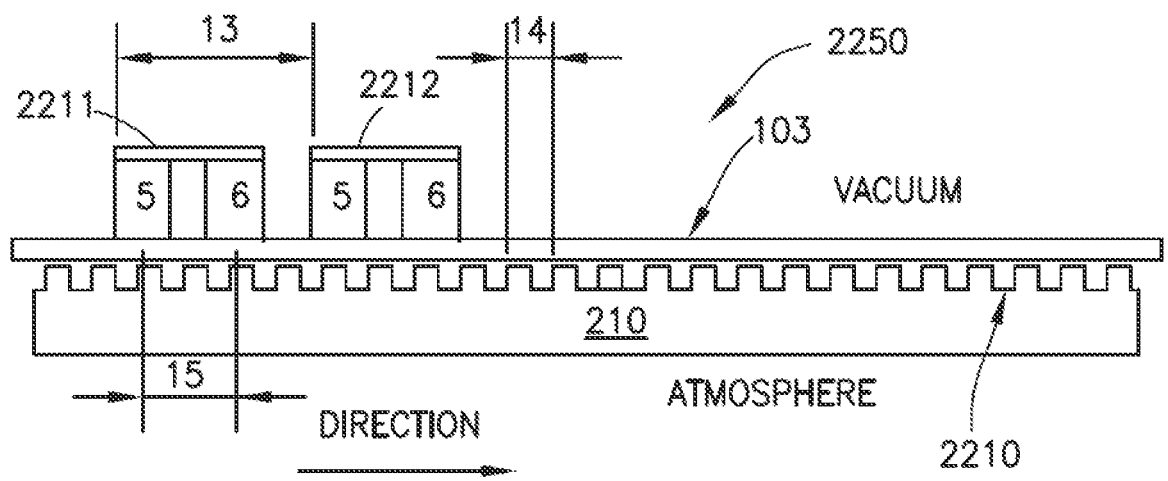

In one aspect, one or more read heads may be utilized to interact with each of the absolute and/or incremental track 209, 210 (see e.g. FIG. 2B) to provide coarse measurements of absolute position of the rotors of the robot drive and/or high resolution position of the rotors of the robot drive. Referring also to FIG. 22B, an incremental sensing system 2250 is illustrated, which may be used wherever read head 208 and incremental track 210 are used. In this aspect the incremental sensing system 2250 includes two read heads 2211, 2212 that may be substantially similar to read head 207 described above. In other aspects, any suitable number of read heads may be used. The read heads 2211, 2212 may interact with the incremental track 210 through the isolation wall 103. The incremental track 210 may include multiple periodic features 2210, having any suitable size and shape to affect gradually opening and closing the magnetic circuits of the read-heads 2211, 2212 as a function of the relative angular position of the track 210 with respect to each read-head 2211, 2212. In one aspect the track 210 may be incorporated substantially directly into the moving component (such as a rotor) or, in other aspects, otherwise affixed to the moving component in any suitable manner as a dedicated encoder disk. The signals generated by the read heads 2211, 2212 may be phase shifted, and may be processed in any suitable manner by any suitable controller, such as controller 190 to determine the position of the incremental track 210 within a distance that corresponds to one period of the periodic features 2210 of the incremental track 210.

Figures 23A, 23B:
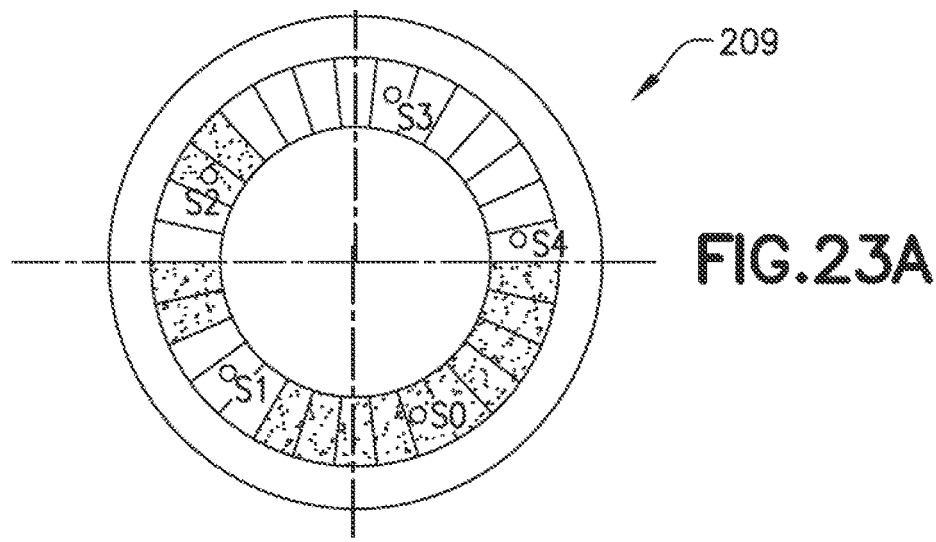

As may be realized, in addition to, for example, real-time (where real time refers to an operational deadline from an event to a system response) incremental position measurement capability, the position feedback systems described herein may include an additional arrangement (see read head 207 and track 209) for absolute position detection, which allows the position feedback system (which may include controller 190 or any other suitable controller) to uniquely identify a sector of the incremental track 210 that is interacting with the read heads at any given point in time. This absolute position detection may be used on start-up of the robot drive, for periodic verification of the position measurement and/or on demand during operation of the robot drive. In one aspect, referring to FIGS. 23A and 23B, the absolute track 209 may include a pattern of non-uniform sectors (which may include gray-type patterns so that one sensor changes state at a time) that are detected by one or more read-heads 207 where each sensor may represent one bit of an absolute position word. In this aspect, the absolute position track illustrated in FIG. 23A may provide a 5-bit absolute position resolution but in other aspects, any suitable position resolution may be provided that includes more or less than 5-bits. The corresponding 5-bit pattern, formed by the states of the read-heads (in this example there are five read-heads but in other aspects any suitable number of read-heads may be provided) as the track 209 rotates is illustrated in FIG. 23B.

As described above, the environment in which the rotating parts of the robot drive are located are isolated from the environment in which the stationary parts of the robot drive are located. This isolation is through the use of a non-magnetic isolation wall 103 or "can seal". It is noted that the thickness of the isolation wall plus, e.g., runout tolerances may impose constraints on the minimum air gap achievable between the rotor and stator. Also, to improve motor efficiency the air gap between the rotor and stator should be minimized, however where the isolation wall is used between the rotor and stator (e.g. such as to separate a vacuum environment from an atmospheric environment) the pressure differential on opposite sides of the isolation wall may impose a minimum thickness of the isolation wall. It is noted that the isolation wall 103 described above is integrated into the housing of the robot drive (e.g. the stator housing) however, in one aspect of the disclosed embodiment the isolation wall 2403 (see FIGS. 24A and 24B) may be integrally formed or otherwise integrated with the stator (e.g. separate from the drive housing) so that the stator structurally supports the isolation wall.

Figure 24A:
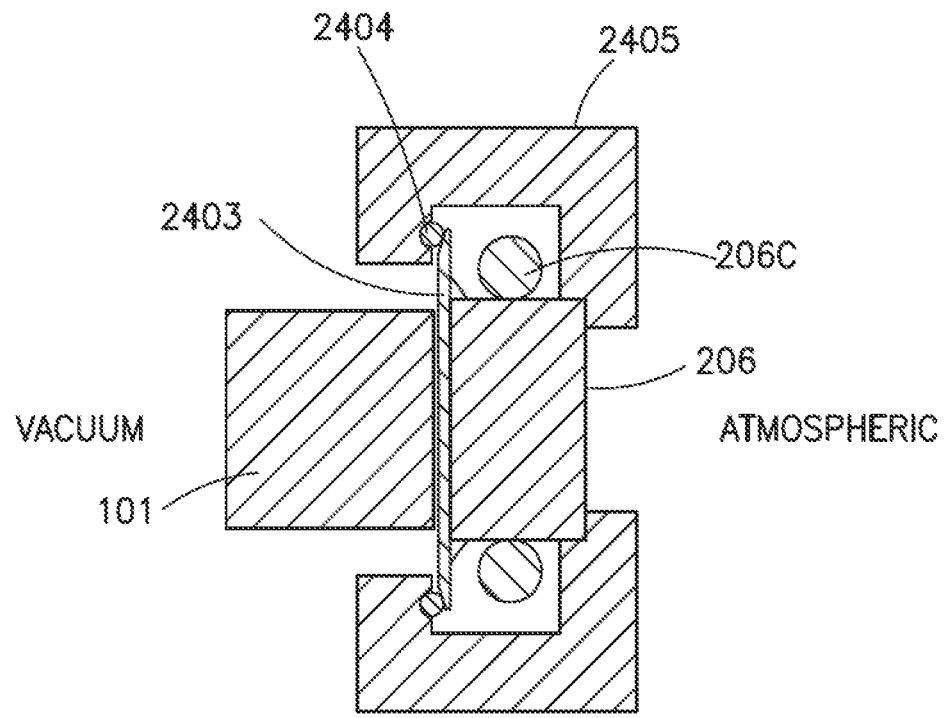
FIGS. 24A and 24B are schematic illustrations of portions of a drive motor in accordance with aspects of the disclosed embodiment.
Figure 24B:
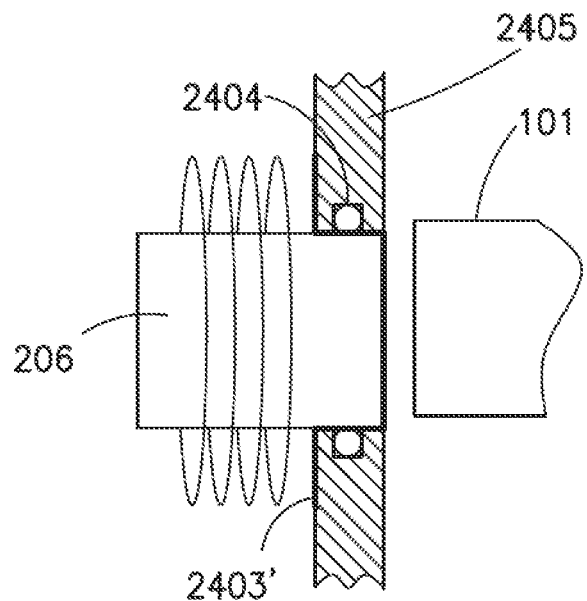

As can be seen in FIG. 24A the stator 206 includes drive coils 206C and is mounted (e.g. in an atmospheric environment or other suitable environment) to, for example, the stator/drive housing 2405 in any suitable manner. The stator/drive housing may have any suitable features or compression members that interlock to engage and bias against compressing sealing members so that the sealing members are held in place for assembly and to compress the sealing members for isolating different pressures between the interior and exterior of the drive housing. The difference in pressures may cause an isolation wall and/or housing compression members to compress suitable seals for sealing the inside environment of the drive housing. The stator structure may facilitate the seal compression and sealing as described herein (see e.g. FIG. 24A). The rotor 101 is mounted within, for example, a vacuum or other suitable environment that is isolated from the, e.g., atmospheric environment. Here an isolation wall 2403 which may be a thin membrane mounted to or otherwise coincident with the pole or core of the stator 206 so that the stator substantially supports the isolation wall. In one aspect the isolation wall 2403 may be structurally bonded to, for example, the inner diameter of (or any other suitable portion of) the stator in any suitable manner using any suitable bonding agent so that the isolation wall 2403 is integrated with (e.g. forms a unitary structure or assembly with) the stator 206 and/or depends from the stator 206. In another aspect the isolation wall 2403 may be a coating formed on or otherwise affixed to the pole or core of the stator 206. In this aspect the isolation wall 2403 may extend beyond the stator 206 to interface with stator/drive housing 2405. As may be realized, any suitable sealing member 2404 may be provided at the interface between the isolation wall 2403 and the stator/drive housing 2405. As can be seen in FIG. 24A the isolation wall 2403 may not support any additional structural loading other than the pressure differential loading between the vacuum and atmospheric environments (i.e. the pressure differential loading is shared between the isolation wall and stator). FIG. 24B illustrates another example, of the isolation wall 2403' where the isolation wall is further integrated with the stator 206. Here the isolation wall 2403' may be substantially similar to isolation wall 2403 however in this aspect the isolation wall 2403' may substantially conform to (e.g. wrap around or otherwise assume the shape of) a portion the stator 206 that extends at least partially through the stator/drive housing 2405. In this aspect the isolation wall 2403' is supported by the stator 206 substantially everywhere the isolation wall interfaces with the environment (e.g. the vacuum environment) in which the rotor is located. Here the sealing member 2404 may lie in a different plane than described above with respect to FIG. 24A for sealing the interface between the isolation wall 2403' and the stator/drive housing 2405 to isolate the isolated environment. In other aspects the sealing member may be included in a stator to isolation wall or can interface. For example the sealing member may be positioned in the in or on the isolation wall.

Figure 25A:
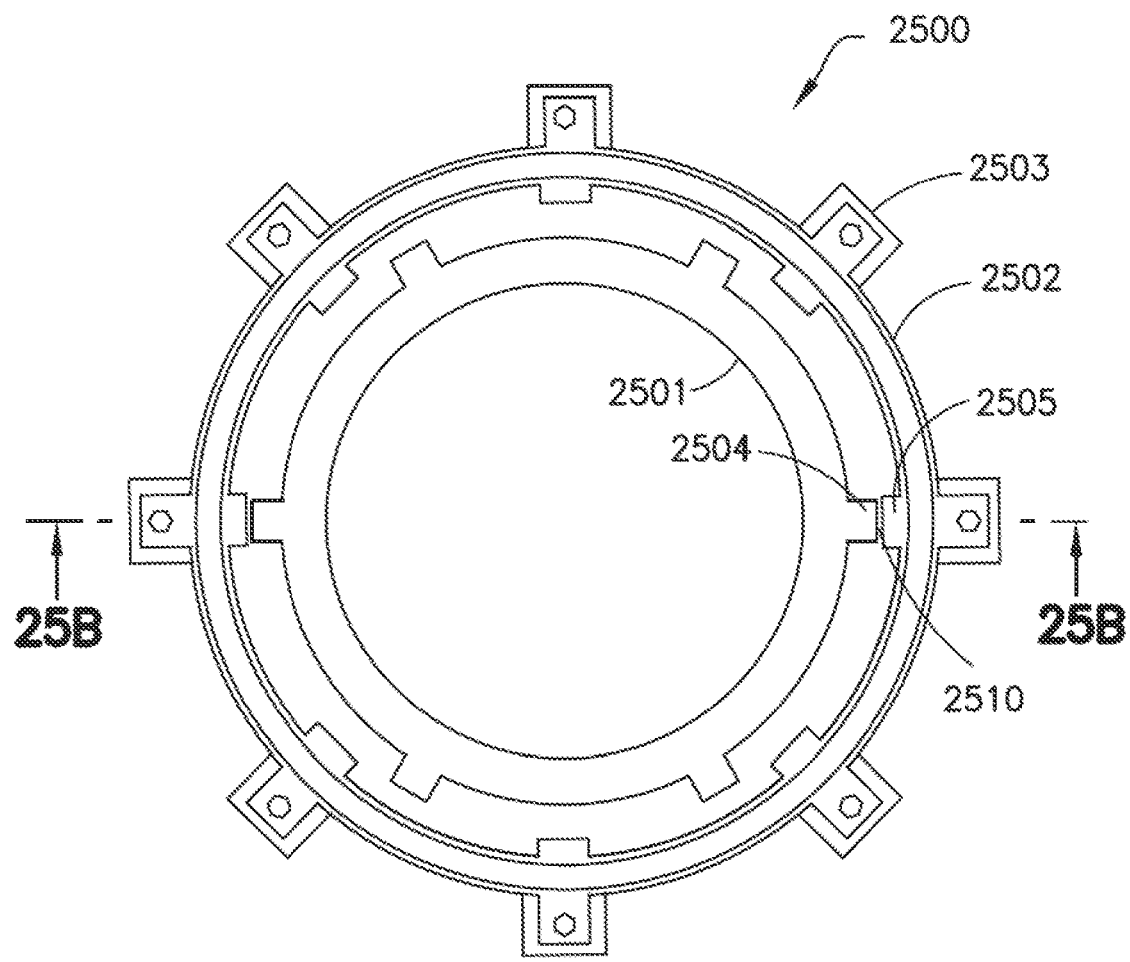
FIGS. 25A, 25B and 25C are schematic illustrations of portions of a drive motor in accordance with aspects of the disclosed embodiment.
Figure 25B:
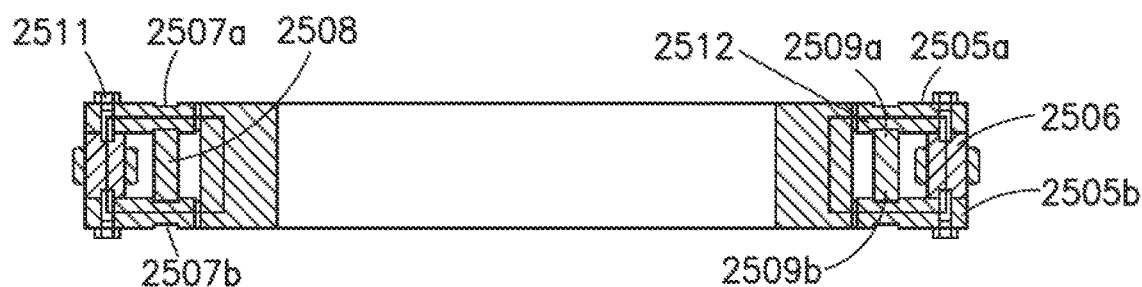

Referring now to FIGS. 25A and 25B, a sealed drive or actuator 2500 is shown in accordance with an aspect of the disclosed embodiment. The rotor 2501 may be substantially similar to those described above and may be located entirely within the isolated environment. The ferromagnetic stator 2502 may be substantially similar to those described above and may include a set of coil units 2503, salient poles 2505, two ferromagnetic plates 2505a and 2505b (e.g. stator plates) and set of ferromagnetic coil cores 2506 where the coils 2503 are installed or wound. A non-magnetic isolation wall 2508 may be attached to the top and bottom stator plates 2505a and 2505b (to form a stator/isolation wall module) in any suitable manner such as with, for example, mounting screws 2511 so that the stator plates extend beyond the isolation wall into the sealed or otherwise isolated environment and so that the coils 2506 are isolated from the sealed environment. Top and bottom sealing member 2509a and 2509b, which may be any suitable sealing members such as o-rings, may be placed along a groove or other recess along the top and bottom surfaces of the isolation wall 2508. The top and bottom stator plates 2505a and 2505b may have features 2507a and 2507b that allow for additional stator/isolation wall modules to be stacked one above the other as will be described in greater detail below. In this aspect there may be any suitable number of coils (8 coils are shown for exemplary purposes) which can be wired in pairs such that coils in each pair are diametrically opposed to each other forming, for example, a 4 phase motor. In other aspects the motor(s) may have any suitable number of phases. The rotor poles 2504 illustrated in FIG. 25A can be constructed of any suitable ferromagnetic material and the resulting rotor/stator pair may form a variable or switched reluctance motor. In other aspects, the isolation wall configurations described herein may be used in Brushless DC motors with permanent magnet rotor poles or any other suitable motor in which the rotating parts of the motor are isolated from the stationary parts of the motor. In this aspect the magnetic flux path 2512 is indicated as being along the axial direction which may lower Eddy current losses. In other aspects, as will be described below, the flux may flow radially. As can be seen in FIGS. 25A and 25B, the stator plates 2505a, 2505b extend beyond the isolation wall 2508 into the sealed environment so that the air gap 2510 between the rotor pole 2504 and stator pole 2505 is not constrained by any isolation wall (e.g. the interface is a substantially interference free interface and there is substantially no resistance to the magnetic flux path at the interface between the stator pole and the rotor pole) and it can be as small as the mechanical tolerances between the parts allow. As a result, the motor configuration shown in FIGS. 25A and 25B may have a higher torque capacity than its counterpart with an isolation wall disposed in the air gap 2510 between the stator and rotor. As may be realized, the rotor 2501 torque may be generated by energizing the appropriate phase(s) using position feedback and the torque-current-position curves of the respective rotor/stator design so that torque ripple intrinsic to switched reluctance motors is minimized in any suitable manner.

Figure 25C:
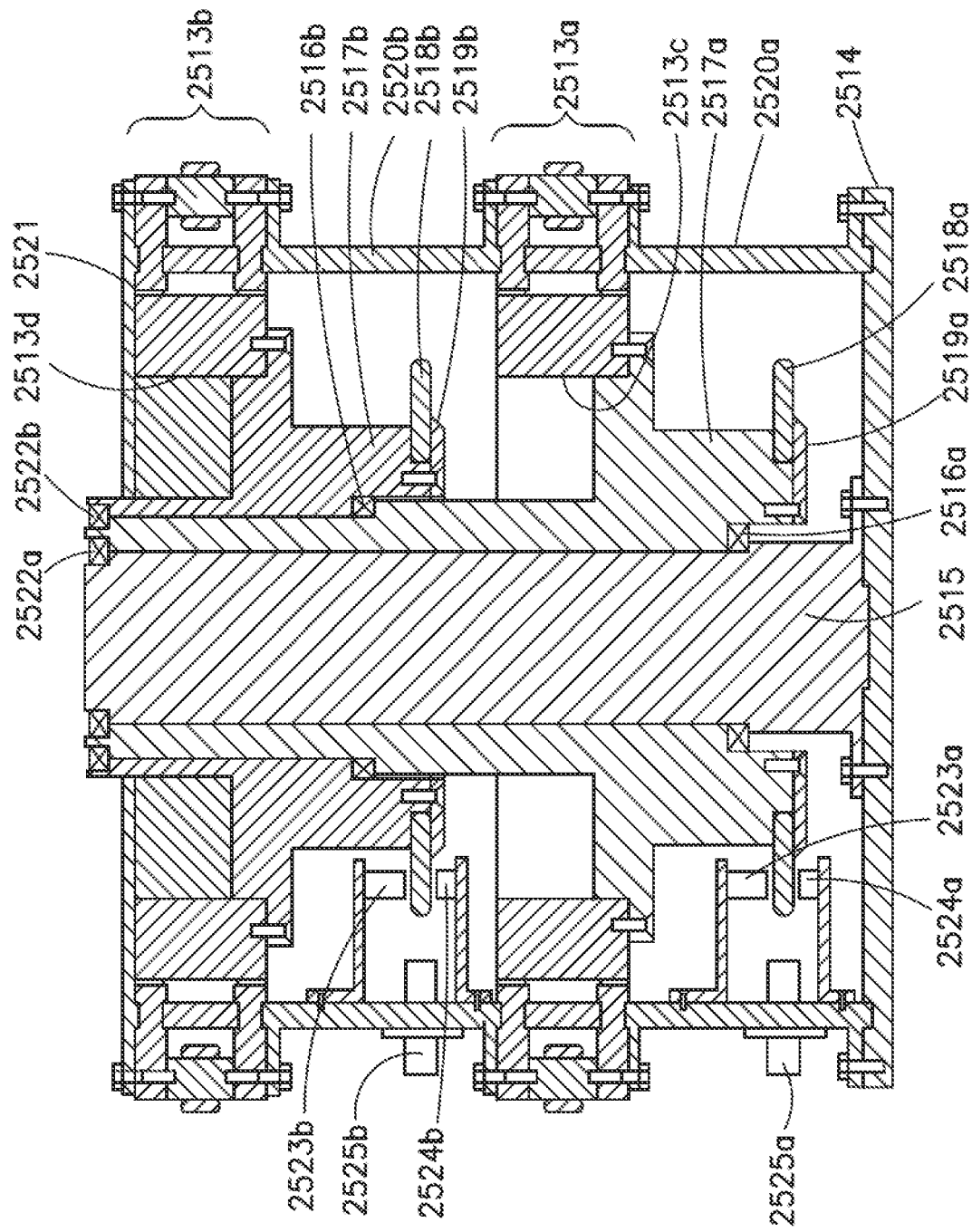

Referring now to FIG. 25C a two axis sealed robot drive is illustrated in accordance with aspects of the disclosed embodiment using for example, stator/isolation wall modules described above with respect to FIGS. 25A and 25B. Again, as described above, all moving parts of the motors are located within the isolated environment. In this aspect the drive includes a bottom plate 2514 that pilots or otherwise supports a center stationary shaft 2515. Inner drive shaft 2517a may be mounted to shaft 2515 in any suitable manner such as with bearings 2516a and 2522a allowing rotational motion of inner shaft 2517a relative to stationary shaft 2515. Rotor 2513c may be rigidly attached to inner shaft 2517a and propelled along the rotational direction by stator 2513a by, for example, electromagnetic forces. As may be realized, the stator 2513a and rotor 2513c pair forms a motor that generates motion torque to the inner shaft 2517a. The outer drive shaft 2517b may be mounted to the inner drive shaft 2517a in any suitable manner such as by bearings 2516b and 2522b such as to provide relative rotation between the shafts 2517a, 2517b. The outer shaft 2517b may be propelled in a similar manner as described above such that stator 2513b and rotor 2513d forming a second motor generates motion torque to rotate the outer shaft 2517b. The position feedback sensor(s) for the inner and outer shafts 2517a, 2517b, which may be substantially similar to that described above, is/are positioned for tracking movement of each shaft. Here the position feedback system is illustrated as an optical feedback system but in other aspects the feedback system may be a reluctance based feedback system as described above so that the position feedback system operates without any feed throughs or viewports. Here the position feedback system may include an encoder disk 2518a that is affixed to the inner shaft 2517a in any suitable manner such as with fastener 2519a. A read head 2525a (including emitter 2523a and receiver 2524a) whose signals are routed to the outside of the isolated environment in any suitable manner across the isolation wall/stator housing 2520a. The outer shaft position feedback operation is similar to the inner shaft described above and may include read head 2525b including emitter 2523b and receiver 2524b, and encoder disk 2518b (affixed to the outer shaft 2517b). The stators 2513a and 2513b may be mounted to isolation walls/stator housing 2520a and 2520b, respectively. Each isolation wall/stator housing interfaces with each stator via a recessed feature (or equivalent interface) and any suitable static seal element or member such as an o-ring. The top flange 2521 and bottom plate 2514 also interface in a similar way with stator 2513b and isolation wall/stator housing 2520a, respectively. The inner shaft 2517a and outer shaft 2517b constitute a two degree of freedom system that can be used to drive a 2 link manipulator (e.g. robot arm) located within the isolated environment. As may be realized, additional motors may be stacked to form drives having any suitable number of degrees of freedom. Note that there is no isolation wall between the rotor and stator ferromagnetic poles (e.g. the stator plates 2505a, 2505b extend beyond the isolation wall 2508 into the isolated environment) allowing for better torque capacity compared to conventional "Can-Seal" options where the isolation wall is disposed between the stator and rotor.

Figure 26A:
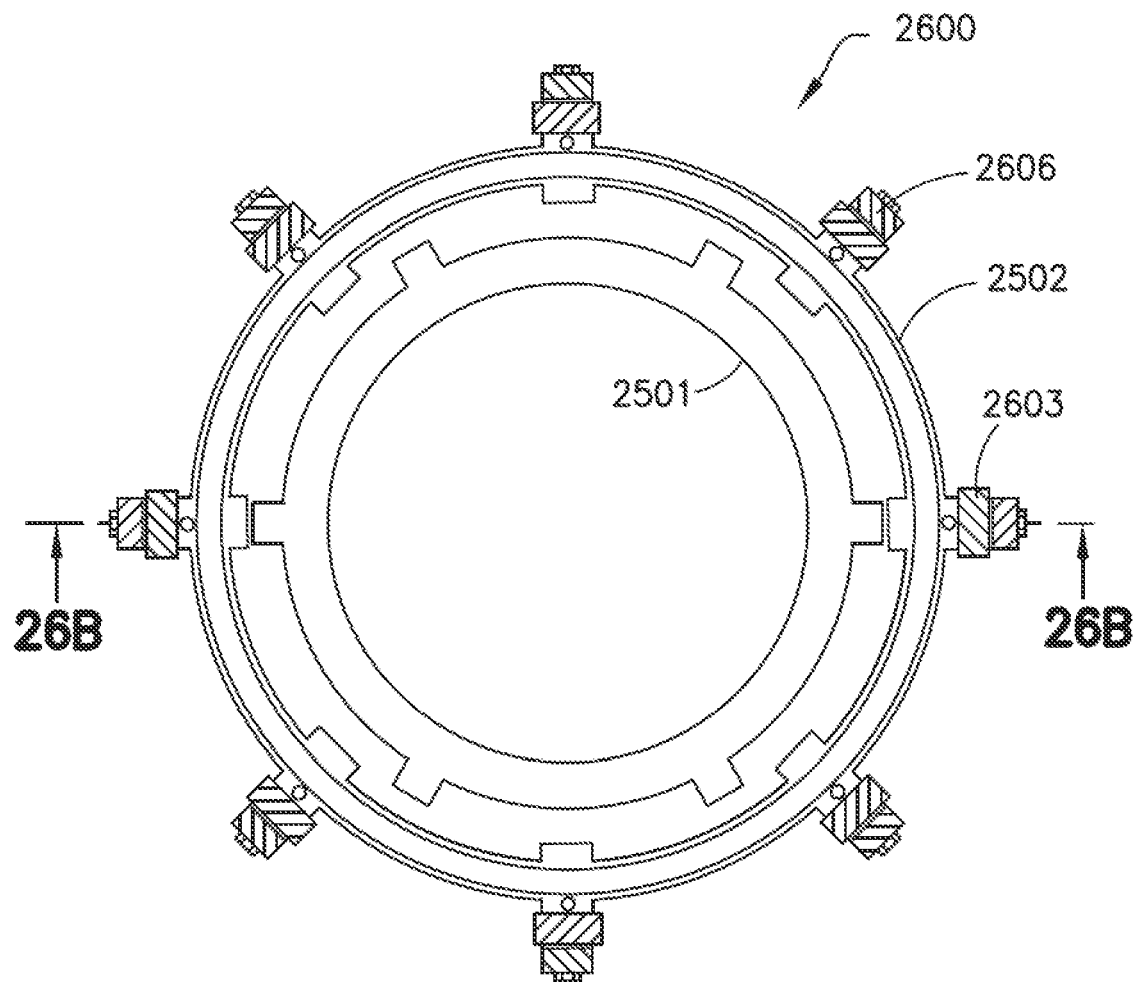
FIGS. 26A and 26B are schematic illustrations of portions of a drive motor in accordance with aspects of the disclosed embodiment.
Figure 26B:
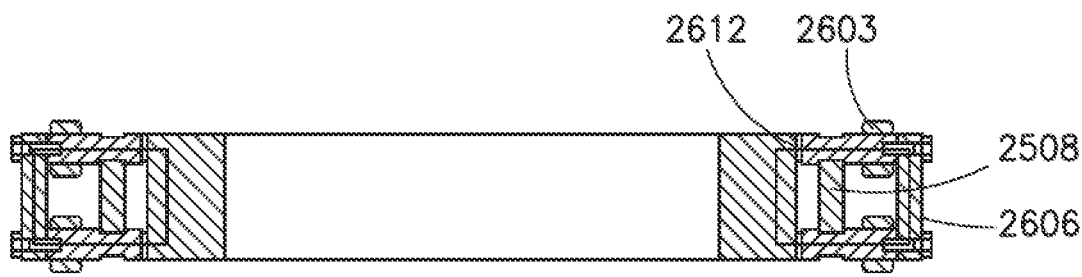

Referring now to FIGS. 26A and 26B a sealed drive 2600 is shown in accordance with aspects of the disclosed embodiment. The drive 2600 may be substantially similar to drive 2500 described above unless otherwise noted. In this aspect the coils 2603 of the stator 2606 are mounted in a different orientation than the coils 2506. However the magnetic flux path 2612 is substantially similar to the magnetic flux path 2512 so that the drives 2500, 2600 operate using similar principles.

Figure 27A:
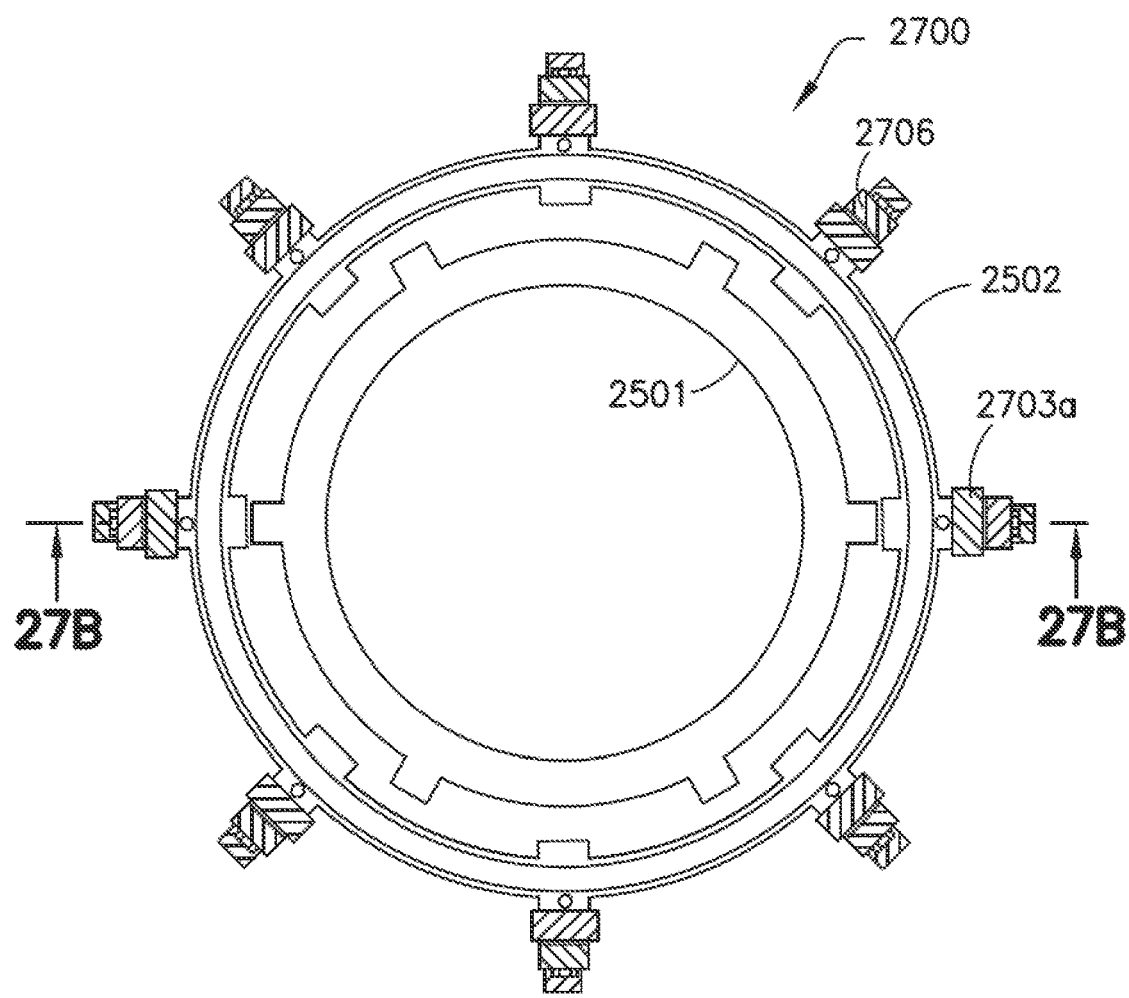
FIGS. 27A and 27B are schematic illustrations of portions of a drive motor in accordance with aspects of the disclosed embodiment.
Figure 27B:
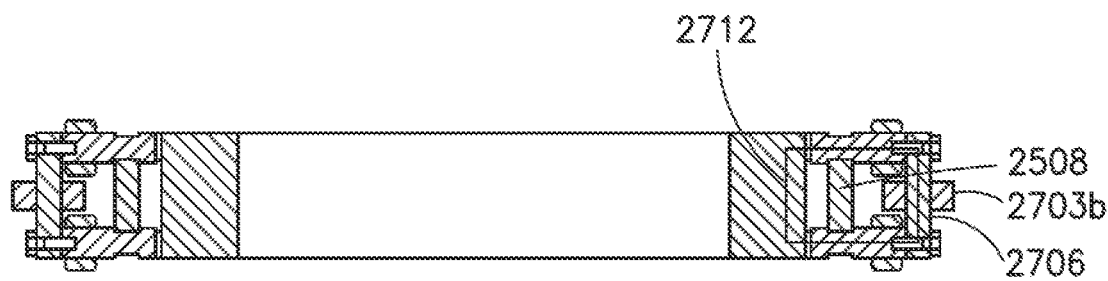

Referring to FIGS. 27A and 27B a sealed drive 2700 is shown in accordance with aspects of the disclosed embodiment. The drive 2600 may be substantially similar to drive 2500 described above unless otherwise noted. In this aspect, coils 2703a and 2703b of the stator 2706 may be mounted in radial and axial orientations. However, the resulting magnetic flux path 2712 is substantially similar to the flux path 2512.

Figure 28A:
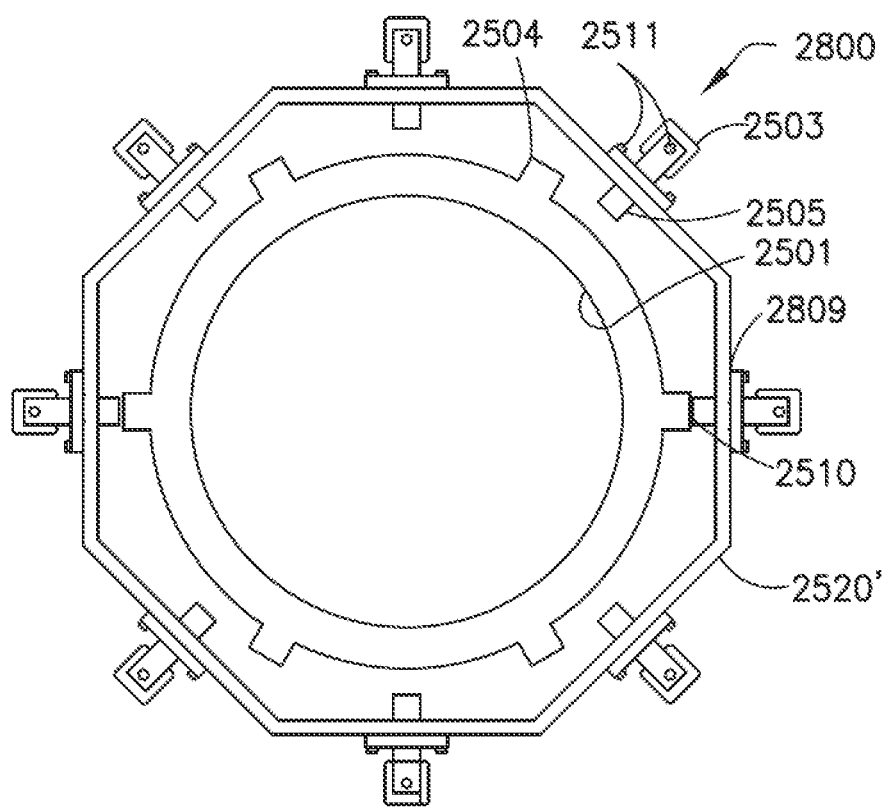
FIGS. 28A, 28B, 28C, 28D, 28E, 28F, 28G, 28H and 28I are schematic illustrations of portions of a drive motor in accordance with aspects of the disclosed embodiment.
Figure 28B:
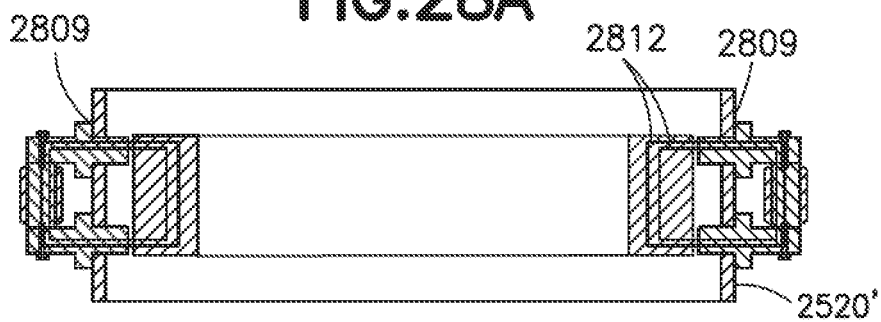
Figure 28C:
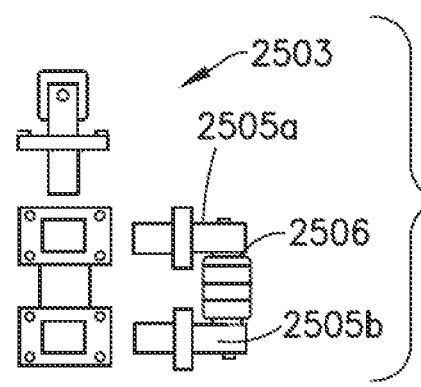
Figure 28D:
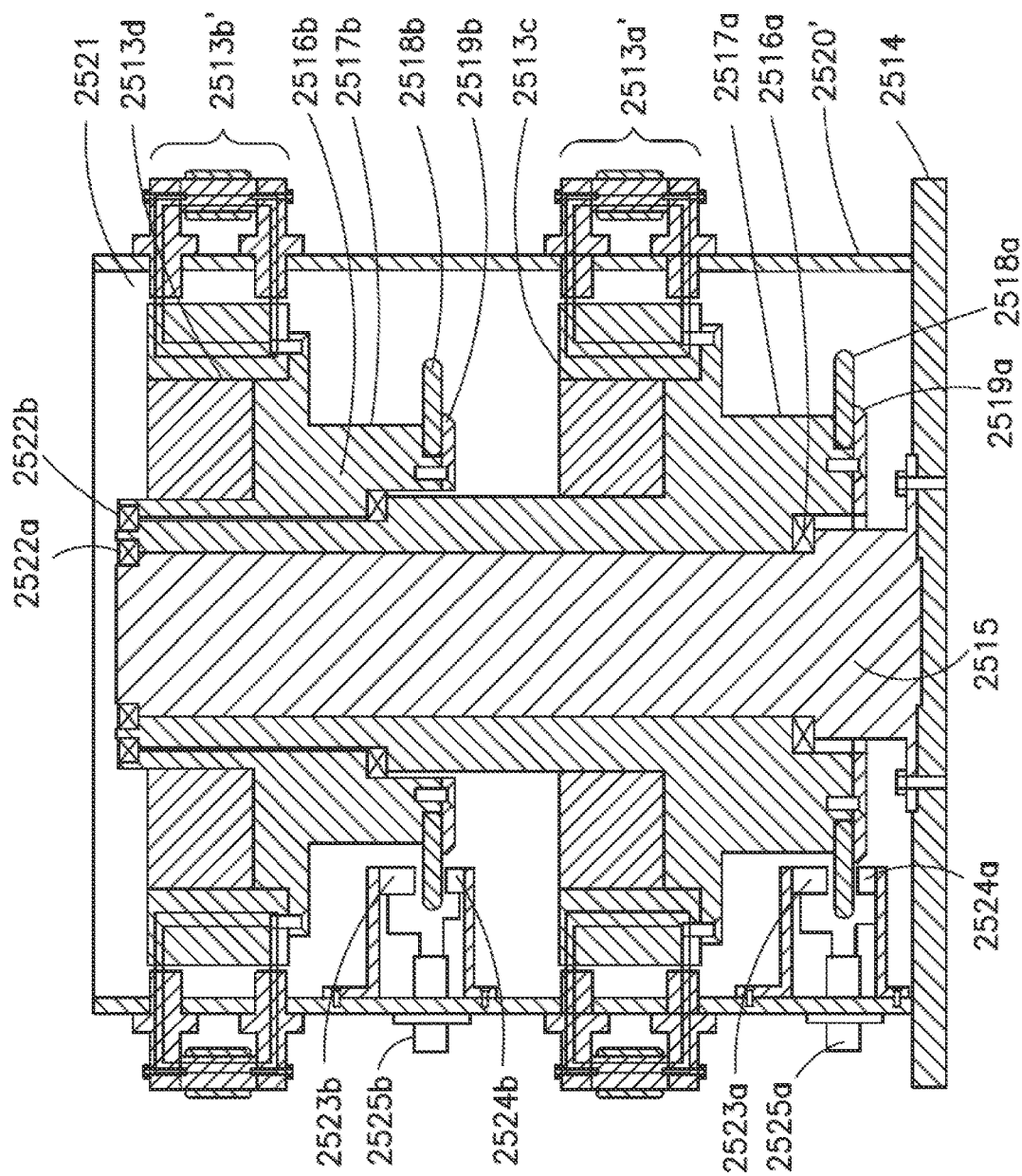

Referring now to FIGS. 28A-28C a sealed robot drive 2800 is illustrated in accordance with aspects of the disclosed embodiment. The drive 2800 may be substantially similar to drive 2500 unless otherwise noted. In this aspect, the coil units 2503 may be removably mounted substantially directly on the isolation wall/stator housing 2520' so that the number of drive motor parts is reduced to allow for scalability of different rotor diameters (e.g. the coil units 2503 form stator modules that may be affixed to housings having any suitable diameter for form a stator having diameter corresponding to the housing diameter). As may be realized, suitable static sealing members 2809 may be disposed between, for example, flanges in each of the stator plates 2505a, 2505b and the isolation wall/stator housing 2520'. The direction of the magnetic flux 2812 in this aspect may be substantially similar to the direction of magnetic flux 2512 described above. Referring also to FIG. 28D a two axis sealed drive assembly including stacked drives 2500 is shown. The drive assembly of FIG. 28D may be substantially similar to that shown in FIG. 25C unless otherwise noted. Here isolation wall/stator housing 2520' may be utilized as a common mounting structure for each stator 2513a' and 2513b'. It is noted that the isolation wall/stator housing 2520' may also be used as a housing to support any suitable stationary components of the drive such as, for example, the position feedback apparatus 2523a, 2524a, 2525a and 2523b, 2524b 2525b.

Figure 28E:
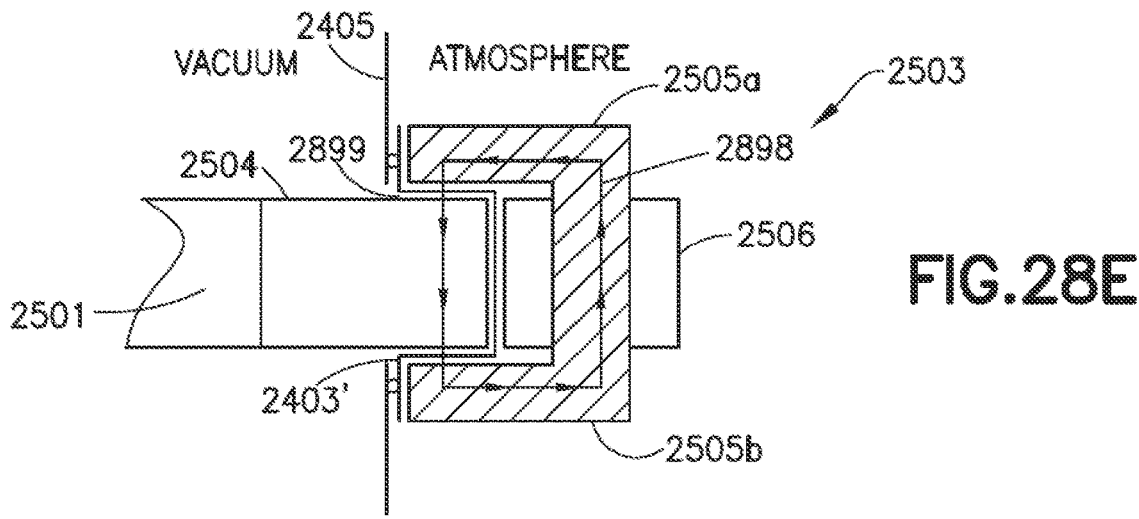
Figure 28F:
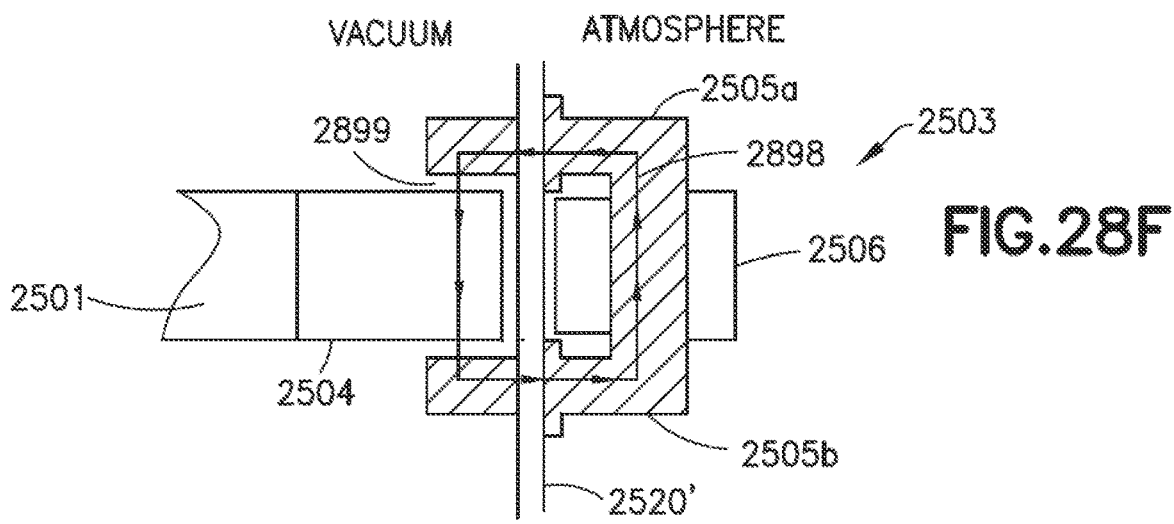
Figure 28G:
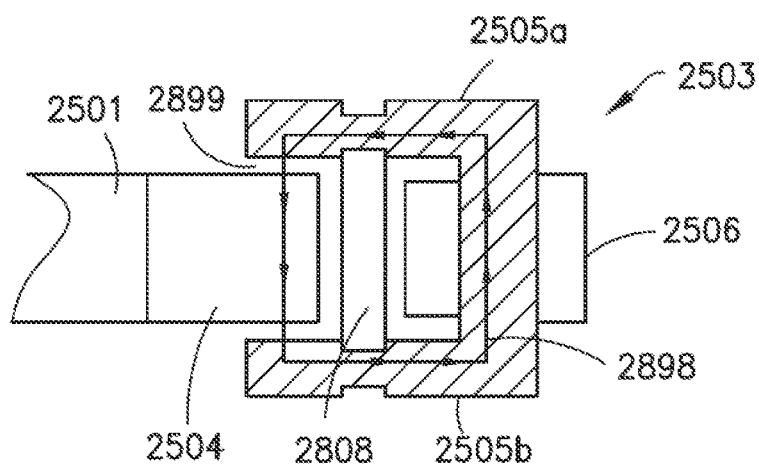
Figure 28H:
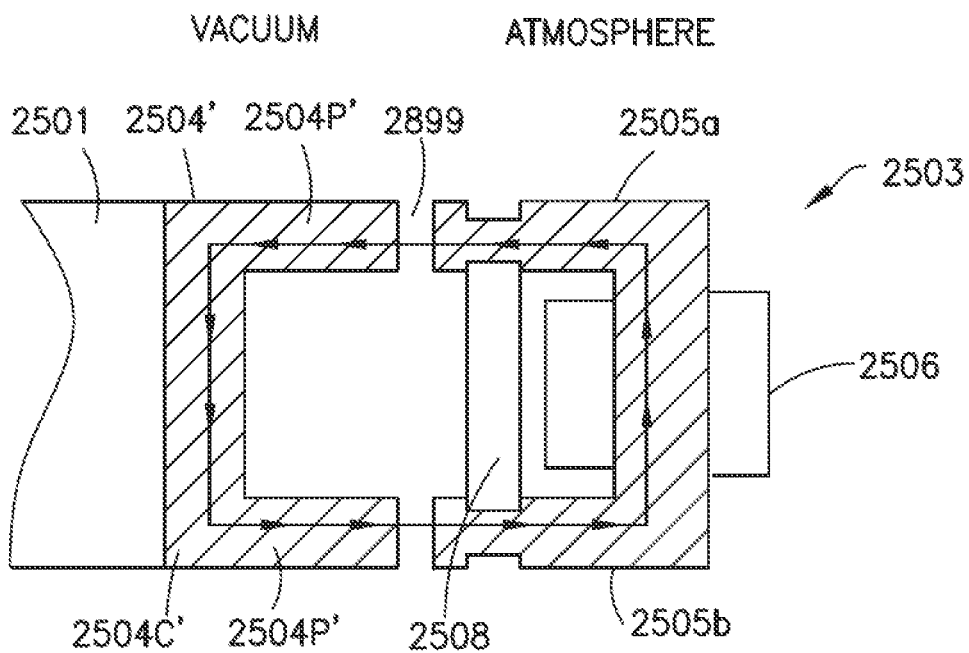
Figure 28I:
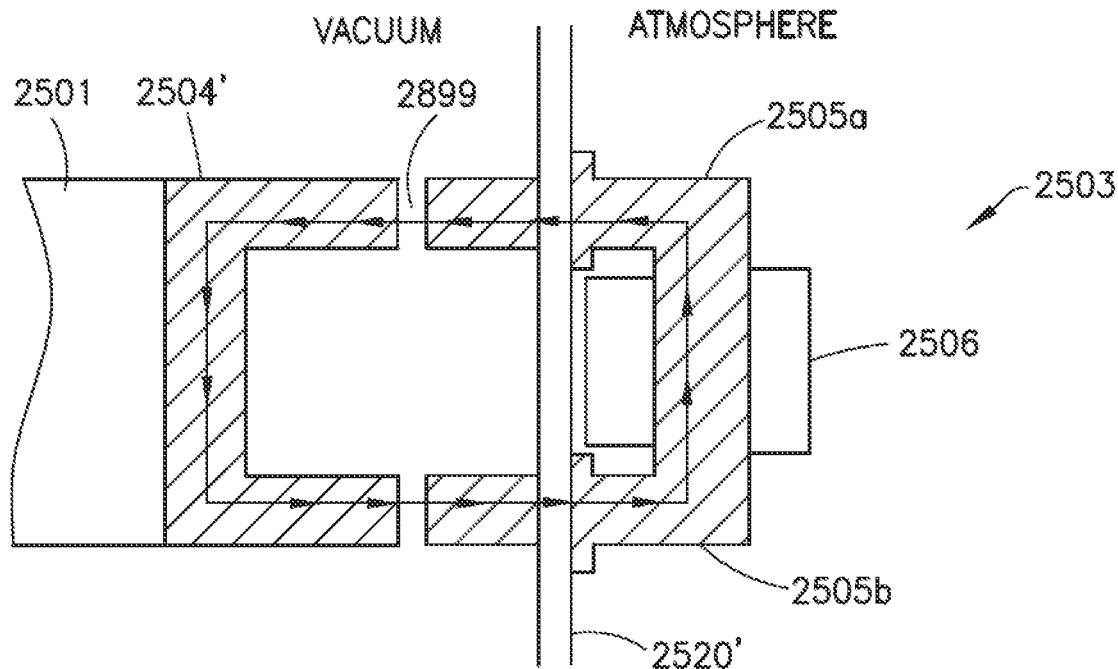

As may be realized, the stator poles and rotor poles may be arranged so that the air gap located between the poles is arranged radially or axially with respect to an axis of rotation of the rotor. For example, in FIGS. 24A-28B the arrangement of the stator poles and rotor poles is such that the air gap is arranged axially (e.g. so that there is a radial flow of flux through the air gap between the stator and rotor poles). In other aspects, referring to FIGS. 28E, 28F and 28G the stator and rotors may be arranged so that the air gap between the stator and rotor poles is arranged radially (e.g. so that there is an axial flow of flux 2898 through the air gap between the stator and rotor poles). For example, referring to FIGS. 28E and 28F, the stator coil units 2503 may be substantially similar to those described above with respect to, for example, FIGS. 25A-28D or any other suitable coil unit as described herein. The coil units 2503 may be sized so that the rotor poles 2504 are disposed substantially between the stator plates 2505a, 2505b and/or between stator extensions (which will be described below) so that the stator plates/extensions axially overlap the rotor pole to form the radial air gap 2899. In one aspect the isolation wall/seal 2403' may be substantially similar to seal 2403 where the stator plates 2505a, 2505b do not extend through the stator housing 2405. In other aspects the isolation wall may be substantially similar to isolation walls 2508 and/or 2520' described above where the stator plates extend through the stator housing/isolation wall. Referring also to FIGS. 28H and 28I, the rotor poles may have any suitable shape for receiving the flux from the stator poles. In this aspect the rotor poles 2504' may be substantially "C" or channel shaped such that the rotor poles has a rotor pole core 2504C' and rotor pole plates 2504P' extending/depending from the rotor pole core 2504C' such that the rotor pole plates 2504P' are substantially aligned with a respective one of the stator plates 2505a, 2505b. Here there is a radial flux flow through the air gap 2899 between the stator plates 2505a, 2505b and the rotor pole plates 2504P' but in other aspects the rotor pole core and rotor pole plates may be arranged to provide an axial flux flow through the air gap in a manner substantially similar to that described above.

Figure 29A:
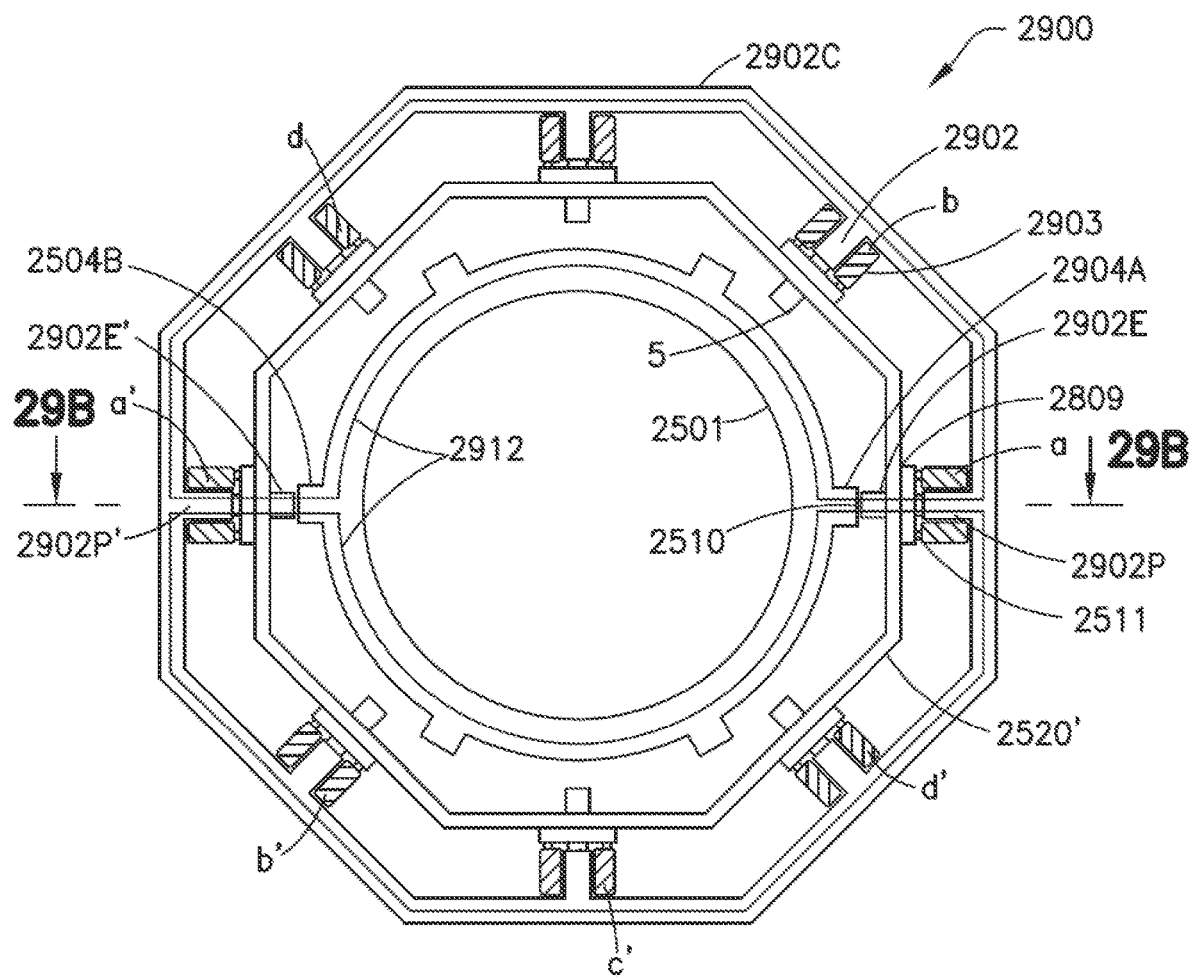
FIGS. 29A, 29B and 29C are schematic illustrations of portions of a drive motor in accordance with aspects of the disclosed embodiment.
Figure 29B:
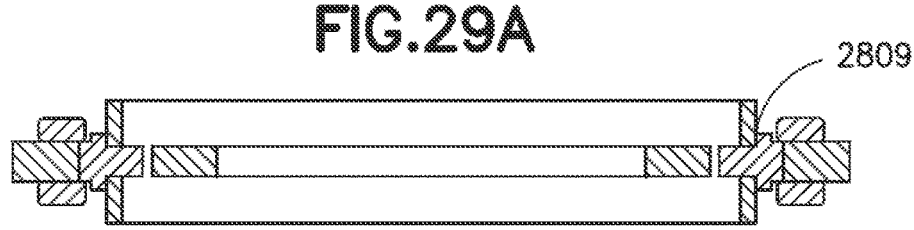
Figure 29C:
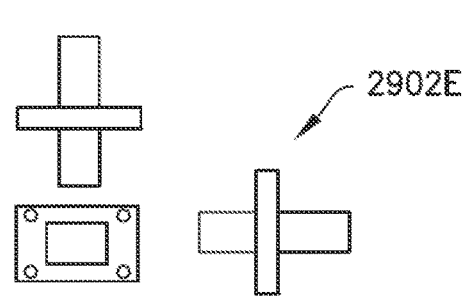

While the aspects of the disclosed embodiment described above have a magnetic flux path that is along the axial direction (longitudinal or vertical) it should be understood that the aspects of the disclosed embodiment are not limited by the direction of the flux so that either axial or radial machines can be utilized. For example, FIGS. 29A-29C illustrate a radial flux sealed drive 2900 in accordance with aspects of the disclosed embodiment. In this aspect, stator 2902 includes a ferromagnetic stator core 2902C having stator poles 2902P, 2902P' that include coils 2903 at each stator pole. Each stator pole 2902P, 2902P' may include a respective stator pole extension 2902E, 2902E' that interfaces with and extends beyond the isolation wall/stator housing 2520' in a manner substantially similar to that described above. In one aspect the stator pole extension 2902E may be removable from the respective stator pole 2902P. Each stator pole extension 2902E may be mounted to the isolation wall/stator housing 2520' in any suitable manner, such as with fasteners 2511, so that each stator pole extension 2902E is aligned with a respective pole 2902P of the stator 2902. Each stator pole extension 2902E may be in substantial contact and/or close contact (e.g. with minimal clearance) with its respective stator pole 2902P such that there is substantially no resistance to the magnetic flux path at the interface between the stator pole extensions and the respective stator pole. In other aspects the stator pole extensions may be integral to (e.g. of unitary one-piece construction with) their respective stator poles. In this aspect, for exemplary purposes only, the stator includes a set of 8 stator modules 2902 having coils a, a', b, b', c, c', d and d', however in other aspects the stator may include any suitable number of stator modules having any suitable number of coils. Here each diametrically opposed coil pair can be wired in any suitable manner, such as for example, in series to form a 4-phase machine. In other aspects any suitable number of phases may be provided. In this aspect the magnetic flux path 2912 is indicated along the radial direction when phase a-a' is energized. As can be seen in FIG. 29A, the flux 2912 flows from the stator pole 2902P, along the pole extension 2902E, across the air gap 2510, reaching the rotor pole 2504A, moving along the rotor circumference, reaching the diametrically opposite rotor pole 2504B, pole extension 2902E' and stator pole 2902P'.

The magnetic flux is "closed" by a set of return paths along the stator ferromagnetic core 2902C. In one aspect the stator 2902 can be made of a stack of any suitable laminated ferromagnetic sheets.

Figure 30A:
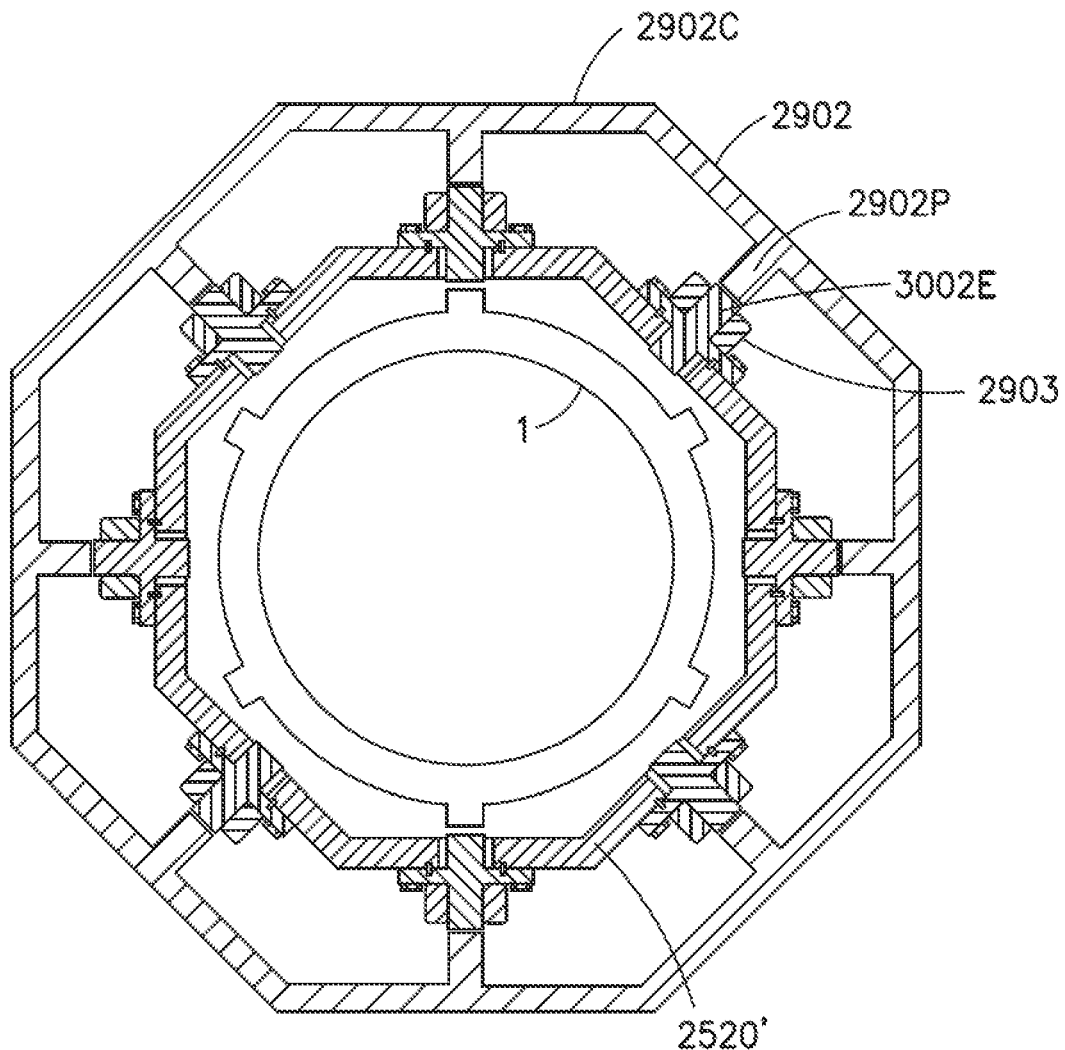
FIGS. 30A and 30B are schematic illustrations of portions of a drive motor in accordance with aspects of the disclosed embodiment.
Figure 30B:
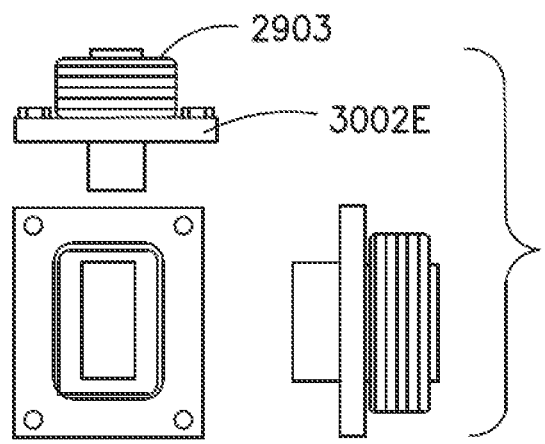

Referring to FIGS. 30A and 30B, in another aspect of the disclosed embodiment, which is substantially similar to that described above with respect to FIGS. 29A-29C, the coils 2903 may be integrated with the stator pole extensions 3002E. In this aspect the stator core 2902C may include a lamination stack that can be preassembled (e.g. aligned and welded or affixed in any suitable manner which may be substantially similar to that described above with respect to the laminated rotor). In other aspects the stator core may be a solid ferromagnetic core that is formed in any suitable manner.

Figure 31:
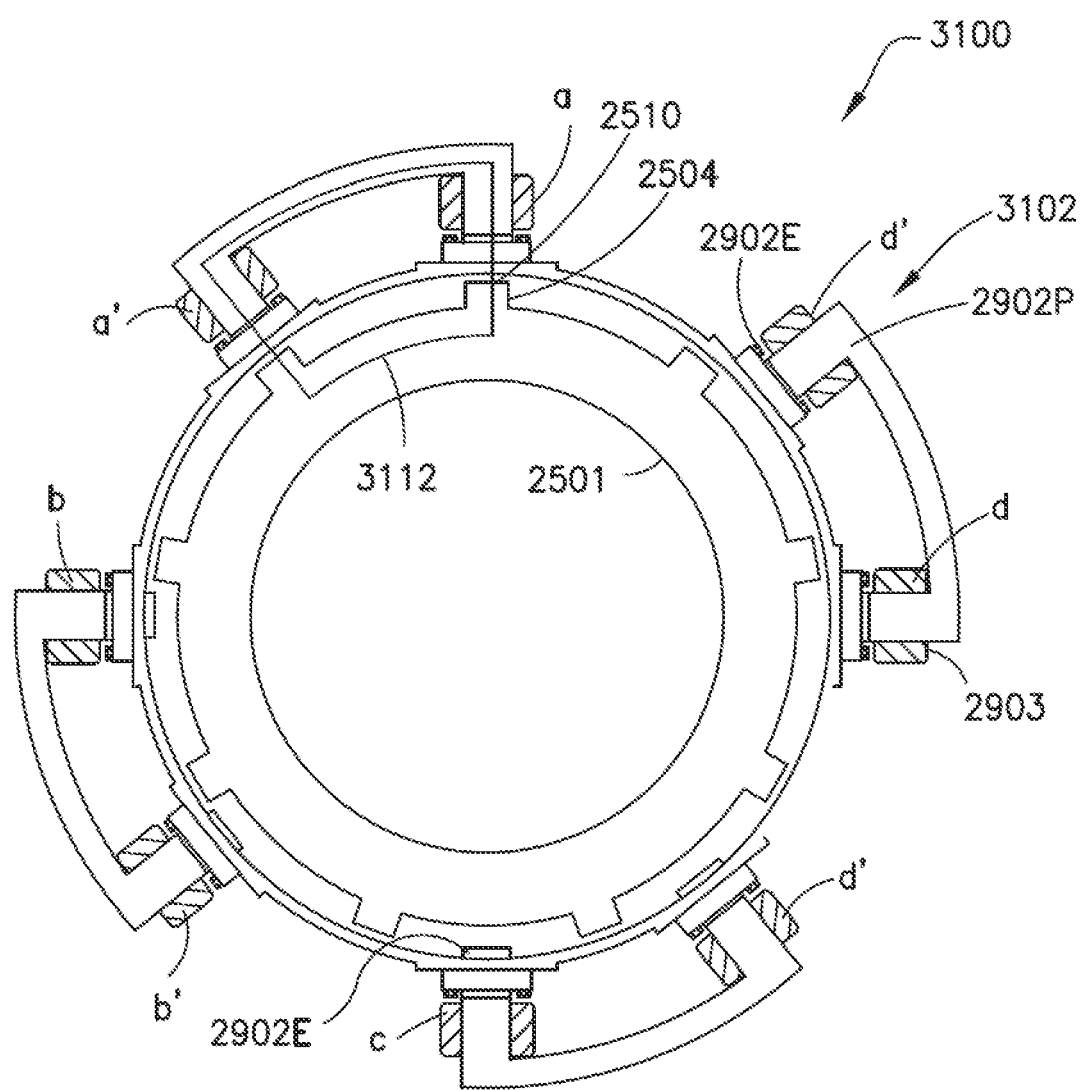
FIGS. 31, 32 and 33 are schematic illustrations of portions of a drive motor in accordance with aspects of the disclosed embodiment.

FIG. 31 illustrates a radial flux sealed drive 3100 in accordance with aspects of the disclosed embodiment. In this aspect the drive includes a segmented stator 3102 but is otherwise substantially similar to drive 2900 described above. In other aspects the stator pole extensions 2902E may be substantially similar to stator pole extension 3002E with integral coils 2903. In this aspect the stator poles 2902P may not be evenly distributed (e.g. have an uneven distribution) around the circumference of the stator 3102. The rotor poles 2504 may align with stator poles 2902P in such a way that they are not diametrically opposed (e.g. they are diametrically unopposed) to each other. Here the magnetic flux path 3112 is a radial flux path that is along the plane of the rotor.

Figure 32:
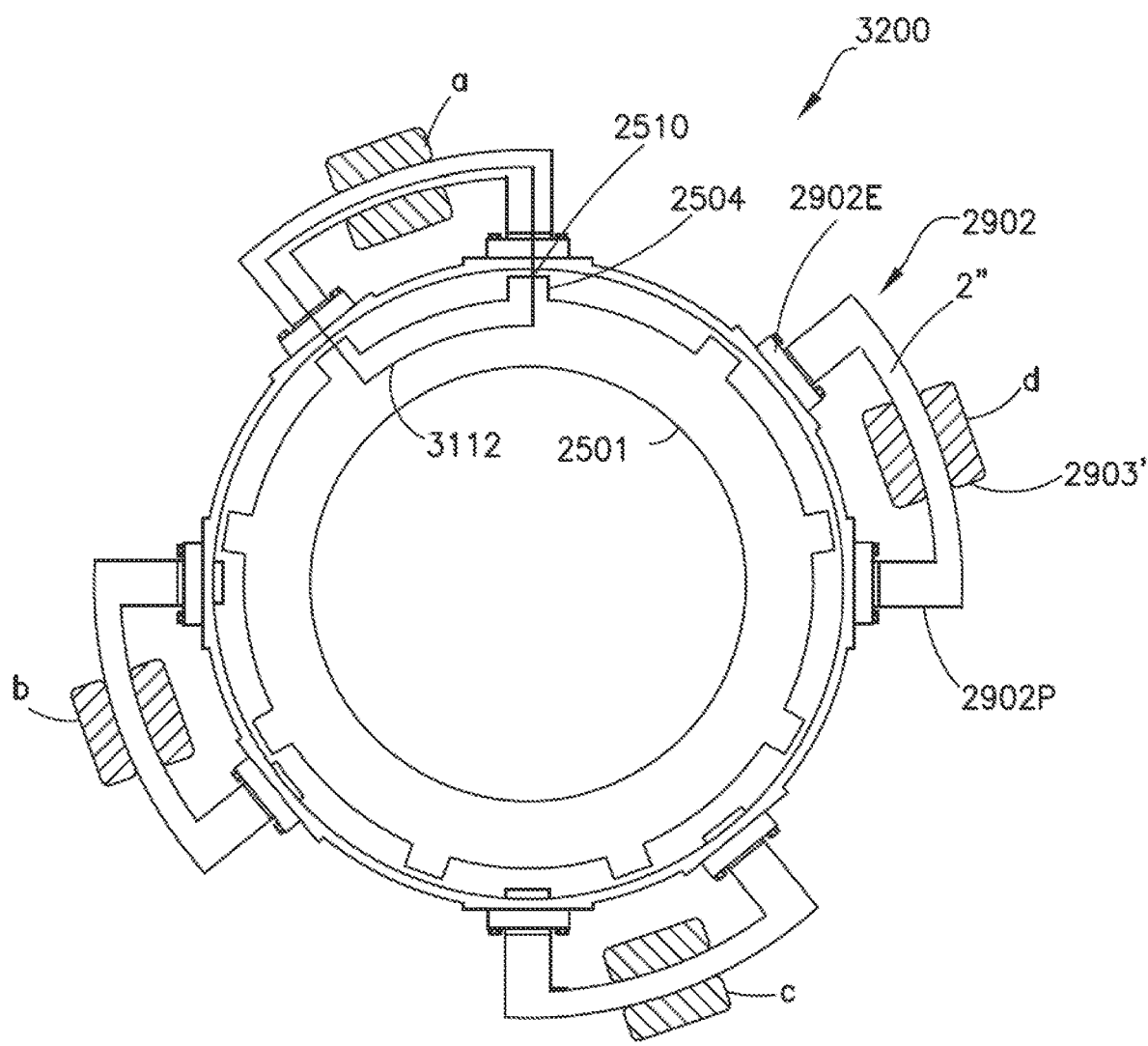
Figure 33:
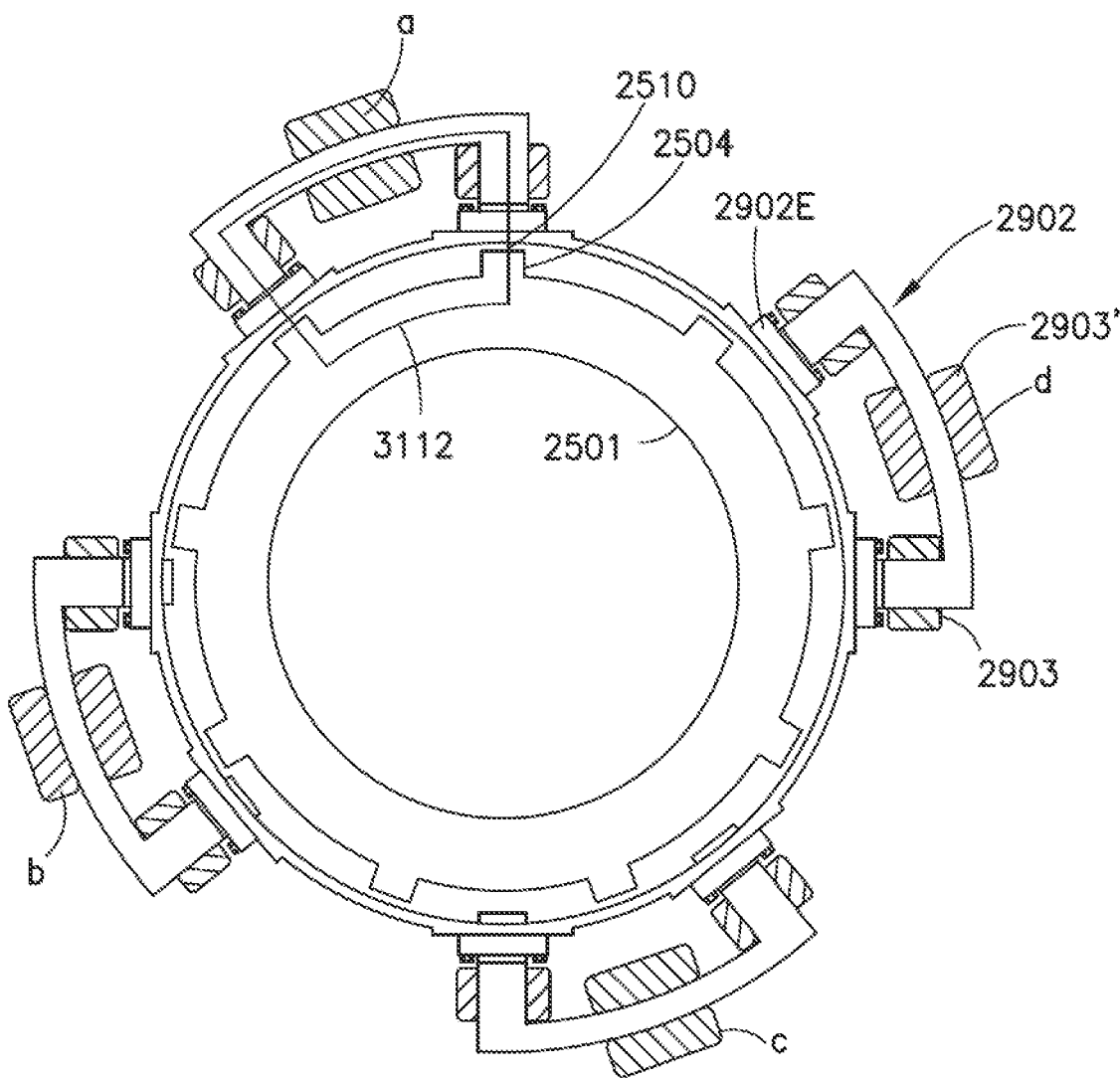

FIG. 31 illustrates a sealed drive 3200 in accordance with another aspect of the disclosed embodiment. The drive 3200 may be substantially similar to drive 3100 unless otherwise noted. Here, one coil 2903' per phase a, b, c, d is energized but in other aspects more than one coil per phase may be energized. This aspect may allow space for larger coils substantially without increasing the stack height of the stator 2902, for example, by leveraging the arc length of the segmented stator elements. In other aspects the coil locations of for example, FIGS. 31 and 32 may be combined to maximize the utilization of coil space as illustrated in FIG. 33.

Figure 34:
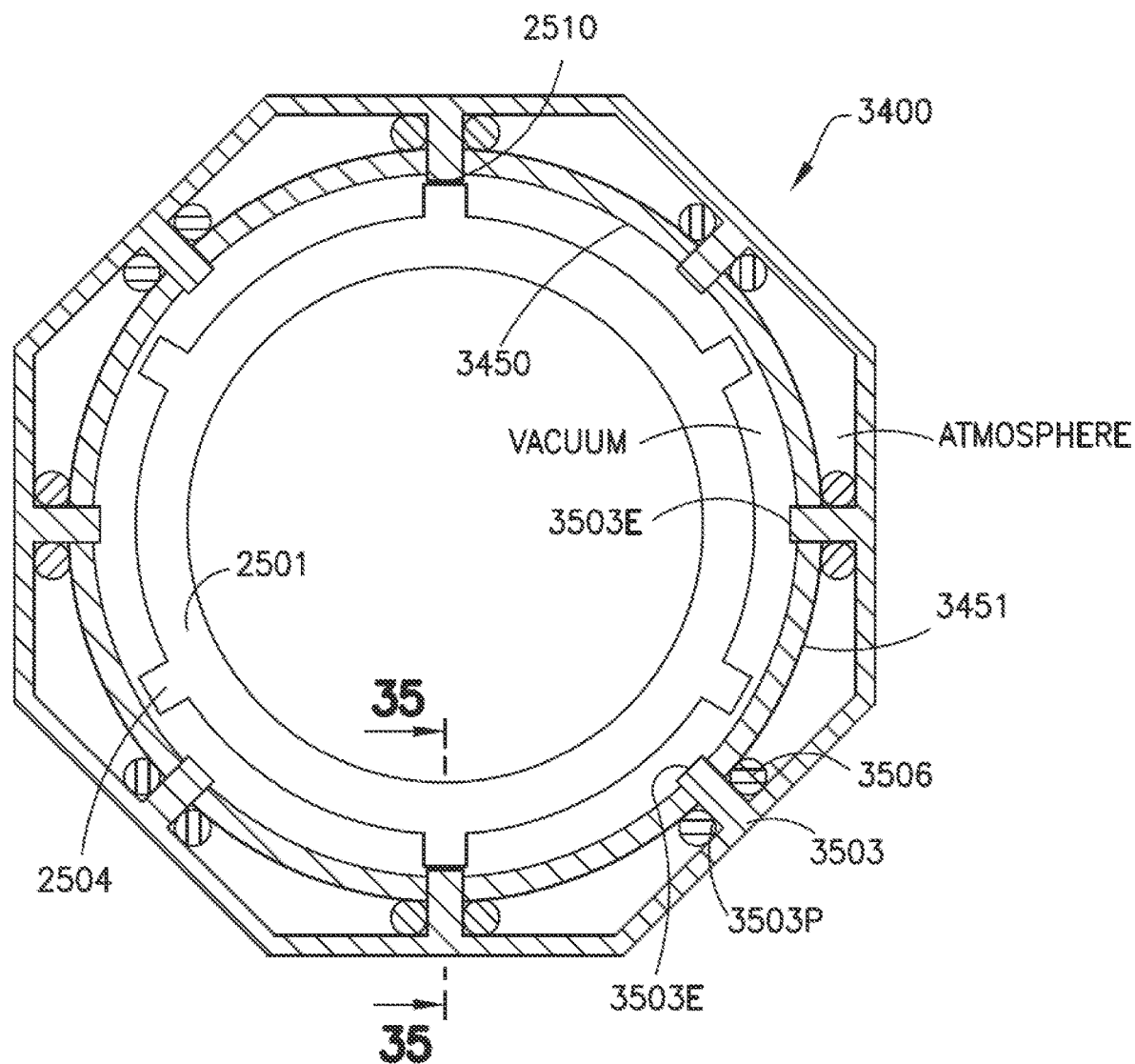
FIGS. 34, 35, 36 and 37 are schematic illustrations of portions of a drive motor in accordance with aspects of the disclosed embodiment.

In another aspect of the disclosed embodiment a sealed drive 3400 may be provided where the isolation wall is structurally supported on, for example, the isolated environment side of the isolation wall by any suitable seal supporting member. For example, referring to FIG. 34 a drive 3400 substantially similar to the drives described above with respect to FIGS. 25A-33 is illustrated where stator pole extensions are utilized. In this aspect the drive 3400 includes a seal casing or isolation wall 3451 that intervenes or is otherwise disposed between the stator poles 3503P and the stator pole extensions 3503E. In this aspect any suitable seal supporting member 3450 may be disposed within the isolated environment. The seal supporting member 3450 may be constructed of any suitable material and have any suitable shape. The seal supporting member 3450 may be configured to house a set of ferromagnetic stator pole extensions 3503E such that the stator pole extensions 3450E are substantially aligned with their respective stator poles 3503P. In one aspect the stator pole extensions may be embedded within or integral to (e.g. forms a one piece unitary member with) the seal supporting member. In other aspects the stator pole extension may be removably mounted within or to the seal supporting member. It is noted that the stator pole extensions are located within the isolated environment and separated from their respective stator poles (which are located in the atmospheric environment) by the isolation wall 3451 which is an ultra-thin can seal.

In one aspect one or more ultra-thin can seal(s) or isolation wall(s) 3451 may be disposed around the outside perimeter of the seal supporting member 3450 such that the isolation wall is disposed between and separates the stator pole extensions from their respective stator poles (e.g. the isolation wall 3451 penetrates the stator). As may be realized, there may be no motion between the stator pole extensions and their respective stator poles, as well as no motion between the isolation wall and the stator. In one aspect the isolation wall 3451 may be one or more non-magnetic cylindrical sleeves of any suitable material such as stainless steel or any other suitable material capable of providing a seal in, for example, a vacuum or other isolated environment. In other aspects the isolation wall may be formed by applying a coating or other membrane to the seal supporting member/stator pole extension assembly. Here the non-magnetic sleeves may provide a seal for each stator pole for a respective motor in the drive 3400. For example, the magnetic sleeve may circumscribe the outer perimeter of the seal supporting member at a level of the seal supporting member that is coincident with the stator poles of a respective motor such that the stator poles belonging to common motor also share a common isolation wall. Where the drive 3400 includes more than one motor, such as in a stacked arrangement, an isolation wall may be provided for each motor such that the isolation walls form bands that are disposed one above the other on the outside perimeter of the seal supporting member as will be described below. In other aspects the isolation wall may be common to two or more motors of the drive assembly. In still other aspects the isolation wall may be a sectioned wall where each stator pole may have a corresponding isolation wall section (e.g. disposed on the seal supporting member) that is distinct from the isolation wall of other stator poles.

The isolation wall 3451 may be ultra-thin and have a thickness of about 30 μm while in other aspects the thickness of the isolation wall 3451 may be more or less than 30 μm. As noted above, the isolation wall 3451 is disposed around the outside perimeter of the seal supporting member 3450 which structurally supports the isolation wall 3451 as the pressure within the isolated environment departs from an atmospheric pressure. For example, as the pressure difference builds between, for example, a vacuum pressure within the isolated environment and the atmospheric pressure outside the isolated environment, the isolation wall 3451 is pushed against the seal supporting member 3450 by the pressure differential such that the seal supporting member 3450 and the stator pole extension element 3503E substantially prevents the isolation wall 3451 from collapsing. It is noted that while the magnetic flux between the stator and the rotor faces the isolation wall (disposed between the stator poles and stator pole extensions) as well as the rotor/stator air gap, the net losses are minimized by the small gap between the stator and rotor as well as the negligible thickness of the isolation wall.

Figure 35:
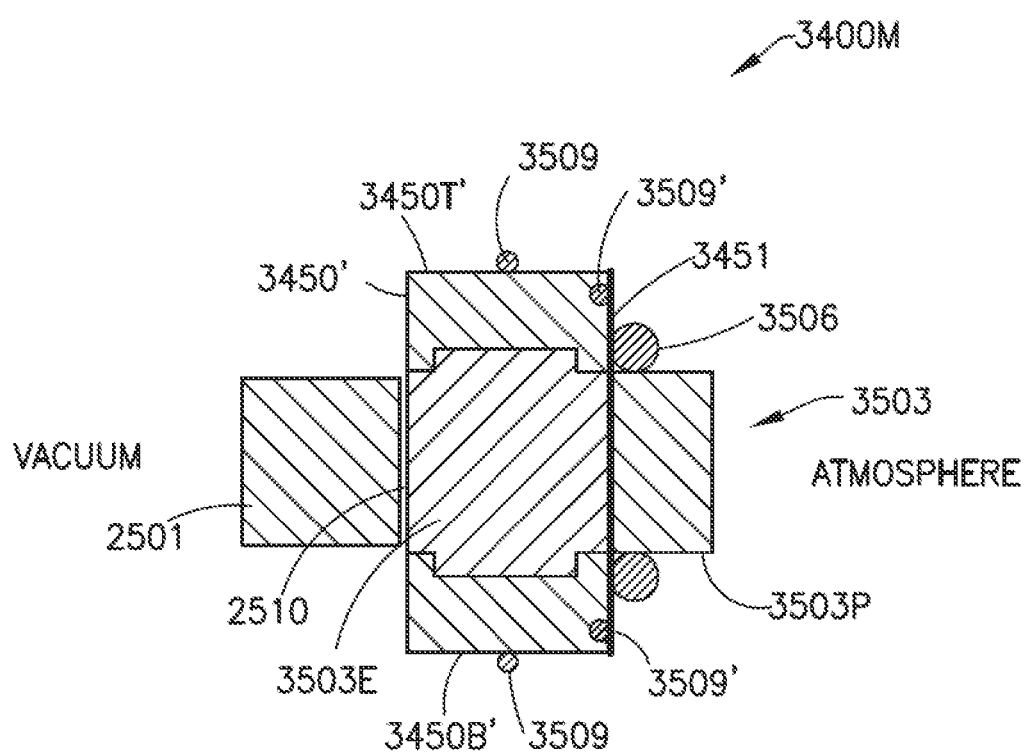

Referring to FIG. 35 a stackable motor module 3400M is illustrated in accordance with an aspect of the disclosed embodiment. FIG. 35 illustrates a cross sectional view A-A of the drive 3400. In one aspect the stackable motor module 3400M may include an array of stator pole extensions 3503E housed within a ring-shaped (or other suitable shape) seal supporting structure 3450' that has a top 3450T' and a bottom 3450B' surface (it is noted that the terms top and bottom are used for exemplary purposes only and in other aspects any suitable spatial terms may be assigned to surfaces 3450T', 3450B') and an isolation wall 3451 affixed to the seal supporting surface. Static seal members 2509 may be disposed on each of the surfaces 3450T', 3450B' such that when the modules 3400M are stacked substantially no air flow exists between the isolated environment and the atmospheric environment. An isolation wall 3451 may be disposed around and affixed to the outer perimeter of the seal support member 3450' in any suitable manner such that any gaps between the stator pole extension 3503E and the seal support member 3450' are covered by the isolation wall.

Static seal members 3509' may also be disposed between the isolation wall 3451 and the seal support member 3450' to provide a seal between the isolation wall and the seal support member. In this aspect the stator 3503 may be positioned around the motor module 3400M and the rotor 3501 may be positioned within the motor module 3400M to form a drive motor. In other aspects, the motor module 3400M may also include the stator 3503 (which may be affixed to the seal support member and/or the isolation wall in any suitable manner. In still other aspects the rotor 2501 may also be included in the motor module 3400M.

Figure 36:
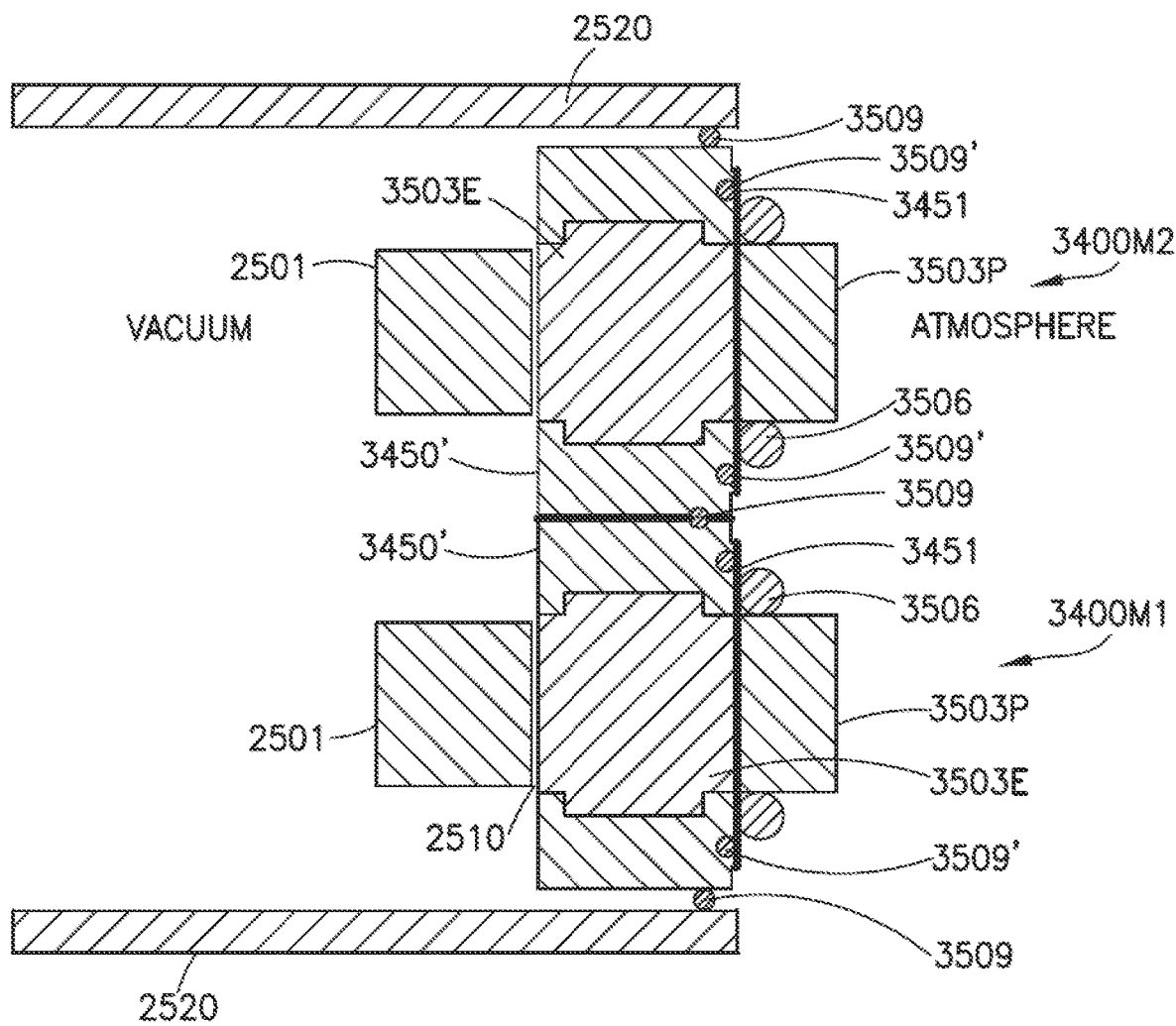
Figure 37:
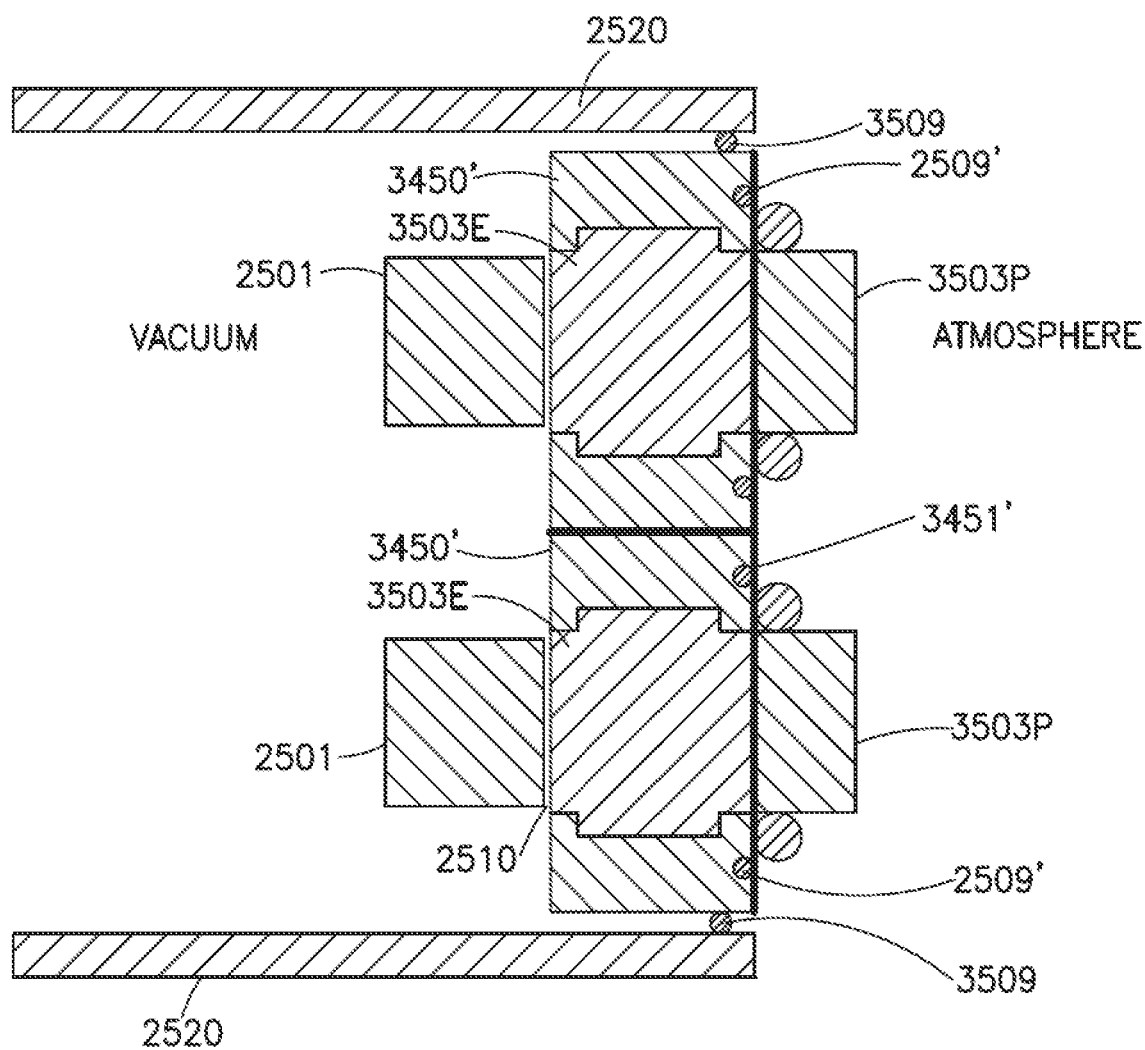

FIG. 36 illustrates the motor modules 3400M1, 3400M2 (which are substantially similar to motor module 3400M) stacked one above the other to form a two axis of movement drive. As can be seen in FIG. 36 each module 3400M1, 3400M2 includes a respective isolation wall 3451 such that the isolation walls for bands arranged one above the other along a combined length of the seal supporting structures 3450' (which may form the seal supporting structure 3450). Here, the number of static seal members 3509' between the isolation walls 3451 and the respective seal supporting members 3450 is dependent on the number of drive axes. In another aspect, as shown in FIG. 37, the number of static seal members may be independent of the number of drive axes. For example, FIG. 37 illustrates a stacked two axis of movement drive substantially similar to that shown in FIG. 36. However, here a unitary or one piece isolation wall 3451' (e.g. a continuous seal casing) is provided on the outer perimeter of the seal supporting members 3450' such that the stacked seal supporting members 3450 share a common isolation wall 3451' and the common isolation wall 3451' extends over one or more motors. In this aspect it is also noted that isolation wall also provides for sealing the interface between the stacked seal support members so that the seal member(s) 3509 disposed between the seal support members may be omitted.

In accordance with one or more aspects of the disclosed embodiment a transport apparatus is provided. The transport apparatus includes a housing, drive mounted to the housing and at least one transport arm connected to the drive. The drive includes at least one rotor having at least one salient pole of magnetic permeable material and disposed in an isolated environment, at least one stator having at least one salient pole with corresponding coil units and disposed outside the isolated environment where the at least one salient pole of the at least one stator the at least one salient pole of the rotor form a closed magnetic flux circuit between the at least one rotor and the at least one stator, and at least one seal configured to isolate the isolated environment where the at least one seal is integral to the at least one stator.

In accordance with one or more aspects of the disclosed embodiment the at least one seal comprises a membrane mounted to the at least one stator.

In accordance with one or more aspects of the disclosed embodiment the at least one seal depends from the at least one stator.

In accordance with one or more aspects of the disclosed embodiment the at least one stator structurally supports the at least one seal.

In accordance with one or more aspects of the disclosed embodiment the at least one seal conforms to a shape of the at least one stator.

In accordance with one or more aspects of the disclosed embodiment wherein the at least one rotor and the at least one stator form stacked motors or motors that are radially nested one inside the other.

In accordance with one or more aspects of the disclosed embodiment the transport apparatus further includes at least one reluctance based encoder track disposed on each of the at least one rotor and at least one reluctance based position feedback sensor configured to interface with the at least one reluctance based encoder track.

In accordance with one or more aspects of the disclosed embodiment the at least one rotor is coupled to a coaxial drive shaft arrangement for driving the at least one transport arm.

In accordance with one or more aspects of the disclosed embodiment the at least one stator is a segmented stator.

In accordance with one or more aspects of the disclosed embodiment the drive is configured as an axial flux flow drive or a radial flux flow drive.

In accordance with one or more aspects of the disclosed embodiment the at least one rotor includes laminated salient poles.

In accordance with one or more aspects of the disclosed embodiment the at least one stator includes laminated salient poles.

In accordance with one or more aspects of the disclosed embodiment the at least one rotor includes a drive member interface, the drive further including a drive transmission member interfaced with the at least one rotor at the drive member interface such that the drive member interfaces with the laminated salient poles and fixes the laminated salient poles to the drive member.

In accordance with one or more aspects of the disclosed embodiment the laminated salient poles are fixed to the drive member so that the laminated salient poles are arranged axially relative to the drive member.

In accordance with one or more aspects of the disclosed embodiment the laminated salient poles are fixed to the drive member so that the laminated salient poles are arranged radially relative to the drive member.

In accordance with one or more aspects of the disclosed embodiment the drive includes a z-axis drive motor connected to the housing.

In accordance with one or more aspects of the disclosed embodiment transport apparatus is provided. The transport apparatus includes a housing, a drive mounted to the housing and at least one transport arm connected to the drive. The drive includes at least one rotor having at least one salient pole of magnetic permeable material and being located within an isolated environment, at least one stator having salient stator poles with respective coil units and being located outside the isolated environment, at least one salient stator pole extension disposed within the isolated environment and aligned with a respect salient stator pole so that the at least one salient stator pole extension and the at least one salient pole of the rotor form a closed magnetic flux circuit between the at least one stator and the at least one rotor, and at least one seal disposed between each stator pole and a respective salient stator pole extension where the at least one seal is configured to isolate the isolated environment.

In accordance with one or more aspects of the disclosed embodiment the drive further includes a seal support member having an inner surface disposed in the isolated environment and an outer surface facing away from the isolated environment, where the at least one seal is disposed on or adjacent the outer surface and the seal support surface is configured to structurally support the at least one seal.

In accordance with one or more aspects of the disclosed embodiment the seal support member is configured to house the at least one salient stator pole extension.

In accordance with one or more aspects of the disclosed embodiment the at least one stator and the at least one rotor form stacked motors and the at least one seal is common to each of the stacked motors.

In accordance with one or more aspects of the disclosed embodiment the at least one stator and the at least one rotor form a stack of motors and the at least one seal includes a seal for each motor that is distinct from seals of other motors in the stack of motors.

In accordance with one or more aspects of the disclosed embodiment the at least one salient stator pole extension and the at least one rotor are positioned such that the at least one salient stator pole extension and the at least one rotor have an obstructionless interface.

In accordance with one or more aspects of the disclosed embodiment each stator and respective rotor form a motor module configured to be stacked with other motor modules.

In accordance with one or more aspects of the disclosed embodiment the drive is configured as an axial flux flow drive or a radial flux flow drive.

In accordance with one or more aspects of the disclosed embodiment the at least one rotor includes laminated salient poles.

In accordance with one or more aspects of the disclosed embodiment the at least one rotor includes a drive member interface, the drive further including a drive transmission member interfaced with the at least one rotor at the drive member interface such that the drive member interfaces with the laminated salient poles and fixes the laminated salient poles to the drive member.

In accordance with one or more aspects of the disclosed embodiment the laminated salient poles are fixed to the drive member so that the laminated salient poles are arranged axially relative to the drive member.

In accordance with one or more aspects of the disclosed embodiment the laminated salient poles are fixed to the drive member so that the laminated salient poles are arranged radially relative to the drive member.

In accordance with one or more aspects of the disclosed embodiment the at least one stator includes laminated salient poles.

In accordance with one or more aspects of the disclosed embodiment the drive includes a z-axis drive motor connected to the housing.

In accordance with one or more aspects of the disclosed embodiment the transport apparatus further includes at least one reluctance based encoder track disposed on each of the at least one rotor and at least one reluctance based position feedback sensor configured to interface with the at least one reluctance based encoder track.

In accordance with one or more aspects of the disclosed embodiment the at least one rotor is coupled to a coaxial drive shaft arrangement for driving the at least one transport arm.

In accordance with one or more aspects of the disclosed embodiment a transport apparatus is provided. The transport apparatus includes a housing, a drive mounted to the housing and at least one transport arm connected to the drive. The drive includes at least one rotor having at least one salient pole of magnetic permeable material, at least one stator including a stator core, a salient top plate, a salient bottom plate and a coil unit associated with each salient top and bottom plate pair where the salient top plate and salient bottom plate are connected to and spaced apart by the stator core and configured to interface with the at least one salient pole of the at least one rotor to form a closed magnetic flux circuit between the at least one stator and the at least one rotor, and an isolation wall disposed between the top plate and bottom plate where the isolation wall is configured to isolate the stator core from an isolated environment in which the at least one transport arm operates.

In accordance with one or more aspects of the disclosed embodiment each rotor and respective stator are configured as a motor module, the motor module being configured to interface with other motor modules to form a drive having stacked motors.

In accordance with one or more aspects of the disclosed embodiment the drive is configured as an axial flux flow drive or a radial flux flow drive.

In accordance with one or more aspects of the disclosed embodiment the drive includes a z-axis drive motor connected to the housing.

In accordance with one or more aspects of the disclosed embodiment the transport apparatus further includes at least one reluctance based encoder track disposed on each of the at least one rotor and at least one reluctance based position feedback sensor configured to interface with the at least one reluctance based encoder track.

In accordance with one or more aspects of the disclosed embodiment the at least one rotor is coupled to a coaxial drive shaft arrangement for driving the at least one transport arm.

In accordance with one or more aspects of the disclosed embodiment a transport apparatus is provided. The transport apparatus includes a housing, a drive mounted to the housing and at least one transport arm connected to the drive. The drive includes at least one laminated rotor having laminated salient poles of magnetic permeable material disposed in an isolated environment where the at least one laminated rotor is isolated from the isolated environment. The drive further includes at least one stator having at least one salient pole with respective coil units disposed outside the isolated environment such that the at least one salient pole of the at least one laminated rotor and the salient pole of the at least one stator form a closed magnetic flux circuit between the at least one stator and the at least one rotor, and at least one seal configured to isolate the isolated environment.

In accordance with one or more aspects of the disclosed embodiment the at least one laminated rotor includes a drive member interface, the drive further including a drive transmission member interfaced with the at least one rotor at the drive transmission member interface such that the drive member interfaces with the laminated salient poles and fixes the laminated salient poles to the drive transmission member.

In accordance with one or more aspects of the disclosed embodiment the laminated salient poles are fixed to the drive transmission member so that the laminated salient poles are arranged axially relative to the drive transmission member.

In accordance with one or more aspects of the disclosed embodiment the laminated salient poles are fixed to the drive transmission member so that the laminated salient poles are arranged radially relative to the drive transmission member.

In accordance with one or more aspects of the disclosed embodiment the at least one laminated rotor is embedded in an insulator that is configured to isolate the at least one laminated rotor from the isolated environment.

In accordance with one or more aspects of the disclosed embodiment the at least one seal is integral to the at least one stator.

In accordance with one or more aspects of the disclosed embodiment the at least one seal comprises a membrane mounted to the at least one stator.

In accordance with one or more aspects of the disclosed embodiment the at least one seal depends from the at least one stator.

In accordance with one or more aspects of the disclosed embodiment the at least one stator structurally supports the at least one seal.

In accordance with one or more aspects of the disclosed embodiment the at least one seal conforms to a shape of the at least one stator.

In accordance with one or more aspects of the disclosed embodiment the at least one stator includes a stator core, a top plate and a bottom plate where the top plate and bottom plate form a salient pole and are connected to and spaced apart by the stator core and configured to interface with the at least one laminated rotor, and the at least one seal is between the top plate and bottom plate and configured to isolate the stator core from an isolated environment in which the at least one transport arm operates.

In accordance with one or more aspects of the disclosed embodiment the drive further includes at least one salient stator pole extension disposed within the isolated environment and aligned with a respective salient pole of the stator, where the at least one seal is disposed between each salient pole of the stator and a respective salient stator pole extension.

In accordance with one or more aspects of the disclosed embodiment the drive further includes a seal support member having an inner surface disposed in the isolated environment and an outer surface facing away from the isolated environment, where the at least one seal is disposed on or adjacent the outer surface and the seal support surface is configured to structurally support the at least one seal.

In accordance with one or more aspects of the disclosed embodiment the seal support member is configured to house the at least one salient stator pole extension.

In accordance with one or more aspects of the disclosed embodiment a transport apparatus is provided. The transport apparatus includes a housing, a drive mounted to the housing and at least one transport arm connected to the drive. The drive includes at least one vacuum compatible laminated rotor having laminated salient rotor poles of magnetic permeable material and being disposed in an isolated environment where the at least one vacuum compatible laminated rotor includes a set of alternately stacked laminations of ferromagnetic layers and non-conductive layers. The drive further includes at least one stator having at least one salient stator pole with respective coil units disposed outside the isolated environment where each laminated salient rotor poles when interfaced with the at least one salient rotor pole form a closed magnetic flux circuit between the at least one vacuum compatible laminated rotor and the at least one stator, and at least one seal configured to isolate the isolated environment.

In accordance with one or more aspects of the disclosed embodiment the drive includes at least one drive shaft and retaining members configured to mount the at least one vacuum compatible laminated rotor to the at least one drive shaft and clamp the alternately stacked laminations together.

In accordance with one or more aspects of the disclosed embodiment the alternately stacked laminations are bonded together.

In accordance with one or more aspects of the disclosed embodiment the at least one seal is integral to the at least one stator.

In accordance with one or more aspects of the disclosed embodiment the at least one seal comprises a membrane mounted to the at least one stator.

In accordance with one or more aspects of the disclosed embodiment the at least one seal depends from the at least one stator.

In accordance with one or more aspects of the disclosed embodiment the at least one stator structurally supports the at least one seal.

In accordance with one or more aspects of the disclosed embodiment the at least one seal conforms to a shape of the at least one stator.

In accordance with one or more aspects of the disclosed embodiment the at least one stator includes a stator core, a top plate and a bottom plate where the top plate and bottom plate form a salient stator pole and are connected to and spaced apart by the stator core and configured to interface with the at least one vacuum compatible laminated rotor, and the at least one seal is between the top plate and bottom plate and configured to isolate the stator core from an isolated environment in which the at least one transport arm operates.

In accordance with one or more aspects of the disclosed embodiment the drive further includes at least one salient stator pole extension disposed within the isolated environment and aligned with a respective salient stator pole, where the at least one seal is disposed between each salient stator pole and a respective salient stator pole extension.

In accordance with one or more aspects of the disclosed embodiment the drive further includes a seal support member having an inner surface disposed in the isolated environment and an outer surface facing away from the isolated environment, where the at least one seal is disposed on or adjacent the outer surface and the seal support surface is configured to structurally support the at least one seal.

In accordance with one or more aspects of the disclosed embodiment the seal support member is configured to house the at least one salient stator pole extension.

In accordance with one or more aspects of the disclosed embodiment the at least one seal is integrated with a structure of the at least one stator.

In accordance with one or more aspects of the disclosed embodiment the at least one seal is supported by a structure of the at least one stator.

In accordance with one or more aspects of the disclosed embodiment a variable reluctance motor assembly includes a casing having a drum structure, a stator mounted within the drum structure, and a rotor mounted within the drum structure and interfaced with the stator, where the casing includes a common datum that forms a stator interface surface configured to support the stator and position the stator and rotor relative to each other for effecting a predetermined gap between the stator and rotor.

In accordance with one or more aspects of the disclosed embodiment the variable reluctance motor assembly further includes an isolation wall 2403 supported by the stator such that the isolation wall is located in a predetermined position relative to the common datum and the rotor.

In accordance with one or more aspects of the disclosed embodiment the variable reluctance motor assembly further includes a sensor track connected to the rotor and a sensor mounted to the casing in a predetermined position relative to the common datum so as to effect a predetermined gap between the sensor and sensor track, where the stator, rotor, sensor and sensor track are positioned relative to and depend from the common datum.

In accordance with one or more aspects of the disclosed the casing is a monolithic member that forms the drum structure and into which slots are formed for one or more of sensors, control boards and drive connectors.

In accordance with one or more aspects of the disclosed embodiment the casing is an integral assembly formed by two or more hoop members connected to each other to form the drum structure.

In accordance with one or more aspects of the disclosed embodiment a variable reluctance motor casing includes an exterior surface, an interior surface where the exterior and interior surfaces form a drum structure, the interior surface including a common datum that forms a stator interface surface configured to support a stator and position the stator and a rotor relative to each within the casing to effect a predetermined gap between the stator and rotor.

In accordance with one or more aspects of the disclosed embodiment the interior surface includes a rotor interface surface positioned relative to the common datum so that the stator and rotor are positioned from and supported by the common datum.

In accordance with one or more aspects of the disclosed embodiment the drum structure includes a sensor interface surface configured to support a sensor relative to a sensor track connected to the rotor and effect a predetermined gap between the sensor and sensor track, where the sensor interface surface is positioned relative to the common datum so that the stator, rotor and sensor are positioned from and supported by the common datum.

In accordance with one or more aspects of the disclosed embodiment, the sensor interface surface is formed as a slot within the drum structure.

In accordance with one or more aspects of the disclosed embodiment, the slot is configured to house the sensor and a motor control board.

In accordance with one or more aspects of the disclosed the drum structure is a monolithic member into which slots are formed for one or more of sensors, control boards and drive connectors.

In accordance with one or more aspects of the disclosed embodiment the drum structure is an integral assembly formed by two or more hoop members connected to each other.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A variable reluctance motor assembly comprising:
   a casing having a drum structure;
   a stator including a stator back, separate and distinct from the casing, and stator poles mounted within the drum structure; and
   a rotor mounted within the drum structure and interfaced with the stator;
   wherein the casing includes a common datum that forms a stator interface surface configured to support the stator and position the stator and rotor relative to each other for effecting a predetermined gap between the stator and rotor.

2. The variable reluctance motor assembly of claim 1, further comprising an isolation wall supported by the stator such that the isolation wall is located in a predetermined position relative to the common datum and the rotor.

3. The variable reluctance motor assembly of claim 1, further comprising a sensor track connected to the rotor and a sensor mounted to the casing in a predetermined position relative to the common datum so as to effect a predetermined gap between the sensor and sensor track, where the stator, rotor, sensor and sensor track are positioned relative to and depend from the common datum.

4. The variable reluctance motor assembly of claim 1, wherein the casing is a monolithic member that forms the drum structure and into which slots are formed for one or of sensors, control boards and drive connectors.

5. The variable reluctance motor assembly of claim 1, wherein the casing is an integral assembly formed by two or more hoop members connected to each other to form the drum structure.

6. The variable reluctance motor assembly of claim 1, wherein the casing includes an exterior surface, and an interior surface, where the exterior and interior surfaces form the drum structure, the interior surface including the common datum that forms the stator interface surface configured to support the stator and position the stator and the rotor relative to each to effect the predetermined gap between the stator and rotor.

7. The variable reluctance motor assembly of claim 6, wherein the interior surface includes a rotor interface surface positioned relative to the common datum so that the stator and rotor are positioned from and supported by the common datum.

8. The variable reluctance motor assembly of claim 6, wherein the drum structure includes a sensor interface surface configured to support a sensor relative to a sensor track connected to the rotor and effect a predetermined gap between the sensor and sensor track, where the sensor interface surface is positioned relative to the common datum so that the stator, rotor and sensor are positioned from and supported by the common datum.

9. The variable reluctance motor assembly of claim 8, wherein the sensor interface surface is formed as a slot within the drum structure.

10. The variable reluctance motor assembly of claim 9, wherein the slot is configured to house the sensor and a motor control board.

11. A variable reluctance motor assembly comprising:
   a casing having a monocoque structure;
   a stator including a stator back, separate and distinct from the casing, and stator poles mounted within the monocoque structure; and
   a rotor mounted within the monocoque structure and interfaced with the stator;
   wherein the casing includes a common datum that forms a stator interface surface configured to support the stator and position the stator and rotor relative to each other for for effecting a predetermined gap between the stator and rotor.

12. The variable reluctance motor assembly of claim 11, further comprising an isolation wall supported by the stator such that the isolation wall is located in a predetermined position relative to the common datum and the rotor.

13. The variable reluctance motor assembly of claim 11, further comprising a sensor track connected to the rotor and a sensor mounted to the casing in a predetermined position relative to the common datum so as to effect a predetermined gap between the sensor and sensor track, where the stator, rotor, sensor and sensor track are positioned relative to and depend from the common datum.

14. The variable reluctance motor assembly of claim 11, wherein the casing is a monolithic member that forms the monocoque structure and into which slots are formed for one or more of sensors, control boards and drive connectors.

15. The variable reluctance motor assembly of claim 11, wherein the casing is an integral assembly formed by two or more hoop members connected to each other to form the monocoque structure.

16. The variable reluctance motor assembly of claim 11, wherein the casing includes an exterior surface, and an interior surface, where the exterior and interior surfaces form the monocoque structure, the interior surface including the common datum that forms the stator interface surface configured to support the stator and position the stator and the rotor relative to each to effect a predetermined gap between the stator and rotor.

17. The variable reluctance motor assembly of claim 16, wherein the interior surface includes a rotor interface surface positioned relative to the common datum so that the stator and rotor are positioned from and supported by the common datum.

18. The variable reluctance motor assembly of claim 16, wherein the monocoque structure includes a sensor interface surface configured to support a sensor relative to a sensor track connected to the rotor and effect a predetermined gap between the sensor and sensor track, where the sensor interface surface is positioned relative to the common datum so that the stator, rotor and sensor are positioned from and supported by the common datum.

19. The variable reluctance motor assembly of claim 18, wherein the sensor interface surface is formed as a slot within the monocoque structure.

20. The variable reluctance motor assembly of claim 19, wherein the slot is configured to house the sensor and a motor control board.

* * * * *